US008751271B2

(12) United States Patent
Stefik et al.

(10) Patent No.: US 8,751,271 B2
(45) Date of Patent: Jun. 10, 2014

(54) COMPUTER-IMPLEMENTED SYSTEM AND METHOD FOR OFFERING COMMERCIAL PARKING RESERVATIONS

(75) Inventors: Mark Jeffrey Stefik, Portola Valley, CA (US); Alan G. Bell, Los Altos, CA (US); Craig Eldershaw, Belmont, CA (US); Lance E. Good, Gaithersburg, MD (US); Daniel H. Greene, Sunnyvale, CA (US); Francisco Eduardo Torres, San Jose, CA (US); Serdar Uckun, Palo Alto, CA (US); David Preston Cummins, Washington, DC (US)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 46 days.

(21) Appl. No.: 13/217,211

(22) Filed: Aug. 24, 2011

(65) Prior Publication Data

US 2012/0095792 A1 Apr. 19, 2012

Related U.S. Application Data

(60) Provisional application No. 61/393,337, filed on Oct. 14, 2010.

(51) Int. Cl.
*G06Q 10/00* (2012.01)
*G07B 15/00* (2011.01)
*G07B 15/02* (2011.01)

(52) U.S. Cl.
USPC .................................. 705/5; 705/1.1; 705/13

(58) Field of Classification Search
USPC ............ 705/1.1, 5, 7.11–7.35, 13, 26.1–26.3, 705/307, 313–314, 400; 340/932.2
See application file for complete search history.

(56) References Cited

U.S. PATENT DOCUMENTS

| 4,137,662 A | 2/1979 | Baumer |
| 4,310,890 A | 1/1982 | Trehn et al. |

(Continued)

FOREIGN PATENT DOCUMENTS

WO 2004084145 9/2004

OTHER PUBLICATIONS

Geroliminis et al., "A review of green logistics schemes used in cities around the world", UC Berkeley Center of Future Urban transport: A volvo center of excellence, http://escholarship.org/uc/item/4x89p485.pdf, Aug. 1, 2005, retrieved Jun. 19, 2013.*

(Continued)

*Primary Examiner* — George Chen
(74) *Attorney, Agent, or Firm* — Patrick J.S. Inouye; Makiko Coffland

(57) ABSTRACT

A computer-implemented system and method for offering commercial parking reservations through flexible loading zones is provided. Motor vehicle parking spaces located in a business district are managed through a server. Smart parking devices, vehicle occupancy sensors, and parking availability indicators are interfaced to the server. Use of the parking spaces as a loading zone is reserved. A reservation request from a business is accepted. The business is confirmed as eligible. The request is granted, provided the requested parking space is available over any other reservations. Use of the loading zone is managed. The parking availability indicator is activated contemporaneous to the reservation period. Occupancy of the requested parking space is sensed through the nearest vehicle occupancy sensor. An identity of a driver is verified through the nearest smart parking device. The use of the reserved parking space is permitted upon matching the driver's identity to the business.

5 Claims, 22 Drawing Sheets

(56) References Cited

U.S. PATENT DOCUMENTS

| | | |
|---|---|---|
| 4,356,903 A | 11/1982 | Lemelson et al. |
| 4,532,418 A | 7/1985 | Meese et al. |
| 5,266,947 A | 11/1993 | Fujiwara et al. |
| 5,432,508 A | 7/1995 | Jackson |
| 5,570,771 A | 11/1996 | Jacobs |
| 5,710,557 A | 1/1998 | Schuette |
| 5,710,743 A | 1/1998 | Dee et al. |
| 5,740,050 A | 4/1998 | Ward, II |
| 5,770,845 A | 6/1998 | Hjelmvik |
| 5,777,951 A | 7/1998 | Mitschele |
| 5,841,369 A | 11/1998 | Sutton et al. |
| 5,910,782 A | 6/1999 | Schmitt et al. |
| 6,078,272 A | 6/2000 | Jacobs et al. |
| 6,081,205 A | 6/2000 | Williams |
| 6,081,206 A | 6/2000 | Kielland |
| 6,102,285 A | 8/2000 | Elias |
| 6,111,522 A | 8/2000 | Hiltz et al. |
| 6,188,328 B1 | 2/2001 | Ho |
| 6,243,028 B1 | 6/2001 | Krygler et al. |
| 6,243,029 B1 | 6/2001 | Tomer |
| 6,275,169 B1 | 8/2001 | Krygler et al. |
| 6,373,401 B2 | 4/2002 | Ho |
| 6,411,895 B1 | 6/2002 | Lau et al. |
| 6,437,692 B1 | 8/2002 | Petite et al. |
| 6,459,386 B1 | 10/2002 | Jones |
| 6,493,676 B1 | 12/2002 | Levy |
| 6,505,774 B1 | 1/2003 | Fulcher et al. |
| 6,513,711 B1 | 2/2003 | Hjelmvik |
| 6,519,329 B1 | 2/2003 | Hjelmvik |
| 6,577,248 B1 | 6/2003 | Hjelmvik |
| 6,791,473 B2 | 9/2004 | Kibria et al. |
| RE38,626 E | 10/2004 | Kielland |
| 6,812,857 B1 | 11/2004 | Kassab et al. |
| 6,816,085 B1 | 11/2004 | Haynes et al. |
| 6,823,317 B1 | 11/2004 | Quimet et al. |
| 6,885,311 B2 | 4/2005 | Howard et al. |
| 6,927,700 B1 | 8/2005 | Quinn |
| 6,929,179 B2 | 8/2005 | Fulcher et al. |
| 7,002,487 B1 | 2/2006 | Montgomery, Sr. |
| 7,014,355 B2 | 3/2006 | Potter, Sr. et al. |
| 7,019,670 B2 | 3/2006 | Bahar |
| 7,123,166 B1 | 10/2006 | Haynes et al. |
| 7,237,716 B2 | 7/2007 | Silberberg |
| 7,277,010 B2 | 10/2007 | Joao |
| RE40,013 E | 1/2008 | Quinn |
| 7,321,317 B2 | 1/2008 | Nath et al. |
| 7,382,244 B1 | 6/2008 | Donovan et al. |
| 7,393,134 B2 | 7/2008 | Mitschele |
| 7,474,589 B2 | 1/2009 | Showen et al. |
| 7,579,964 B2 | 8/2009 | Nath et al. |
| 7,652,593 B1 | 1/2010 | Haynes et al. |
| 7,667,619 B2 | 2/2010 | Montgomery, Sr. |
| 7,688,225 B1 | 3/2010 | Haynes et al. |
| 7,768,426 B2 | 8/2010 | Groft |
| 7,791,501 B2 | 9/2010 | Ioli |
| 7,791,503 B2 | 9/2010 | Breed et al. |
| 7,805,239 B2 | 9/2010 | Kaplan et al. |
| 7,840,427 B2 | 11/2010 | O'Sullivan |
| 7,855,935 B1 | 12/2010 | Lauder et al. |
| 7,900,966 B1 | 3/2011 | Stennett |
| 2002/0077953 A1 | 6/2002 | Dutta |
| 2002/0099574 A1* | 7/2002 | Cahill et al. ................ 705/5 |
| 2003/0055727 A1 | 3/2003 | Walker et al. |
| 2004/0068433 A1 | 4/2004 | Chatterjee et al. |
| 2004/0236615 A1 | 11/2004 | Msndy |
| 2004/0254840 A1* | 12/2004 | Slemmer et al. ............ 705/22 |
| 2005/0280555 A1 | 12/2005 | Warner, VI |
| 2006/0068704 A1 | 3/2006 | Bhakta et al. |
| 2006/0247848 A1 | 11/2006 | Cheng |
| 2006/0259353 A1 | 11/2006 | Gutmann |
| 2007/0008181 A1 | 1/2007 | Rollert et al. |
| 2007/0136128 A1 | 6/2007 | Janacek et al. |
| 2007/0290888 A1 | 12/2007 | Reif et al. |
| 2008/0133425 A1 | 6/2008 | Grush |
| 2008/0136674 A1 | 6/2008 | Jang et al. |
| 2008/0208680 A1 | 8/2008 | Cho |
| 2009/0125341 A1 | 5/2009 | Somoza et al. |
| 2009/0164635 A1 | 6/2009 | Denker et al. |
| 2009/0276236 A1 | 11/2009 | Adamczyk et al. |
| 2009/0309760 A1 | 12/2009 | Chew |
| 2010/0106514 A1 | 4/2010 | Cox |
| 2010/0328104 A1 | 12/2010 | Groft |
| 2011/0035261 A1 | 2/2011 | Handler |
| 2011/0127944 A1 | 6/2011 | Saito et al. |
| 2011/0131083 A1 | 6/2011 | Redmann et al. |
| 2011/0140658 A1 | 6/2011 | Outwater et al. |
| 2011/0193522 A1 | 8/2011 | Uesugi |
| 2011/0227533 A1 | 9/2011 | Wolfien |
| 2011/0241619 A1 | 10/2011 | Young et al. |
| 2011/0246252 A1 | 10/2011 | Uesugi |
| 2011/0257881 A1 | 10/2011 | Chen et al. |
| 2012/0112698 A1 | 5/2012 | Yoshimura et al. |
| 2012/0173292 A1 | 7/2012 | Solomon et al. |
| 2012/0188101 A1 | 7/2012 | Ganot |

OTHER PUBLICATIONS

Weinberger et al., US Parking Policies: An Overview of Management Strategies, Institute for Transportation & Development Policy, http://www.streetsblog.org/wp-content/pdf/ITDP_Parking_FullReport.pdf, Feb. 2010, retrieved Jun. 7, 2013.

Smith et al., "Intelligent Transportation Systems And Truck Parking," Feb. 2005.

* cited by examiner

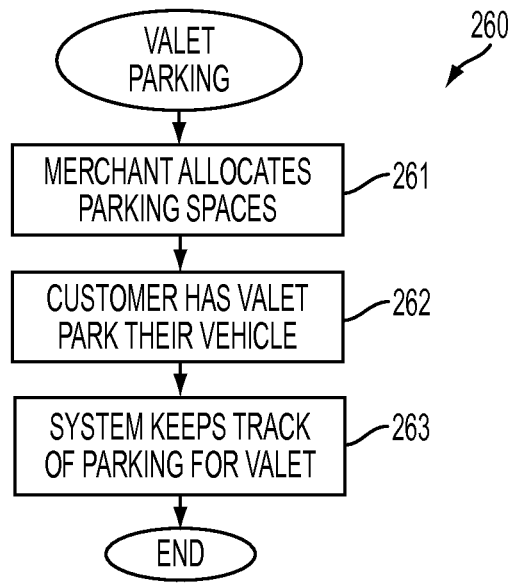

COMPUTER-IMPLEMENTED SYSTEM AND METHOD FOR OFFERING COMMERCIAL PARKING RESERVATIONS

CROSS-REFERENCE TO RELATED APPLICATION

This non-provisional patent application claims priority under 35 U.S.C. §119(e) to U.S. Provisional Patent Application Ser. No. 61/393,337, filed Oct. 14, 2010, the disclosure of which is incorporated by reference.

FIELD

This application relates in general to motor vehicle parking control and management and, in particular, to a computer-implemented system and method for offering commercial parking reservations.

BACKGROUND

Public roads primarily facilitate motor vehicle traffic. Vehicle parking is ordinarily offered as a secondary benefit incident to vehicle throughway. Consequently, parking is an inherently limited public resource. Within an urban environment, local government generally regulates parking at curbside on public roads, in municipal parking lots, and on other public property through a regulatory scheme that both provides revenue generation and promotes public safety and health. Commonly, public parking is regulated through a scheme of fees assessed through parking meters for fixed time period parking, by issuance of permits for residential, commercial, or special use parking, and through zoning that regulates permissible uses of property, including parking. Parking on privately-owned property is often offered through hourly fees or some form of parking contract.

Meeting the parking needs of motorists requires more than simply finding a balance between supply and demand, yet the capability to efficiently allocate and manage on-street parking remains elusive, even when parking needs are significant, recurring, and known ahead of time. For instance, urban parking spaces characteristically undergo periods of widely skewed demand and utilization, with low demand and light use in some periods, often during the night, and heavy demand and use at other times. As well, merely finding available parking is only the start, as subsequent occupancy of a parking space must also be permissible under applicable rules. Parking regulations, though, are often complex and confusing, with time limits on parking in residential and business zones, parking enforcement undertaken during working hours in neighborhood zones, parking enforcement of loading zone rules and rules governing parking near fire hydrants occurring at all hours, and exceptions to parking regulations made to accommodate select holidays, depending upon the municipality.

Consequently, the impact of regulated control over on-street parking affects all motorists, as well as urban residents, local businesses, and other parties that use or rely upon on-street parking. Drivers seeking a place to park their motor vehicle are most immediately impacted by regulated parking control. Looking for a parking space wastes time, contributes to traffic congestion, creates frustration, and generates pollution, while violating parking rules, such as by allowing a parking meter to expire, can result in parking tickets, fines, or towing. These motorists therefore need both to readily determine on-street parking availability and to ensure parking regulation compliance once parked.

In a sense, urban residents are a subclass of motorists with special recurring needs. Urban residents often lack garages and must park on the street at night, on the weekends, and at other times when they are at home. Regular on-street parking requires particular care. For instance, urban residents may be expected to feed payments regularly into parking meters or continually re-park their vehicles when they are home during the day, which can be impractical and unduly burdensome. As well, they may be expected to remember to park off-street when street cleaning or other scheduled street work occurs. As a result, urban residents need to know more than just parking availability; they need to have parking predictability, which can be crucial to ensuring their personal safety, for instance, when arriving home late at night, and for convenience as needed, for example, when unloading shopping bags from their car or in inclement weather.

The parking needs of local businesses are complementary to the needs of drivers and urban residents. Many local businesses depend on the availability of customer parking for their success. In some locales, tourists and out-of-town visitors may constitute a large percentage of local business' customers, and a lack of on-street parking, or overly-complex parking regulations, can discourage these potential customers, thereby harming the opportunities for local businesses to flourish. Local businesses also often need to ensure that parking is available for the delivery of goods or for the use of commercial vendors.

U.S. Pat. No. RE40,013, reissued Jan. 22, 2008, to Quinn, discloses a method and apparatus for detection and remote notification of vehicle parking space. Local detector devices sense the presence or absence of a vehicle in a particular parking space and communicate space identification and status information to a computer network. The information is integrated with electronic street maps of the area. The street maps, annotated with the parking space status identifiers, are electronically communicated to any number of networks.

U.S. Pat. No. 7,791,501, issued Sep. 7, 2010, to Ioli, discloses a vehicle identification, tracking, and parking enforcement system. The system includes a meter system that generates image data of a vehicle in a parking space, public roadway, and highway entrances and exits. In operation, the system allows license tags, special parking permits, handicapped tags, or other suitable tags to be readily identified, which allows parking areas that have been reserved for handicapped or other personnel to be monitored. Unauthorized individuals that have parked in those locations can thereby be determined. An enforcement and tracking system receives the vehicle image data and generates a vehicle license number, vehicle tag identification number, and facial image. From the image date acquired, monitoring of parking spaces is performed and violation citations or notices are generated.

U.S. Pat. No. 7,768,426, issued Aug. 3, 2010, to Groft, discloses a parking system employing remote asset management techniques. A vehicle detection system and smart meter identify all information as to a parking space, including when a vehicle enters or leaves, how long the vehicle has been in the space, whether the parking meter associated with the space is in good operating order, whether the requested charge for parking has been paid, whether the vehicle is in compliance with regulations regarding the space, whether a violation has occurred or is about to occur, and status of usage of the collection mechanism. This information is collected, stored, and transmitted to a central command and control interface, which collates, analyses, and transmits reports to a display. Thus, all parties involved in parking, from whatever point of view, are able to monitor the status of all parking spaces in near real time and make use of the information developed on an interactive basis, thereby enabling the highest degree of efficiency in management of parking spaces through real time parking information collection.

U.S. Pat. No. 7,579,964, issued Aug. 25, 2009, to Nath et al., discloses a method for intelligent parking, pollution, and surveillance control. Parking meters sense the presence of a vehicle parked in a metered zone by emitting a narrow signal beam around an area where a vehicle can park. Two pairs of miniature surveillance cameras are included in the housing of an intelligent parking enforcement device, such as a parking meter. The presence of a vehicle parked nearby is sensed by a sensor beacon and, on the successful acknowledgement of a vehicle's presence, the system transmits a unique identifier to the parked vehicle and continuously monitors the vehicle for idling. The intelligent parking enforcement device communicates with a automobile registration control system, which is informed of impending parking violations and, when appropriate, a violation summons is issued.

U.S. Pat. No. 7,393,134, issued Jul. 1, 2008, to Mitschele, discloses a parking meter that includes a micro-controller coupled with a vehicle detector that is focused at associated parking space. A payment acceptance mechanism is coupled with the micro-controller to receive payment for pre-paid parking. Operation of the parking meter is initiated by an interrogation station directing an interrogation signal at an associated parking space and the presence of a vehicle is detected by a vehicle detector. A parking violation occurs when the operator of the vehicle either fails to make payment within a pre-determined standby interval or when the pre-paid parking interval expires.

U.S. Pat. No. 7,237,716, issued Jul. 3, 2007, to Silberberg, discloses a parking system for sending messages. The parking system has a parking meter in close proximity to a parking space, in which a user's vehicle is able to be parked. The parking meter receives payment and thereafter establishes a parking period, during which the vehicle is able to legitimately park in the space. A communication means sends a message to the user's mobile phone prior to the expiry of the parking.

U.S. Pat. No. 7,019,670, issued Mar. 28, 2006, to Bahar, discloses an enhanced meter utilizing user identification technology. A user or vehicle is identified by communication of user data into the parking meter system. If the meter becomes expired with the vehicle remaining in the parking space, a citation is electronically processed and thereafter delivered to the user or vehicle owner. A vehicle presence detector utilizes infrared, ultrasonic, sonar, photoelectric, or other technology to detect the presence of a vehicle in a metered parking space. Recognition of the user or vehicle further enables the system to limit the individual's or vehicle's parking time to help regulate traffic within a municipality district, as well as prevent people from parking on a metered location for excessive periods of time.

U.S. Pat. No. 7,014,355, issued Mar. 21, 2006, to Potter, Sr. et al., discloses an electronic parking meter system. Electronically operated parking meters are coupled with a sensor for positively and unobtrusively sensing the presence or absence of a vehicle in a specified parking space. An induction coil mounted below the surface of a parking area provides positive signals to the electronically operated parking meter upon both the entrance and movement of a vehicle into and from the parking space. A transaction record can be stored showing exact dates and times of the arrival and departure of the vehicle. This data, when combined with other records, can provide a variety of real time management information to a parking manager, including an electronic citation issuance system.

U.S. Pat. No. 6,823,317, issued Nov. 23, 2004, to Ouimet et al., discloses an urban parking system. A wireless network covering a large local geographic area is linked to a large number of payment terminals, which are located near a plurality of parking spaces, either at curbside or in municipal lots. Parking data is gathered from motorists at the payment terminals, including vehicle or parking space identification data. The parking data is sent to the wireless network in response to payment. A plurality of portable terminals is provided for use by parking wardens. The wireless network is used to transmit the parking data to the portable terminals of the parking wardens upon receipt.

U.S. Pat. No. 6,493,676, issued Dec. 10, 2002, to Levy, discloses a system and method for charging for vehicle parking. A parking system includes a plurality of mobile parking units that each has a unique identification for installation in a vehicle, and a parking control center for communicating with each of the mobile parking units. Each mobile parking unit checks its location whenever the vehicle is not moving and, if the location coincides with a known parking area, a charge for parking is activated until the vehicle resumes travel.

U.S. Pat. No. 5,910,782, issued Jun. 8, 1999, to Schmitt et al., discloses an on-board vehicle parking space finder service. When a vehicle enters a parking space, a parking meter, equipped with an ultrasonic, sonar, or other sensor device, senses the presence of the vehicle and changes its internal state to "occupied." When the vehicle leaves, the parking meter senses the departure and changes its internal space to "available." As soon as the parking meter detects a change of state, a data message containing the parking meter identifier or location information and parking availability status is sent to a nearby central site. When a driver in the vehicle desires to locate available on-street parking, a request is initiated from the on-board navigation computer to the central site. Upon receipt of the request, the central site computer transmits a parking space availability message to the vehicle. The vehicle on-board computer displays the parking space availability to the requester.

Conventional parking solutions typically focus on either determining availability or monitoring parking space occupancy. Therefore, there is a need for holistically providing a comprehensive set of services to different parties with parking needs, particularly in an urban environment.

SUMMARY

Real-time and account-based parking services are provided through a network of smart parking devices and parking services kiosks. Each parking device or kiosk is physically located at nearby one or more motor vehicle parking spaces. Sensors are also physically located at each parking space for determining whether a vehicle is parked. Each parking space has a parking availability status indicator that is visible to motorists in vehicles from afar in a manner akin to a traffic light for a parking space. The parking services execute on one or more servers and maintain real time information about parking spaces, parking policies, parking events, and accounts. Information from the parking devices, kiosks, and the sensors is collected into the parking services, which can change the status and other internal state of the parking devices. The parking services also interact with drivers, urban residents, local merchants, parking enforcement personnel, and other stake holders through on-line services. Drivers can have parking accounts and can establish a parking identity for a parking event by allowing the parking services to read a parking identification card, driver's license, or credit card, or by reading a license plate or other vehicle identifier.

One embodiment provides a computer-implemented system and method for offering commercial parking reservations through flexible loading zones. A multiplicity of motor vehicle parking spaces located in a business district of an urban environment are managed through a server. A plurality of smart parking devices that are each physically proximate to least one of the parking spaces are interfaced to the server. A plurality of vehicle occupancy sensors that are also each physically proximate to least one of the parking spaces are interfaced to the server. A plurality of parking availability indicators that are each associated with at least one of the parking spaces are interfaced to the server. Use of one of the parking spaces as a loading zone is reserved. A request for a loading zone reservation is accepted from a business identifying one of the parking spaces and including a time and date over which a reservation period would be in effect. The business is confirmed as eligible to reserve the requested parking space. The request is granted, provided the requested parking space is available during the reservation period over any other reservations stored in the server. Use of the reserved parking space as the loading zone is managed during the reservation period. The parking availability indicator associated with the reserved parking space is activated contemporaneous to the reservation period. Occupancy of the requested parking space by a motor vehicle is sensed through the nearest vehicle occupancy sensor. An identity of a driver of the motor vehicle is verified against the reservation through the nearest smart parking device. The use of the reserved parking space is permitted upon matching the driver's identity to the business to whom the parking reservation was granted.

A further embodiment provides a computer-implemented system and method for providing management of motor vehicle parking spaces during scheduled street sweeping. A multiplicity of motor vehicle parking spaces are managed through a server. A plurality of smart parking devices that are each physically proximate to least one of the parking spaces are interfaced to the server. A plurality of vehicle occupancy sensors that are also each physically proximate to least one of the parking spaces are interfaced to the server. A plurality of parking availability indicators that are each associated with at least one of the parking spaces are interfaced to the server. Street sweeping activity affecting the parking spaces is planned through the server. The street sweeping activity, including times and dates over which street sweeping of the parking spaces will occur, is scheduled. Any requests for reserving the use of the parking spaces during the street sweeping activity are denied. Use of the parking space contemporaneous to the street sweeping activity is managed. The parking availability indicators associated with the parking spaces affected by the street sweeping activity are activated. Occupancy of each of the parking spaces by a motor vehicle is sensed through the nearest vehicle occupancy sensor. The driver responsible for the motor vehicle of the street sweeping activity is notified.

A still further embodiment provides a computer-implemented system and method for providing emergency services notification through a centralized parking services server. A multiplicity of motor vehicle parking spaces are managed through a server. A plurality of smart parking devices that are each physically proximate to least one of the parking spaces are interfaced to the server. A plurality of vehicle occupancy sensors that are also each physically proximate to least one of the parking spaces are interfaced to the server. A plurality of parking availability indicators that are each associated with at least one of the parking spaces are interfaced to the server. Use of the parking spaces is managed. The parking availability indicator associated with each of the parking spaces is activated based on parking availability. Occupancy of each of the parking spaces by a motor vehicle is sensed through the nearest vehicle occupancy sensor. Use of the parking space is processed based on an identity of a driver of the motor vehicle through the nearest smart parking device. Emergency services are notified for an individual through one of the smart parking devices upon request.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 20 is a flow diagram showing a routine for a valet parking service for use in the parking services of FIG. 1.

FIG. 21 is a flow diagram showing a routine for a guided enforcement service for use in the parking services of FIG. 1.

DETAILED DESCRIPTION

Infrastructure

Figure 1:
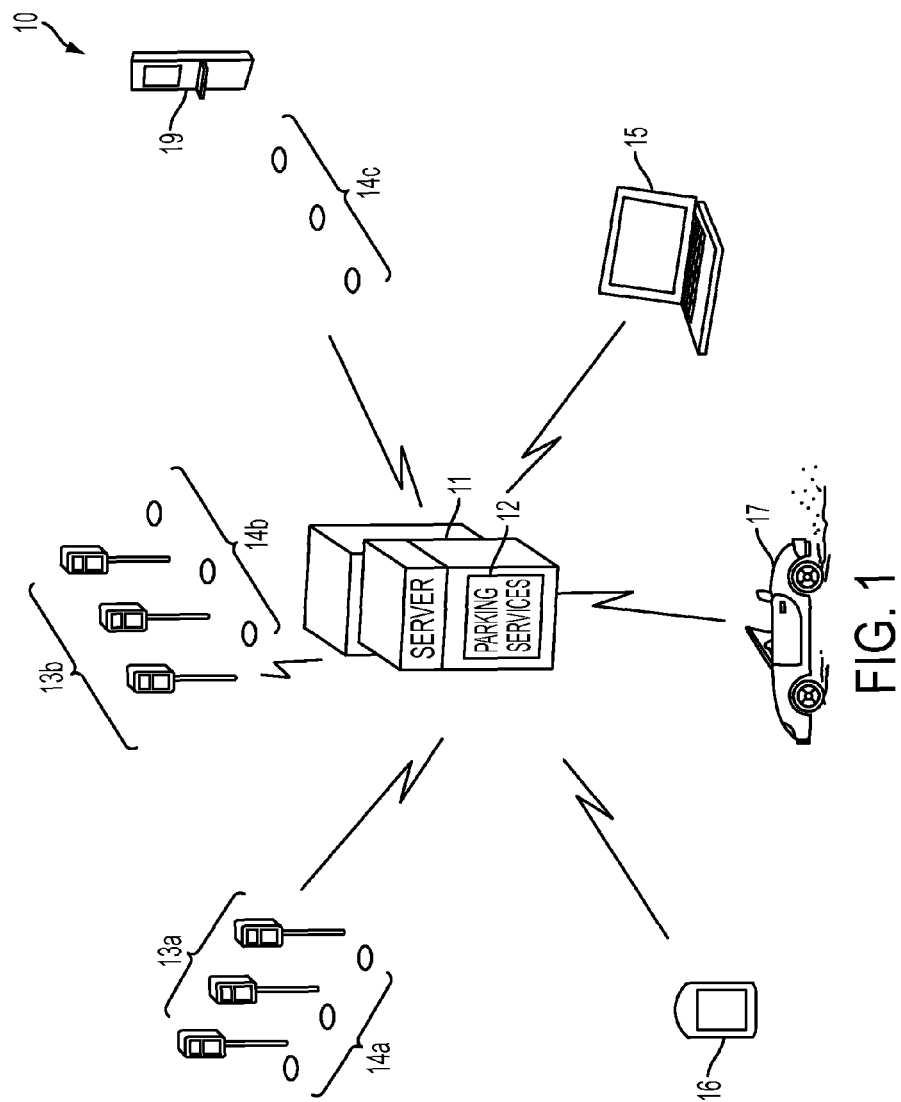
FIG. 1 is a block diagram showing a computer-implemented system for offering commercial parking reservations in accordance with one embodiment.

Real-time and account-based parking services through a network of smart parking devices for controlling and managing all manner of motor vehicle parking. FIG. 1 is a block diagram showing a computer-implemented system 10 for offering commercial parking reservations in accordance with one embodiment. For simplicity, parking, whether controlled by local government or privately owned, and regardless of whether curbside, on a driveway, in cutouts in front of a driveway, within a parking lot, or in other physical locations will henceforth be called "on-street parking," "curbside parking," or simply "parking."

A suite of parking services 12 is provided through one or more servers 11 (hereafter, simply "server"), which are located within a network of smart parking devices 13a-c (hereafter, simply "parking device"), sensors 14a-c, and parking services kiosks 19. The parking services 12 are account-based and enable motorists and other users to determine the availability of, reserve, and efficiently use parking, as further described below in detail beginning with reference to FIG. 3. In general, a "smart parking server, dumb parking meter" approach is followed, where the smart parking devices 13a-c, sensors 14a-c, parking services kiosks 19, and parking indicators (described supra) are nearly stateless and the intelligence, persistent data, and business logic resides mainly in the server. Color-coded indicator lights and countdown timers are displayed by the parking devices, parking services kiosks, and the parking indicators to convey information, even when a car is present. For example, Green indicates that a parking space associated with a parking device (or parking services kiosk) and a set of parking indicators is not in violation, whereas Red shows a violation of some type, such as expired parking time. Such signals can be useful for a parking enforcement officer driving by.

The parking devices 13a-c and parking services kiosks 19 are associated with one or more parking spaces and allow motorists to reserve or transact on-street parking through the parking services server 11. The location of each parking device 21 and parking services kiosk 19 is known. For instance, the location of each parking device 21 and parking services kiosk 19 can be determined and stored onboard beforehand. Alternatively, each parking device 21 and parking services kiosk 19 can be provisioned with a global positioning system (GPS) transceiver and the GPS coordinates can be determined whenever a meter turns on and registers with the parking services 12. Each parking device 13a-c can include a physical parking availability indicator (not shown), either directly interfaced with the parking device 13a-c or remotely connected through the parking services server 11. Physical parking availability indicators audibly or visually signal parking availability to motorists. In a further embodiment, the parking availability indicators are virtual and are provided electronically to motorists using their mobile devices, including notebook or tablet computers 15, smart telephones 16 and similar personal electronic devices, and on-board navigational or informational devices 17. Finally, each parking space has a sensor 14a-c that determines whether a parking space is occupied by a motor vehicle, either directly interfaced with the parking device 13a-c or remotely connected through the parking services server 11.

The parking services 12 and associated parking devices 13a-c and parking services kiosks 19, as well as mobile devices 15, 16, 17, where applicable, implement network security protocols to ensure secure communications. As necessary different secure communications schemes and levels can be applied over all communications. For example, public key cryptography could be used in various secure protocols to protect communications between all system elements.

The specific components will now be discussed in detail.

Multi-Function Smart Parking Devices

Figure 2:
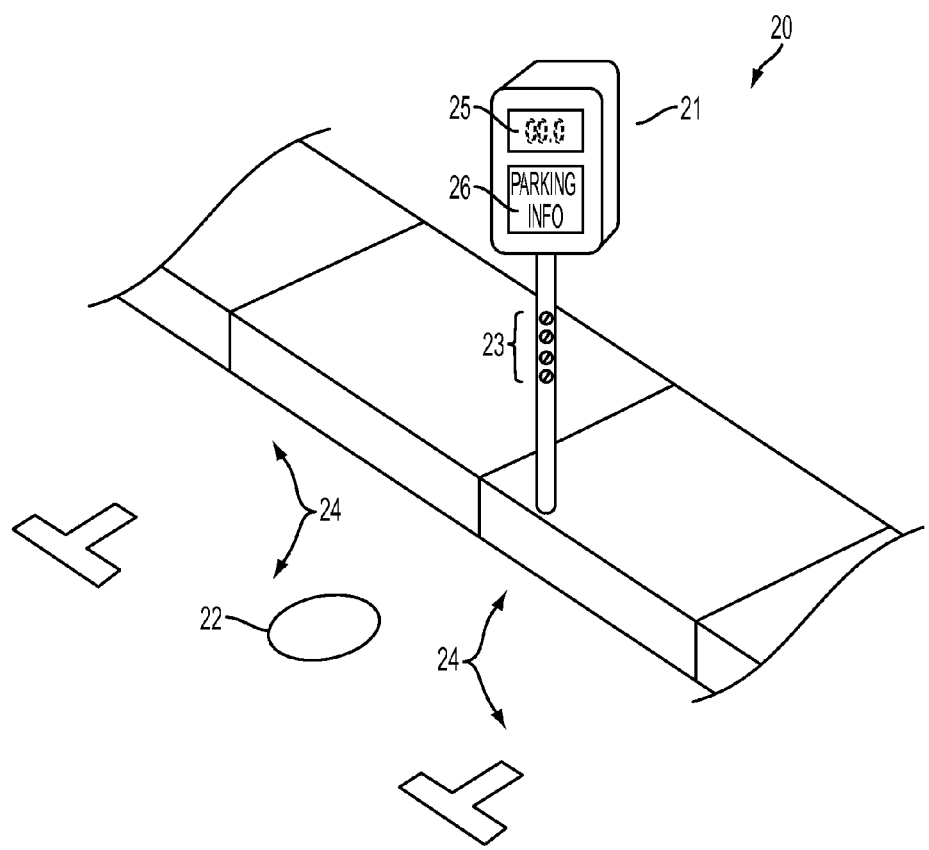
FIG. 2 is an illustration showing, by way of example, a smart parking device with a vehicle sensor and parking indicator for use in the system of FIG. 1.

Smart parking devices are located at or near parking spaces. FIG. 2 is an illustration 20 showing, by way of example, a smart parking device 21 with a vehicle sensor 22 and parking availability indicator 23 for use in the system 10 of FIG. 1. Each parking device 21 is interconnected over a network with the parking services server 11. The parking device 21 can be networked into the parking services 12 through a wired or wireless connection. In the simplest case, each parking device 21 serves a single parking space 24 in a one-to-one relationship. Alternatively, each parking device 21 could serve a plurality of parking spaces 24 in a one-to-many relationship. For instance, at curbside, one parking device 21 could serve two adjacent parking spaces 24. In a parking lot with facing parking spaces, a parking device 21 could serve two pairs of facing parking spaces 24. Finally, several parking devices 21 could serve a multiplicity of parking spaces 24 in a many-to-many relationship; motorists would enter a number painted on the pavement or other identifier that identifies the parking space 24 that they plan to use into one of the parking devices 21.

In a further embodiment, parking services kiosks 19 (shown in FIG. 1) are located nearby to support interactive transactions for one or more parking spaces 24. The kiosks 19 need not be assigned to a specific set of parking spaces and can instead be conveniently distributed to maximize usage within a municipality. A user can simply use any available kiosk 19 to reserve parking, so if a line of waiting users forms at one kiosk 19, the user can move to another available kiosk 19 and avoid further delay. Parking sensor 22 connected to the kiosk could be remotely housed, for instance, in low-profile curbside devices and acoustic and visual feedback could be provided to the driver at the kiosk to interactively transaction parking services. The kiosk could operate through dedicated software, or execute Web-based applications remotely served from the parking services server 11. Other forms of kiosks and kiosk-based functionality are possible.

Each parking space 24 is also equipped with a sensor 22 for determining whether a parking space 24 is occupied by a vehicle. The sensor 22 could be locally connected to a nearby parking device 21 or parking services kiosk 19, or remotely connected to the parking services server 11, which then facilitates communication between the sensor 22 and the nearby parking device 21. The sensor 22 can be networked through a wired or wireless connection. The sensor 22 could be located in a puck or similar robust enclosure fixed onto the surface of the street inside of or proximate to the parking space 24, or could be attached to the street curb. Alternatively, each sensor 22 could be incorporated into a parking device 21 using, for instance, an acoustic- or video-based sensor. Further, like the parking devices 21, the sensors 22 can be configured in a one-to-one, one-to-many, or many-to-many relationship with a set of parking spaces 24. For instance, one video-based sensor 22 could be positioned to simultaneously monitor several parking spaces 24.

Finally, each parking space 24 is equipped with a parking availability indicator 23. The parking indicator 23 could be locally connected to a nearby parking device 21 or remotely connected to the parking services server 11, which then facilitates communication between the parking indicator 23 and the nearby parking device 21. The parking indicator 23 can be networked through a wired or wireless connection. Analogous to traffic lights that indicate when vehicles may enter into intersections, parking indicators 23 indicate when vehicles may use parking spaces 24. Like the parking devices 21 and sensors 22, the parking indicators 23 can be configured in a one-to-one, one-to-many, or many-to-many relationship with a set of parking spaces 24.

Parking indicators 23 can provide physical, typically audible or visual, or digital "virtual" parking availability indications. A physical parking indicator 23 can be in a standalone enclosure or located on a parking device 21 or on a conventional parking device 21 or parking services kiosk 19. Alternatively, a parking indicator can be located in a low-profile enclosure at the curb or on the edge of the curb. A digital parking indicator (not shown) can be broadcast wirelessly to nearby motor vehicles from a parking device 21 or other broadcasting source, such as a wireless transmitter locally connected to a parking device 21 or parking services kiosk 19, or remotely connected to the parking services server 11. A digital parking indicator could also be broadcast over a publically-accessible network, such as the Internet, and delivered to users electronically. For example, portable or mobile devices 15, 16, 17 with GPS or other location-sensing capabilities could retrieve parking status indicators concerning nearby parking spaces. Finally, in one embodiment, a parking indicator 23 is provided for each parking space 24 and is incorporated into a nearby parking device 21. Alternatively, a parking indicator 23 can be in the form of an automated sign or display for a group of parking spaces 24 with indications signifying which spaces are available.

In a further embodiment, simplified parking indicators (not shown) having a lower physical profile than the parking devices 21, for instance, through mounting in a low-profile housing or vertical pole mounted above the street curb or by integration into or attachment onto the street curb itself, are provided for each parking space 24. Alternatively, the simplified parking indicators can be embedded into the curb or within or along the entire length of a parking space, effectively becoming the curb itself, rather than being attached to or otherwise being affixed as a component separate from the curb proper. Whereas with attached parking indicators, naïve motorists may park indiscriminately in parking spaces that are not available for lack of an awareness as to how the indicators work. With a parking indicator embedded into and serving as the curb itself, motorists already understand the correct meaning of color-coded curbs, as typically mandated by traffic codes and parking ordnances, and, as a result, no specialized education as to parking indicator meaning is necessary. A whole curb parking indicator could be provided, for instance, using a low power large-scale display or similar technology.

The parking indicators 23 tell motorists the status of a parking space 24. By way of example, Table 1 provides a list of color indications and their corresponding meanings, along with time-remaining values as displayed on a countdown timer across various parking spaces. The parking indicators 23 can provide a visual status indication, such as through color-coded indicators located on a parking device 21. The indicators can be implemented using incandescent lights, light emitting diodes, reflective surfaces, and similar materials that may only require low power, or be unpowered. Under one color coding scheme, a solid red indicator means that parking space 24 is not available at the moment, a solid yellow indicator means that the parking space 24 is only available for a short time period, such as less than two hours, and a solid green indicator means that the parking space 24 is available for a long time period, such as two hours or longer. Analogous to blue markings for handicapped parking, a solid blue indicator means that a special permit, such as issued to handicapped motorists, is required. In a further embodiment, the color scheme can be extended beyond showing availability to indicating that the time allotted to park has expired, such as by displaying a solid red indicator to the parked motorist. Other color-coded lighted indicators are also possible.

Alternatively, visual labels or icons could be presented in lieu of a static color-coded indicators. For instance, a label or icon could signal to a motorist that the time has expired or that the parking space is reserved. The amount of time available at a parking space 24 could also be shown through a label or icon. Similarly, a visual label or icon could clarify what type of permit is required to park, such as a handicapped parking permit. Other visual labels or icons are also possible.

As well, color-coded lighted indicators could be combined with flashing indicators. A red flashing indicator could be used to indicate a parking violation or expired time. A yellow and blue flashing indicator could be used to signal a reserved loading zone available for a short time period. Finally, a red and blue flashing indicator could be used to indicate a parking space reserved for a guest motorist.

TABLE 1

| Context | Blue | Red | Yellow | Green |
|---|---|---|---|---|
| Car just arrived | | | Grace period Counter: Check-in countdown | |
| Car parked | Permit required Counter: Paid time remaining | Violation Counter: Time overdue | Payment expiring Counter: Paid time remaining | Paid. No Violation Counter: Paid time remaining |
| No car | Permit required Counter: Time available | No Parking Counter: Time until parking available | Limited availability Counter: Time available | Parking Available Counter: Time available |

Other colors, color combinations, and arrangements of solid, flashing, graduated, or adjusted lighted indicators could also be utilized as parking indicators. Similarly, indicators other than colors, such as shapes, positions, alphanumeric symbols, or icons, could be used to differentiate states of parking availability. In one embodiment, color and shape combinations similar to conventional traffic signs can be used. For example, to indicate the non-availability of a parking space 24, a plain red octagonal shape or a red octagonal shape labeled with the word "Stop" could be displayed. Alternatively, a circular shape labeled with the word "Park" could be displayed with a diagonal line crossing out the word "Park" to indicate no parking. Finally, the color green could be used with a circle, the color yellow with a triangle, and the color blue with a square, as used in some forms of traffic signage.

The parking device 21 can also serve a parking indicator function. In one embodiment, each parking device 21 can also have an indicator or display 25, preferably located at the top of the device to enhance viewing by drivers, showing the time remaining in a parking period. In a further embodiment, each parking device 21 can also include an additional indicator or display 26 for presenting other information, such as public service messages or advertising. When a car is parked in the parking space 24 associated with the parking device 21, the display 25 can show the time remaining before parking expires. The display 25 could transition to a red indicator when the time has expired, analogous to conventional parking device 21 or parking services kiosk 19s. When the parking space 24 is available, the display 25 could show how much time is left before any applicable time constraint is reached. For instance, another motorist may have separately reserved the parking space 24 through the parking services server 11, but the parking space 24 is otherwise available up through the time of the reservation. As well, parking may become unavailable due to scheduled street cleaning or other event. A color overlay could be provided over the time indication in the display 25 to assist user understanding.

The parking devices 21, whether standalone or configured through a kiosk 19, interface motorists and other users with the parking services server 11. Each parking device 21 and kiosk 19 includes a user interface (not shown) for identifying which parking space 24 is being reserved and determining the user's identification. When booking a reservation, the parking device 21 or kiosk 19 undertakes an abbreviated "Hold this Space" service transaction, described infra, with the user. The particular parking space 24 can be indicated, for example, by displaying the location of the space on a map. The user's identification is indicated using an account number, credit or debit card number, or other unique identifier that can be provided to the parking device 21 or kiosk 19 through a magnetic strip or bar code reader for scanning electronic banking cards, driver's licenses, parking identification cards, or other forms of identification. Exemplary electronic banking cards include credit cards and debit cards. Alternatively, the parking device 21 or kiosk 19 can accept wireless transmissions, for instance, using Bluetooth, Wi-Fi, or Wi-Max protocols, or wired transmissions of the user's identification from a mobile device 15, 16, 17, such as a smart mobile telephone, notebook or tablet computer, or similar personal electronic device. In a further embodiment, the parking device 21 can include a camera or other input device to visually scan the user's face or read the license plate of a motorist's vehicle, a wireless transponder to retrieve a radio frequency identification (RFID) tag on the motorist's vehicle, or other sensor to identify the requesting user or the vehicle parked. In a still further embodiment, each parking device 21 and parking services kiosk 19 can include a pair of cameras, a street-side camera (facing the street) and a curbside camera (facing the sidewalk).

Parking Services Server

Figure 3:
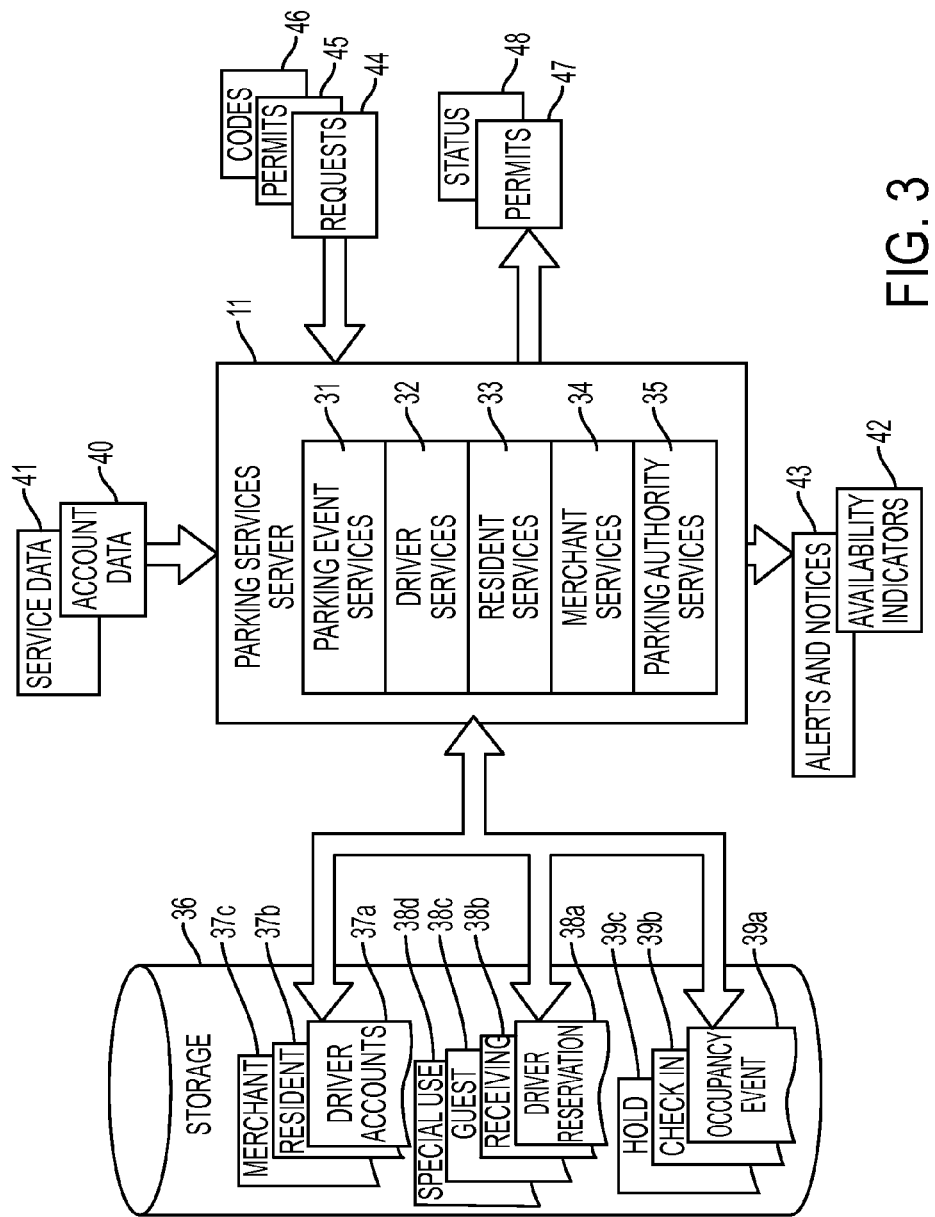
FIG. 3 is a functional block diagram showing the parking services of FIG. 1.

The parking services 12 are account-based. FIG. 3 is a functional block diagram 30 showing the parking services 12 of FIG. 1. The parking service 12 are supported by a set of services (not shown). The parking services 12 and the services are implemented in software and execution of the software is performed as a series of process or method modules or steps.

Both the parking services 12 and the other related support services may be executed on one or more computer systems, which may singly or in combination logically constitute a particular form of "server." For instance, in one embodiment, a Web server delivers Web pages and content to Web-based clients, such as Web browsers executing on mobile devices 15, 16, 17. The Web server can be implemented using more than one computer, depending upon the load.

Similarly, the provisioning of the system functionality is divided between the one or more servers and the various end-user devices with which a motorist directly interfaces, such as parking devices 21, parking services kiosks 19, and mobile devices 15, 16, 17. Programmatic duties are divided between the software that runs in each end-user device and the servers. The division of labor balances several competing goals, which includes a low power requirement for the end-user device, fast user interaction response, and keeping end-user device programming relatively simple.

Additionally, the Web server may be supported by caching servers that cache the Web content and help reduce bandwidth consumption and system load. The caching servers may also be implemented using more than one computer. System state for the parking services 12 is kept in a database server, which keeps track of the state of all of the parking devices 21, parking services kiosks 19, and sensors 24, all of the parking accounts, all of the permits, all of the parking citations, all of the billings, all of the parking policies, and so forth. The database server may be implemented using more than one computer. As well, the suite of services can also be fielded by through cloud computing. Henceforth, for simplicity, the set of services will be discussed without regard to the nature of the implementing servers or the underlying physical topology of the supporting computers, except as specifically noted.

At any given time, several coordinated processes execute across the servers. Depending upon the scale of the system, several computers may need to work together to carry out each of the services. One set of the services is engaged with the collection and verification of requests for new services and changes to existing services. City officials or parking authorities that establish new parking policies present a special case of the services. For example, they may need to initiate a new parking regulation, which applies over certain hours on certain days. The rules and parameters for the service could be expressed through a description language for permits, regulations, and the like, with parameters in the language corresponding to policy considerations, what rights are enabled, and cross references to other regulations and permits. The parking officials specify the parameters governing what regulations apply in what geographic parts or blocks of the city. Thus, the parking officials would be able to state that a parking regulation for a loading zone has an exception when a parking account includes a "loading zone permit," but would be enforced differently when a parking account has only a "visitor permit" and so forth.

Another set of the services steps through all of the pending parking events. For example, certain parking restrictions may apply concerning street sweeping beginning at 2:00 pm. When 2:00 pm occurs, any status changes for the parking devices 21 and parking services kiosks 19 on the affected streets are determined, which can include setting their associated parking indicators 23 to signal "No Parking." Additionally, warnings may need to be sent to subscribed users, typically motorists who have parked on the affected streets, as well as information to parking authorities to guide them to parking violations. Still another set of the services take in new parking reservations, which can include comparing a request to park in a parking space 24 near a particular parking device 21 with other constraints on the use of that parking space 24.

Users interface with the parking services 12 either directly by using a parking device 11 or parking services kiosk 19. Users can also interface with the parking services 12 remotely over a network using a user device through a wired or wireless connection. User devices include mobile devices 15, 16, 17, such as smart mobile telephones, notebook or tablet computers, or similar personal electronic devices. The parking devices 21 and parking services kiosks 19 also have user interfaces that interact with the parking services 12. Yet another set of the services can download either parameters or application programs to the parking devices 21 and parking services kiosks 19 to drive interactions with users.

From a user's standpoint, the parking services 12 are accessible through parking devices 11 that are associated with one or more specific parking spaces, parking services kiosks 19 that are generally associated with a set of nearby parking spaces, and user devices that allow access to all of the parking spaces managed by the parking services 12. Functionally, parking services 12 are provided in five functional areas, which include parking event services 31 to handle parking events, driver services 32 that assist motorists in reserving a parking space 24 or other needs, resident services 33 that cater to the particular needs of urban denizens, merchant services 34 that enable local businesses to obtain parking for customers and related needs, and parking authority services 35. The specifics of each parking service functional area are further described infra. Other functional areas are also possible.

Parking services are provided through a set of parking accounts 37a-c respectively for drivers, residents, and merchants. Other types of parking accounts are possible. The parking accounts 37a-c are maintained in storage 36 coupled to the parking services server 11. Express, temporary, and implicit parking accounts can also be used. An express parking account is the norm, whereas a temporary parking account is not permanently stored and an implicit parking account is generally created for a single parking event.

The parking accounts 37a-c provide a parking identity to motorists and other users, enabling transaction-based approaches to reserving, billing, and managing parking. A parking identity can be established through a parking account 37a-c. A parking identification card can be issued for a parking account 37a-c. Alternatively, an electronic banking card, driver's license, telephone calling card, motor vehicle license plate number, or other driver-unique information could be associated with a parking account 37a-c in lieu of a parking identification card. In the situation where a motorist does not want to check in by using, for instance, the electronic banking card or other driver-unique information associated with his parking account, alternate forms of authentication could be used, such as sending a text message to the motorist's mobile phone and asking him to confirm that he is the person attempting to check in to a parking reservation. Additionally, a driver may have multiple parking identification cards for other family members or for loaning to guests temporarily. Finally, temporary parking identification cards may be issued by various organizations that cater to tourists, business travelers, and other people, such as tourism bureaus, rental car companies, and other organizations.

Users with parking accounts 37a-c can make parking reservations and include their parking preferences, such as automatically extending their parking time by some preset amount of time when they overstay a paid parking period, assuming that no other constraints precludes an automatic parking time extension. The parking services 12 maintain a set of reservations 38a-d respectively requested on the basis of driver, recurring, guest, and special use needs. Other types of parking reservations are possible. During parking operations, the parking services 12 also track a set of parking events 39a-c respectively for occupancy, check-in, and holding a parking space 24 in real time. Other types of parking events are possible.

During operation, parking is consumed by real time requests 44 for parking from users, who are primarily motorists and the overall status 48 of parking availability is continually revised through the parking accounts 37a-c, sensor data 40, and parking device data 41. In addition, depending upon the type of parking sought, users may also physically submit parking permits or coupons 45, such as issued by a resident host or merchant, or electronically submit parking codes 46, which are processed and validated by the parking services server 11.

As required, availability indicators 43, user notices and parking alerts 43, and other information are sent out, either through a physical device, such as via a parking indicator 23 or the display 25 on a parking device 21, or by electronic transmission to user's mobile devices 15, 16, 17. Other types of input data or output information are possible.

Parking privileges can be added to a parking account 37a-c by a user at will. Parking privileges can be indicated by a physical permit that the user presents to a parking device 21, or using a digital tickets or permits that are electronically transmitted by the parking services 12. Parking privilege permits include permits for delivery vehicles, tourist vehicles, street cleaning exemption passes, fleet or bulk rate charges, special use, valet parking, taxicab parking, and other privileges. The privileges can include receiving bulk parking rates, priority parking, handicapped or senior citizen parking, special event or one-time use parking, such as would be helpful for tourists or other occasional visitors, and so on. Additionally, permits for using a parking space 24 for non-parking purposes, for instance, to provide a drive-up concierge or valet service or to facilitate road maintenance or building construction, could also be provided through a parking account 34a-c. Furthermore, monthly or periodic charges for parking could be billed directly to an electronic banking card, such as a credit card or debit card, or through other pre-set payment arrangement, including an account with an acquirer that performs payment processing for commercial vendors, as maintained in a parking account 37a-c.

The specific types of parking services 12, along with illustrative parking policies and scenarios of use, will now be discussed. Although each of the services is described in the context of a particular user or situation, such as a driver or urban resident, or recurring or shopper parking scenario, the services are not limited to just that class of users or situations, and can be equally applicable to all other users and situations, irrespective of specific characteristics, such as place of residence or parking. Moreover, although each scenario is presented with parking reservation, check-in, and related steps occurring in a particular order, variations on the specific ordering of steps may apply and should not be interpreted as limiting. For example, when booking a parking reservation is made using a credit card, the system could request a credit card authorization and place a hold on the parking space being reserved to make sure that nobody else reserves that parking space while the user is awaiting completion of the authorization. Alternatively, the system could authorize the reservation before knowing exactly how much time a user wants to reserve the parking space. Different combinations, orderings, and sequences of steps could apply depending upon the applicable parking policies, the preferences of the parking authorities, and related considerations. As well, in later scenarios, some steps may be skipped for clarity of presentation, where those steps can be implied from the context. Finally, parking indicators, such as color-coded or text-based indicators that tell motorists the status of a parking space 24, can be displayed on parking indicators 23, a parking device 21, or a kiosk 19, but for clarity of discussion, the parking indicators will be assumed to be displayed on parking indicators 23 alone, unless otherwise stated. Similarly, a motorist can interface with the parking services 12 through the user interface of a parking device 21, a kiosk 19, or mobile device 15, 16, 17, but for clarity of discussion, user interfacing will be assumed to be transacted through a parking device 21 alone, unless otherwise stated.

Parking Event Services

Service: Show Parking Availability

Figure 4:
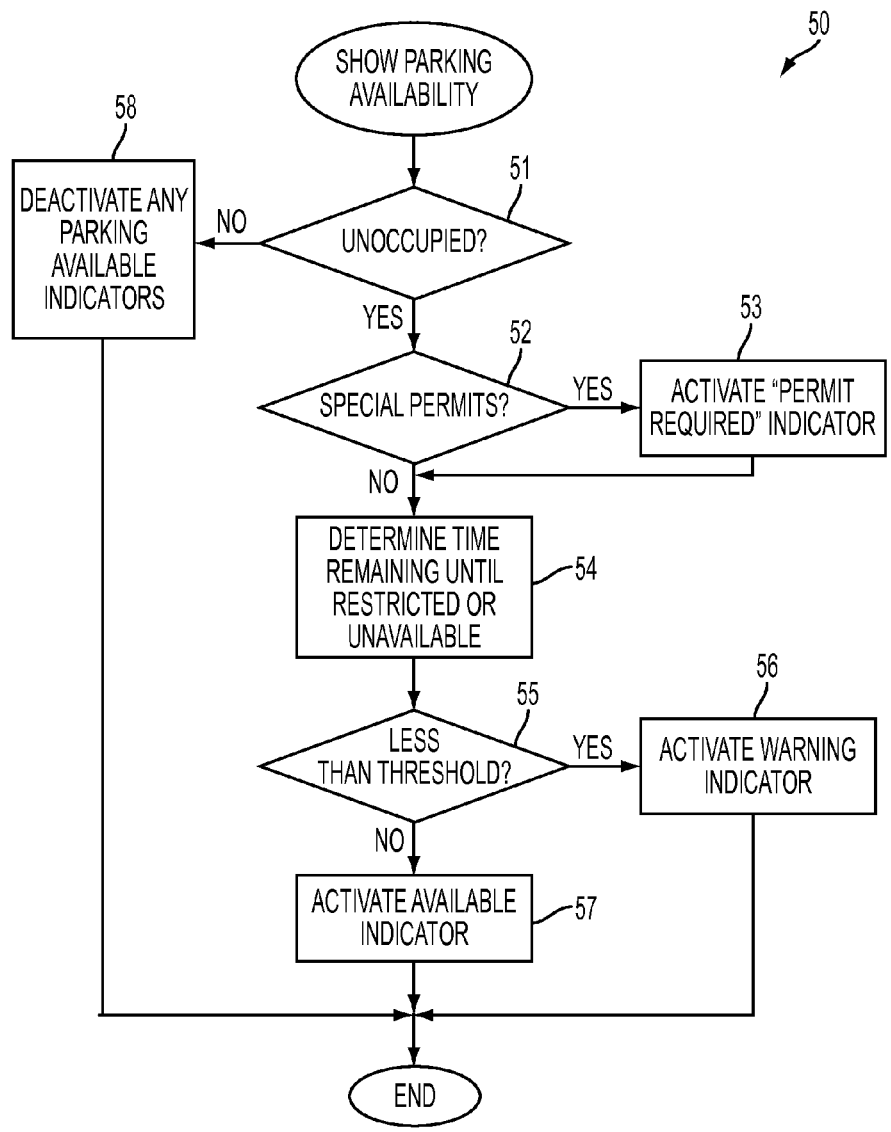
FIG. 4 is a flow diagram showing a routine for a show parking availability service for use in the parking services of FIG. 1.

Each parking space 24 has a display 25 showing its parking availability. FIG. 4 is a flow diagram showing a routine for a show parking availability service 50 for use in the parking services 12 of FIG. 1. If a parking space 24 is occupied (step 51), any parking available indicators are deactivated (step 58), although the parking device 21 or kiosk 19 may display a "Meter Expired" or similar notice or signal if a vehicle occupies the parking space beyond the allowed time. Otherwise, if the parking space 24 is unoccupied (step 51), the parking services 12 periodically determine whether any special permits are required to park in that parking space (step 52). A special "permit required" indicator is activated for the parking indicator 23 located at the parking space (step 53). The indicator can be provided through a combination of permit color, such as through a variation on the blue color used for handicapped parking permits, and further information identifying what permit is needed through the parking device's display 26.

The time available for parking is then determined (step 54). The time remaining might be limited, for instance, due to an upcoming reservation for the parking space or under regulations that prohibit parking during certain hours for traffic throughway, requirements for a special permit, street cleaning schedules, or special events. If the amount of time available is less than a threshold (step 55), such as two hours, a warning indication can be used (step 56), such as through a cautionary yellow indicator. If the time available is more than the threshold (step 55), an available indication can be used (step 57), such as through a green indicator.

In one embodiment, the choice of colors and their assigned meanings can be varied. For example, one variation might use blue, rather than red, to indicate that a space is reserved. Other variations might use blinking colors, such as blinking red, to indicate a parking violation, blinking yellow and blue to indicate a reserved loading zone, and red with blinking blue to indicate a parking space reserved for a guest. Still other color variations are possible.

Service: "Log Occupancy"

Figure 5A:
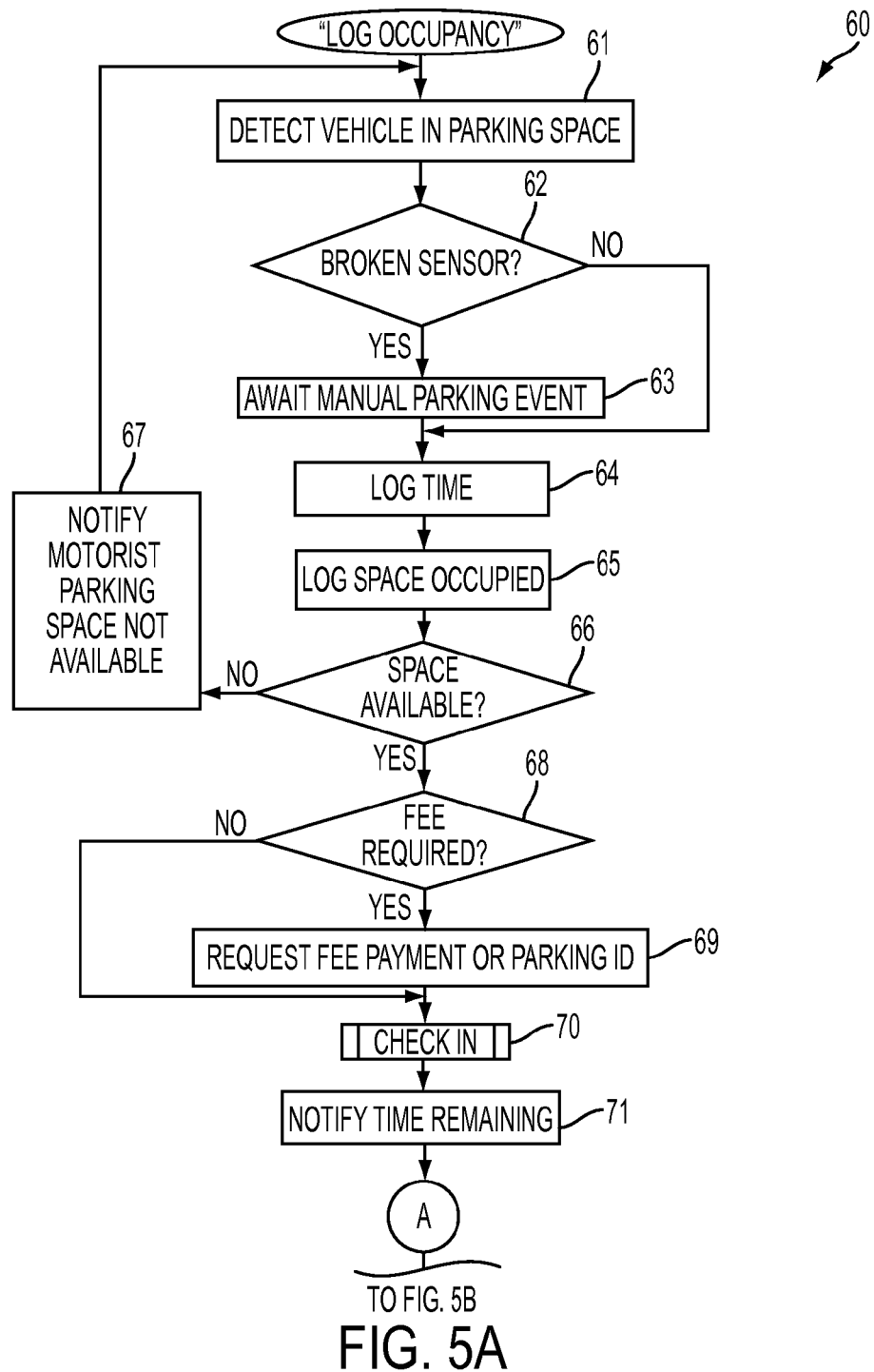
FIGS. 5A-5B are flow diagrams showing a routine for a "log occupancy" service for use in the parking services of FIG. 1.
Figure 5B:
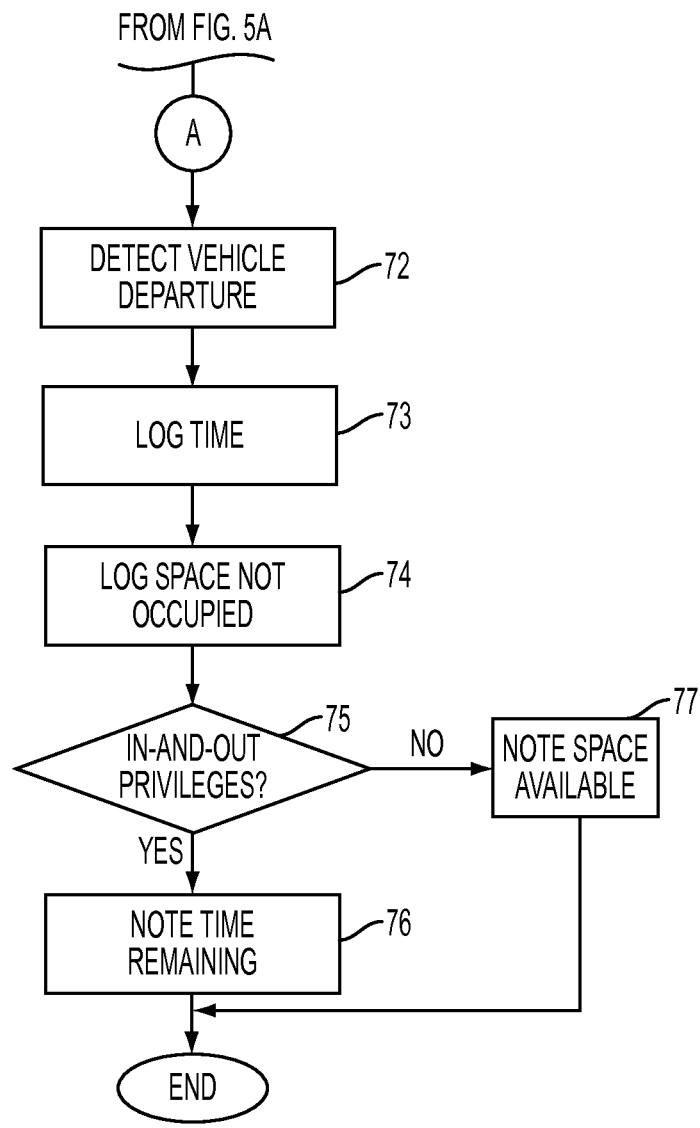

The "Log Occupancy" service notes when a vehicle has entered a parking space 24. FIGS. 5A-5B are flow diagrams showing a routine for a "log occupancy" service 60 for use in the parking services 12 of FIG. 1. In one embodiment, the bulk of the business logic runs on the servers. For example, in providing the "Log Occupancy" service, the interpretation of data from each sensor 22 to answer the question, "is there a vehicle present?" runs on the associated end-user device, while the remaining code executes on the server. Changes in the status pertaining to vehicle occupancy or vacancy are communicated to the server, which server then applies rules about what information to send back to the end-user device. For instance, the server must access the parking accounts 37a-c maintained in storage 36 to retrieve information about the motorist and the parking space reservation to determine whether "in-and-out" parking privileges or other considerations may apply. The server then sends a message back to the end-user device and requests the associated parking device 21 or parking services kiosk 19 to update the parking availability indicator 23 appropriately or display some other message.

This service begins when a sensor 22 detects that a vehicle is in the parking space (step 61). If the sensor is working properly (step 62), either the parking device 21, parking services kiosk 19, or the parking services 12 log the time that the vehicle entered the space (step 64) and that the space is now occupied (step 64). The information is relayed to the parking services 12, as applicable. If there is no parking sensor 22 or the sensor 22 is broken (step 62), the event can be started when a user manually provides a parking identity to the parking device 21 or electronically transmits a parking identity and indicates that parking has commenced (step 63).

Based on the parking status information maintained by the parking services 12, this event can now trigger other actions. For example, if the parking space 24 is not available (step 68), such as when the motorist has parked in a parking space 24 that has been reserved for someone else, the motorist can be notified that the parking space 24 is not available (step 67). Presumably, the motorist will immediately return to his vehicle and leave the parking space 24. However, if the motorist ignores the notification of parking space unavailability and tries to check in, the parking device 21 will disallow the check-in attempt and, if possible, offer a different parking space 24, as further described below with reference to FIG. 6. Otherwise, if the parking space 24 is available and a fee is required to park (step 68), the parking device 21 can remind the driver to pay the fee for parking (step 69), either by depositing cash, coins or other form of physical payment, or providing a parking identity for billing. Following payment, the driver undertakes check in (step 70), as further described below with reference to FIG. 6. The driver can also be sent an alert 43 that states how long parking is permitted (step 71), such as by time remaining. This operation is typically followed by a "check in" service when the motorist approaches the parking device 21 or kiosk 19.

The "Log Occupancy" service also detects when a vehicle has left the parking space 24 (step 72). The parking device 21, parking services kiosk 19, or parking services 12 log the time that the vehicle left the parking space (step 73) and that the space is not occupied (step 74). The parking space 24 may be unoccupied, yet remain unavailable, such as where a recurring reservation exists for the now-unoccupied parking space 24. Thus, if in-and-out privileges for the parking space 24 exist (step 75), the parking indicator 23 shows that the parking space 24 is not available and the time remaining on the reservation is noted (step 76). Otherwise, the parking indicator 23 shows that the parking space 24 is now available for use (step 77).

The foregoing description "Log Occupancy" service provides a basic framework of initial actions triggered by occupancy or vacancy of a the space 24. Further steps may be included. For instance, applicable parking policies may provide buffers of time between events, such as providing a grace period to enable a newly-parked motorist to complete check-in, a grace period for arriving late for a parking reservation, blackout periods between parking reservations, and how to handle interactions when someone arrives early for a reservation.

Service: "Check-in"

Figure 6:
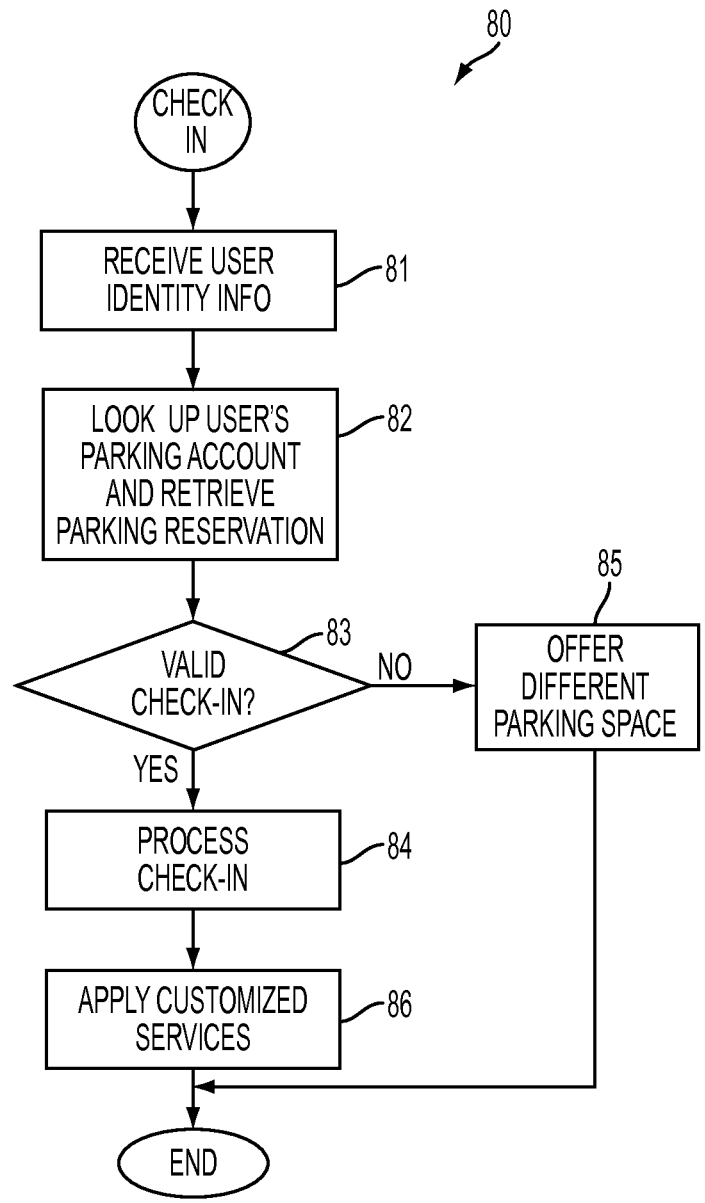
FIG. 6 is a flow diagram showing a routine for a "check-in" service for use in the parking services of FIG. 1.

The "Check-In" service is used when a motorist goes to a parking device 21 to provide a parking identity, or to request another service. FIG. 6 is a flow diagram showing a routine for a "check-in" service 80 for use in the parking services 12 of FIG. 1. Check-in is physically performed at a parking device 21 or, if applicable, a nearby parking services kiosk 19. Check-in could also be carried out virtually, that is, remotely using a wirelessly-interfaced mobile device 15, 16, 17, such as a smart mobile telephone, notebook or tablet computer, or similar personal electronic device, that is connected to the parking information server 11 over a wired or wireless network.

In one embodiment, the bulk of the business logic of check-in runs on the server, while the associated parking device 21 or parking services kiosk 19 scans the motorist's identification and sends back the scanned data. The server then processes the service request, including checking that the parking space 24 is available to the requesting motorist and is not already reserved to someone else. If the parking space 24 is not available to the motorist checking in, the server may attempt to locate an alternate nearby parking space 24, which is then displayed by the associated parking device 21 or parking services kiosk 19.

A motorist driving to a reserved parking space 24 out of which a previous motorist has not yet moved his car 24 could be sent a courtesy notice from the parking services 12 advising that the reserved parking space 24 is still occupied. The system could offer the incoming motorist a reservation of another nearby parking space 24 or provide compensation for the inconvenience, such as free parking, credit towards their next parking reservation, and so forth.

In terms of parking policies, a minimum hand-off interval can be utilized to permit the hand-off from one motorist to the next, thereby allowing some leeway in case the first motorist is late getting back to his car or the reserving motorist arrives a little early. In one embodiment, a 15-minute hand-off interval is used, although other hand-off intervals could be used, as well as foregoing a hand-off interval entirely, depending upon the applicable parking policies, the preferences of the parking authorities, and related considerations. Similarly, a minimum time interval can be utilized to allow the driver of a currently parked vehicle some leeway in getting back to their vehicle before a reserved parking space is expected to be vacated. In one embodiment, a 15-minute leeway interval is used, although other leeway intervals could be used, as well as foregoing a leeway interval entirely, depending upon the applicable parking policies, the preferences of the parking authorities, and related considerations. A maximum grace period can be utilized to allow the driver of a just-parked vehicle to check in. In one embodiment, a two-minute check-in grace period is used, although other check-in grace periods could be used, as well as foregoing a check-in grace period entirely, depending upon the applicable parking policies, the preferences of the parking authorities, and related considerations. Additionally, a late arrival grace period can be set during which allows holders of parking reservations can arrive late, but not too late, and still use their reserved parking space 24. However, beyond the late arrival grace period, the parking space 24 becomes available for parking by other motorists.

Check-in is started after a vehicle has been parked and when a user provides his parking identity (step 81) or other identifying information, either directly or remotely, to the parking services 12 after parking. Drivers are able to use any of several convenient approaches to provide their parking identity. For example, a driver could present a form of physical identification, such as an electronic banking card, driver's license, or a parking identification card, through a magnetic card reader or other input device integrated into the parking device 21. Alternatively, the parking device 21 may employ biometric input, such as a fingerprint or retina pattern scanner. The parking device 21 could also include a camera or other input device to visually read the license plate of a motorist's vehicle, a wireless transponder to retrieve a radio frequency identification (RFID) tag on the motorist's vehicle, or other sensor to identify the vehicle parked and the user's parking identity derived from his vehicle information. The parking device 21 could also incorporate a camera with which to read a barcode, Quick Response ("QR") code, which is a two-dimensional barcode that is readable by the parking device 21, as well as barcode readers, mobile telephones with integrated cameras, and similar devices, or other unique digital record presented by the motorist as a form of identification. Finally, the server could be asked to call the motorist and request confirmation via a handheld mobile device, such as a smart phone, or similar device. Still other forms of motorist identification are possible.

If the parking space is already reserved 24, the system must check that the driver is allowed to check in. In the simplest case, the driver checking in is the person who made the reservation, or a person sharing the same parking account. If the driver is disallowed from checking in, such as where the parking space 24 is already reserved for somebody else, the system could offer to reserve a nearby parking space for their convenience. The parking services 12 could also provide more help in finding an alternate parking space B, such as by sending GPS coordinates, text directions, or an image map to the motorist's mobile device.

Thus, the parking services 12 use the motorist's parking identity to access the corresponding parking account 37a-c and retrieve his parking reservation (step 82). The parking services 12 determines whether the parking reservation is valid (step 83). For instance, if the parking space 24 is already reserved for somebody else, check-in will be disallowed and, if possible, the parking services 12 will offer a different parking space 24 (step 85). If valid, check-in is processed (step 84) by matching the motorist and vehicle identities to the reservation. As well, providing a parking identity to the parking services 12 at check-in enables the server to customize and apply the parking services offered to the user based on settings in the user's parking account (step 86). For instance, if a motorist has a permit that overrides time constraints that would otherwise limit the parking time, the parking services 12 would cause the parking device 21 or parking services kiosk 19 to display the time available, taking into account any permits, or digital tickets or permits, as further described infra, that are associated with the motorist's parking account 37a-c. Check-in also enables a user to simply pay for parking, either by cash or with an electronic banking, such as a credit card or a debit card, without establishing a parking account. This operation is typically followed by a "Hold This Space" service, as further described below with reference to FIG. 7.

A blackout period between parking reservations, that is, a short vacancy period may be allotted between occupancies of a parking space 24 to allow a safety margin in case the previous occupant is late in moving his vehicle. When appropriate, the parking services 12 can enable guided enforcement, as further described below with reference to FIG. 21. Notwithstanding, traffic enforcement authorities or the tow truck may be delayed, or other circumstances may intervene, so that a reserved parking space is still occupied when a driver with the reservation arrives. To promote customer satisfaction, various remedies may be offered to assist the inconvenienced driver. For example, the parking services 12 may automatically reserve another available nearby parking space 24 for the driver, which could even be a parking space 24 that normally requires a special permit. Alternatively, the driver could be offered financial compensation for the inconvenience. As well, a valet could be provided at the occupied parking space 24 to take care of parking the driver's car and providing him with transportation to and from the new parking space 24. Still, other forms of remedy are possible. Finally, the level of remedial compensation may be keyed to a parking service level analogous to airline reservations, which offer economy, business, and first class service levels.

A couple of scenarios are now presented to help demonstrate how the parking services 12 handles situations commonly occurring during parking check-in. The first scenario illustrates the handling of a would-be parking freeloader, that is, someone who attempts to park in a parking space 24 where they are not permitted. Here, a motorist named Alice has a parking reservation for 2 pm in parking space A. The scenario begins at 1:45 pm, with the parking indicator 23 for parking space A displaying Red (reserved and not available).

| Time | Event |
|---|---|
| 1:46 pm | Ed is cruising for parking. He ignores the red indicator displayed on the parking indicator 23 nearest Alice's parking space 24, which indicates that the parking space 24 is reserved and not available. Ed pulls his vehicle into the parking space 24.<br>The vehicle sensor 22 detects the occupancy of Alice's parking space 24 by Ed's vehicle and sends a message to the parking services 12, server saying that the parking space 24 is now occupied.<br>The server notices that the current time is within the minimum hand-off interval ahead of the start of Alice's reservation. The server sends a message to the parking device 21 nearest Alice's parking space 24 that instructs the parking device 21 to enter the "Reserved Check-In" state. |
| 1:47 pm | The parking device 21 presents the message, "This parking space is reserved. Please check in." |
| 1:48 pm | Ed approaches the parking device 21 and decides to try to check in with his credit card.<br>The server determines that Ed's credit card is not associated with Alice's reservation. As a public service, the server looks for other available parking nearby and determines that parking space B is available for 90 minutes at the rate of $1.00 per hour. The server also determines that the reservation fee is $1.00 and sends a message to the parking device 21 with this information, also instructing the parking device 21 enter the "Offer-Nearby-Reservation" state.<br>The parking device 21 opens a user interface to convey the following information to Ed:<br>(1) "Sorry, but this parking space is reserved for someone else."<br>(2) Nearby parking space B is available right now for 90 minutes at the rate of $1.00 per hour.<br>(3) The parking services 12 can reserve the parking space B for you (Ed) right now for a reasonable reservation fee of $1.00.<br>The user interface prompts Ed to either press the "OK" button to make the reservation, or the "Cancel" to decline.<br>Ed presses the "OK" button.<br>The parking device 21 presents a default parking period of one hour and asks Ed to select the appropriate amount of time (up to 90 minutes maximum), pressing the "OK" button when finished.<br>Ed presses the '+' and '−' buttons on the user interface to adjust the amount of time desired, but ultimately settles for one hour and presses "OK."<br>The parking device 21 sends a message to the server indicating that Ed has accepted the reservation and has requested one hour of parking time.<br>The server checks the authorization of Ed's credit card, which succeeds. The server places charges of $1.00 for parking and $1.00 for the reservation on Ed's credit card and sends a message to the parking device 21 to enter the "Clear-Parking-Space" state. |
| 1:49 pm | The parking device 21 opens a second user interface for Ed conveying the information:<br>(1) Parking space B has been reserved for him.<br>(2) His credit card has been charged $1.00 for the prepaid time and $1.00 for the reservation. He should park his car in the new parking space within 15 minutes. He needs to vacate parking space A right now for the person who reserved that space. |
| 1:50 pm | Ed leaves parking space A and drives to parking space B. The parking indicator 23 notices that parking space A is vacant, which is reported by sending a message to the server.<br>The server notices that the parking space is within the minimum hand-off interval ahead of the start of Alice's reservation. The server again sends a message to the parking device 21 nearest Alice's parking space 24 that instructs the parking device 21 to enter the "Reserved Check-In" state. |

The first scenario illustrates what happens when someone parks in a parking space 24, where they are not permitted to park, by either parking in a reserved space 24, or parking without checking in. In either case, from the perspective of the parking services 12, the situation boils down to what happens when the check-in grace period times out. An additional complexity arises when the parking space 24 is already reserved and the person who made the reservation must be notified of the unavailability of the parking space 24. For instance, if a reserved parking space 24 is occupied by somebody else, the motorist could get some type of refund. Additionally, the parking services 12 could permit the disappointed motorist to choose another parking space 24 by simply swiping her electronic banking card, such as a credit card or a debit card, at the parking device 21 nearest the new space to move the reservation to the current parking location. Here, Alice again has a reservation for 2 pm in parking space A. The scenario begins at 1:30 pm, with the parking indicator 23 for parking space A displaying Yellow.

| Time | Event |
| --- | --- |
| 10 am | Alice reserves parking space A for two hours online, starting at 2 pm through a Web site operated by the parking services 12. The server approves and validates her parking reservation.<br>At the current time, the system only notes the reservation and no communication with the parking device 21 nearest Alice's parking space 24 is needed. The parking indicator 23 continues to display Green and the parking device 21 displays a countdown of the amount of time available ahead of Alice's reservation (four hours). |
| 1 pm | The system instructs the parking indicator 23 to display Yellow and the parking device 21 to start a 60-minute countdown because Alice's reservation of parking space A begins in an hour at 2 pm. |
| 1:40 pm | Jim, a scofflaw, pulls into parking space A and leisurely goes to a late lunch, ignoring the check-in message on the parking device 21. Note: to get to the check-in state, the vehicle sensor 22 determines a car has parked and notifies the server. The server tells the parking device 21 to enter a check-in state and begin a countdown showing the check-in grace period, as well as instructing the parking indicator 23 to display Yellow. |
| 1:42 pm | The parking device 21 powers down the elapsed check-in display. |
| 1:45 pm | The server notices that the check-in grace period has elapsed, the user has not checked-in, and the parking space 24 remains occupied. The server initiates an entry for a violation event.<br>The server instructs the parking device 21 to enter a violation state and display the elapsed time of non-compliance. The server also instructs the parking indicator 23 to display Red and requests the parking device 21 to take a picture of the Jim's vehicle. |
| 1:46 pm | The meter parking device 21 takes a picture of Jim's vehicle, which is uploaded to the server.<br>The server logs the picture and begins notification to directed enforcement, identifying the location of parking space A.<br>The server notices that Alice's reservation is at risk. In response, the server identifies and reserves a nearby parking space B for Alice. The server also creates a parking compensation event and records an "award" to Alice, as compensation for her inconvenience. Based on the parameters in Alice's parking account, the server sends her a voice mail or text message alert about revising her reservation to parking space B. |
| 1:55 pm | Alice arrives at her parking space, and sees that her space is taken. She has not noticed the message from the server yet. She instead drives down the street, sees a parking indicator 23 for parking space C that is displaying "Green," and parks in parking space C.<br>The vehicle sensor 22 for parking space C senses occupancy and sends a message to the server, which instructs the parking device 21 nearest to parking space C to begin the check-in process and commence a check-in countdown, as well as instructing the nearest parking indicator 23 to display Yellow.<br>Alice swipes her credit card at the parking device 21, which sends her account information to the server.<br>The server recognizes that Alice has a nearby parking reservation and a compensation event. The server verifies that there is enough time available for parking space C for Alice's reservation and cancels the parking reservation for parking space B. As a courtesy, the server creates a free parking reservation for Alice in parking space C. The server sends a message to the parking device 21 to enter a modify-parameters state and to display information about Alice's compensation event. The system makes notes to remove Alice's charges and to issue the "award" to Alice.<br>The parking device 21 nearest to parking space C conveys the following information to Alice: "We're sorry for the inconvenience for your parking space. For your trouble, we are giving you an award <described>."<br>The parking device 21 shows Alice that parking space C is reserved, beginning immediately, for two hours and ending at 4 pm, at no charge. The parking device 21 offers Alice an opportunity to extend her parking according to any applicable constraints.<br>Alice confirms the parking time and award receipt. The parking device 21 sends a message telling the server of the confirmation and award acceptance.<br>The server instructs the parking device 21 to enter a reserved-parking state and to show a countdown timer to 4 pm. The server also instructs the parking indicator 23 to display Green. |
| 2:00 pm | A parking enforcement officer arrives at Alice's originally-reserved parking space A, "writes" a violation, which includes the violation minutes. The parking fine may include a multiplier based on the amount of time that the vehicle is parked illegally and, optionally, some of the collected money can go towards Alice's award. |

-continued

| Time | Event |
|---|---|
| 2:25 pm | Jim returns to see a parking ticket on his vehicle, shrugs, and drives off. The parking device 21 notes when parking space A is vacated and notifies the server, where the time is noted. This time is used to compute the total fine for Jim's parking ticket. The server tells the parking device 21 nearest to parking space A to set a countdown timer to a value appropriately reflecting the availability of sparking space A in light of any other parking reservations or events, and also instructs the parking indicator 23 to display Green. |

During the use of the parking space 24, parking services 12 monitor whether the parking space 24 continues to remain occupied. However, even when unoccupied, availability may depend upon whether a reservation with in-and-out privileges or other constraints on the use of the parking space 24 exist. Parking services 12 can monitor the passage of time or poll each parking device 21 and parking services kiosk 19 for changes in parking status. Parking services 12 could alert also the motorist of impending expiry of parking and either alert the motorist to move his car, or offer an extension of time, if feasible, as further described supra. Alternatively, the parking device 21 or parking services kiosk 19 could track changes in parking status and monitor the passage of time locally, which would be periodically reported back to parking services 12 when polled. Other ways to track changes in parking status and monitor the passage of time are possible.

Service: "Hold this Space"

Figure 7:
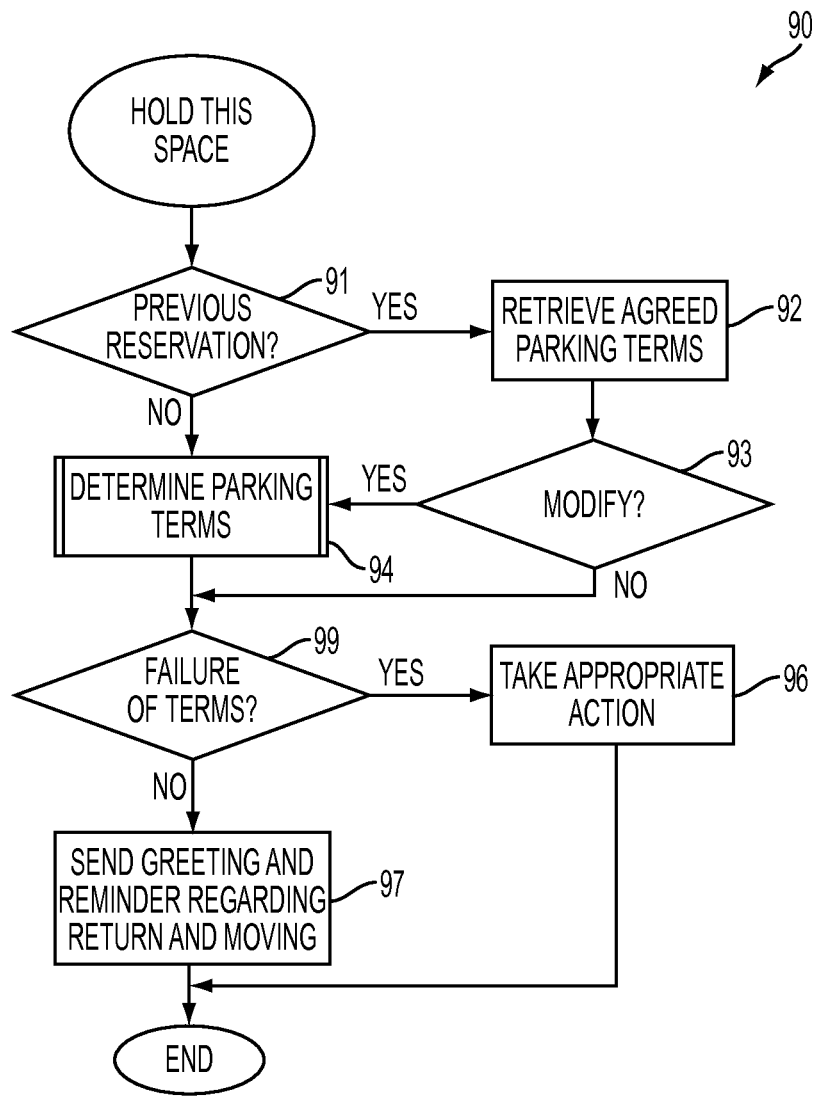
FIG. 7 is a flow diagram showing a routine for a "Hold This Space" service for use in the parking services of FIG. 1.

The "Hold This Space" service allows a driver to establish an agreement about parking a vehicle in a parking space. FIG. 7 is a flow diagram showing a routine for a "Hold This Space" service 90 for use in the parking services 12 of FIG. 1. Where the driver had a previous reservation and the check-in confirmed that the driver is authorized (step 91), the parking services 12 retrieve the terms previously arranged in the reservation (step 92) and the driver is offered the option of modifying the terms (step 93). If no reservation was made (step 91), or the driver decides to modify existing reservation terms (step 93), the applicable parking terms are determined (step 94), as further described below with reference to FIG. 8.

The parking services 12 can summarize the parking agreement for the driver. If the driver is in violation or fails to fulfill the terms of the parking agreement (step 94), such as where the driver is not authorized to park there, has not paid the required parking fee, or does not move his vehicle within short grace period, the parking services 12 can automatically take appropriate action against the offending driver (step 96), including alerting parking authorities about the parking violation, logging the violation, or otherwise enabling guided enforcement, as further described below with reference to FIG. 21.

If the terms are acceptable and the driver compliant (step 94), a greeting can be sent to the driver, along with a reminder about when he is expected to return and move his vehicle (step 97). Otherwise, if the driver is in violation or non-compliant, the system could optionally offer the driver other parking.

Figure 8:
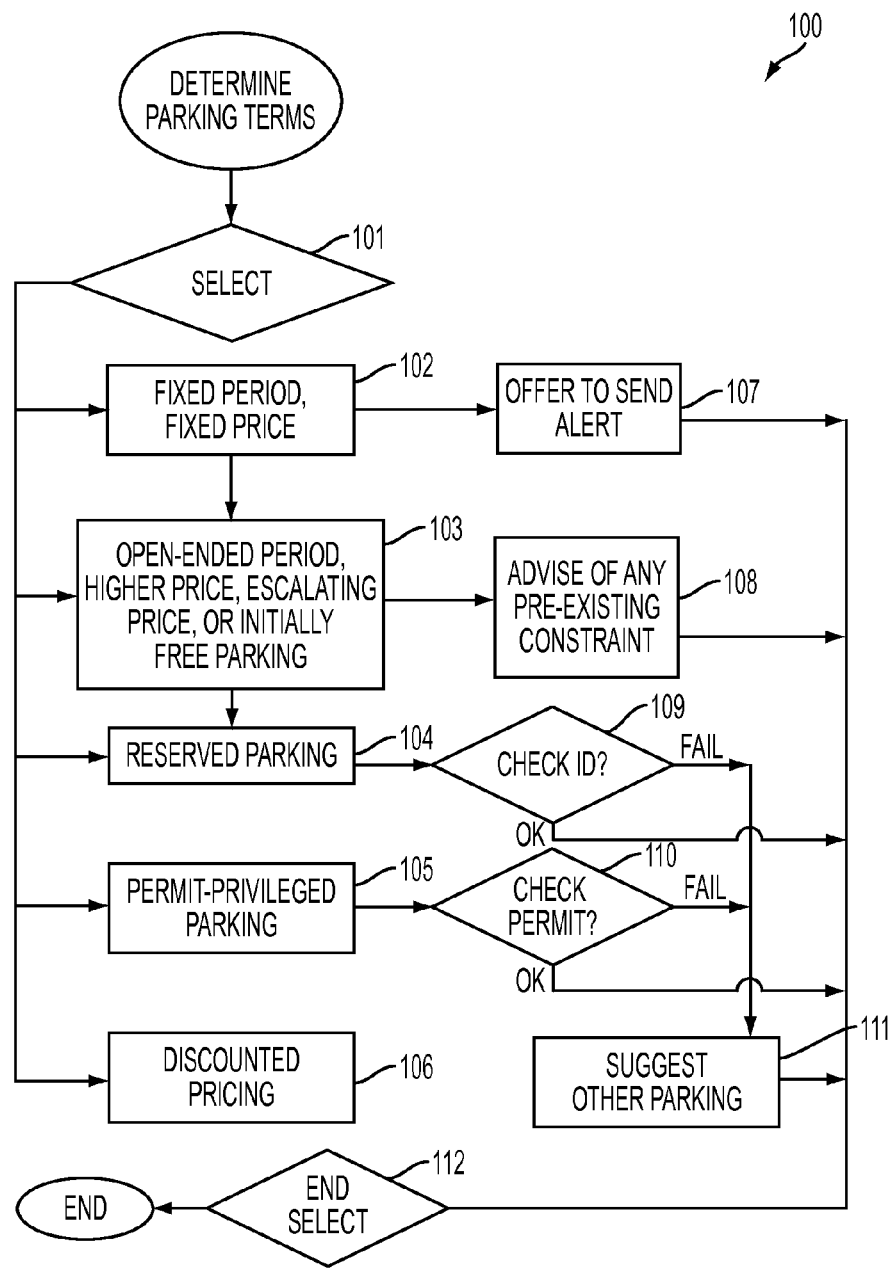
FIG. 8 is a flow diagram showing a routine for determining parking terms for use in the routine of FIG. 7.

The parking terms can offer different parking options. Parking zones can have a maximum time to park. They can also have escalating rates that go up with time. In some cases, there can be free parking for a period. FIG. 8 is a flow diagram showing a routine 100 for determining parking terms for use in the routine 90 of FIG. 7. At the time of making a parking reservation or check-in, the driver selects the terms of the parking agreement (steps 101-112). By way of example, the parking options include:

Fixed period, fixed price (step 102). The driver could select to pay for a fixed rate for a fixed period of time. Under this option, the driver must move his car before the end of the parking period. The driver could ask to be alerted (step 107) via an electronic message that will be sent to a mobile device 15, 16, 17 when the parking period is nearly over, such as by using contact information known to the parking services 12 under the driver's parking identifier. In some cases, the driver may later be permitted to extend the fixed parking period from his mobile device 15, 16, 17, as long as other time constraints still allow parking.

Open-ended period, higher price (step 103). The driver could opt for an open-ended parking period. Under this option, the driver does not provide an end time and parks for as long as needed, subject to pre-existing availability constraints on the parking space. The driver is informed of any pre-existing constraints (step 108), for instance, other parking reservations or scheduled street cleaning. The convenience of open-ended parking times may have a higher fee since the parking space is locked up and unavailable to other motorists for an indefinite period.

Open-ended period, escalating price (step 103). As a variation on the open-ended period, higher price parking option, the price-per-minute for a parking space could proportionately rise as a vehicle is parked for an increasingly longer period. For instance, some cities, like Palo Alto, Calif., want to attract shoppers into their shopping district by offering easy parking, while also discouraging people who work downtown from illicitly parking in the shopping district all day. Escalating pricing is one way to meet those goals. This approach could be used, for instance, in shopping districts where commerce generally benefits from turn-over in the vehicles parked in that area. For example, the first hour of parking might cost a dollar; the second hour might cost two dollars; the third hour might cost ten dollars.

To illustrate, a scenario is presented with a configurable parameter for a check-in grace period set to five minutes, although other lengths of time could be chosen. The check-in grace period represents the amount of time that a driver can park for free in an available parking space without actually checking into the parking space through the parking services 12. There is no penalty for this type of free parking, but the penalty-free aspect does not apply if parking is otherwise prohibited or the parking device 21 indicates that parking is not available. Here, the scenario begins with Alice parking her car in parking space A, which has a parking indicator 23 displaying Green and the parking device 21 nearest to the space displaying 02:00 hours, which is the maximum parking time permissible in the shopping district.

| Time | Event |
|---|---|
| 10:00 am | Alice wants to quickly stop at an ATM in the shopping district, so pulls into parking space A, which is in front of the ATM.<br>The vehicle sensor 22 detects her arrival and sends a message to the server. The server acknowledges the occupancy and sends a message to the parking device 21 nearest Alice's parking space 24 that instructs the parking device 21 to enter the "Reserved Check-In" state and begin a countdown for the grace period (00:05). The server also instructs the parking indicator 23 to display Yellow. The server requests the parking device 21 to also show the following information: "To stay longer than five minutes, please check in."<br>The parking device 21 continues to display this message throughout a user response waiting time before powering down the display. |
| 10:04 am | Alice returns from the ATM and leaves the parking space A.<br>The vehicle sensor 22 detects her departure and sends a message to the server. The server instructs the parking device 21 to again show the 02:00 time limit and the parking indicator 23 to display Green. |
| 10:30 am | Bob arrives to pick up some items at a store and needs longer than fifteen minutes to shop. He pulls into parking space A.<br>The vehicle sensor 22 detects his arrival and sends a message to the server. The server acknowledges the occupancy and again instructs the parking device 21 to enter the check-in state, as described supra. Bob swipes his credit card (or other form of identification, such as a driver's license). The parking device 21 sends this information to the server, which verifies that Bob has not parked in this parking zone within a certain amount of time and checks the rate schedule. If Bob had already parked in this same parking zone earlier, he could be charged a higher parking fee to dissuade him from moving around within the parking zone in an attempt to receive lower parking fees. The server sends a message to the parking device 21 to display the following information:<br>(1) "Rates are: 1 hour $0.00, 2 hours $1.00, 3 hours $3.00, 4 hours $7.00"<br>(2) "Rates start with one hour for $0.00"<br>(3) "Press '+' or '−' to change the time"<br>(4) "There is a four hour maximum time limit on parking here."<br>Bob pushes the "OK" button to accept one hour.<br>The parking device 21 sends a message to the server saying which options Bob choose. The server records this parking space 24 as being reserved for the next hour and instructs the parking device 21 to display a confirmation message to Bob:<br>(1) "You have reserved this parking space for one hour until 11:30 am"<br>(2) "No payment is required"<br>The server sends a message to the parking indicator 23 to display Green and the parking device 21 to set the countdown to show the time remaining until the reserved time runs out and the parking space becomes available. |
| 11:25 am | Bob finishes his shopping and vacates parking space A.<br>The vehicle sensor 22 detects his departure and sends a message to the server. The server instructs the parking indicator 23 to display and the parking device 21 to show a four-hour availability with no countdown. |
| 11:45 am | Charlene arrives to eat lunch and run errands. She pulls into parking space A.<br>The vehicle sensor 22 detects her arrival and sends a message to the server. The server acknowledges the occupancy and again instructs the parking device 21 to enter the check-in state, as described supra. Charlene swipes her credit card at the parking device 21, which sends the credit card information to the server. The server verifies that Charlene has not parked in this parking zone within a certain amount of time and looks up the rate schedule and other constraints. The server sends a message to the parking device 21 to display the following information:<br>(1) "Rates are: 1 hour $0.00, 2 hours $1.00, 3 hours $3.00, 4 hours $7.00"<br>(2) "Rates start with one hour for $0.00"<br>(3) "Press '+' or '−' to change the time"<br>(4) "There is a four hour maximum time limit on parking here."<br>She pushes the '+' button to add an additional hour. The display on the parking device 21 updates the price to $1.00.<br>She presses the "OK" button and the parking device 21 sends a message to the server to indicate her selection. The server charges her credit card successfully and records parking space A as being reserved until 1:45 pm.<br>The parking device 21 sends a message to the server saying which options Charlene choose. The server records this parking space 24 as being reserved for the next hour and instructs the parking device 21 to display a confirmation message to Charlene: |

| Time | Event |
|---|---|
| | (1) "You have reserved this parking space for two hours until 1:45 pm"<br>(2) Her credit card was charged $1.00.<br>The server sends a message to the parking indicator 23 to display Green and the parking device 21 to set the countdown to show the time remaining until the reserved time runs out and the parking space becomes available. |

Open-ended period, initially free parking (step 103). In another variation on the open-ended period, higher price parking option, a first period of parking might be free, potentially subsidized by merchants located on the same city block as the subsidized parking. Thereafter, parking fees might begin after, for instance, thirty minutes. User check-in could still require an electronic banking card, such as a credit card or a debit card, with billing to take place according to the already established parking rules.

Reserved parking (step 104). If the parking space is reserved, the parking device 21 could request the driver to confirm his parking identity. If the driver's parking identity does not match the reservation (step 109), the parking device 21 or parking services 12 could inform the driver that he needs a valid reservation and that he must move his vehicle from the parking space 24. As a courtesy, the server could also provide a recommendation of another place to find parking (step 111) and could allow the motorist to reserve an alternative parking space using their parking identity.

Permit privileged parking (step 105). If the parking space requires a special permit and the driver's parking account 37*a-c* lacks the required permit (step 110), the parking device 21 or the parking services 12 could inform the driver that a permit is required and that he must move his vehicle from the parking space 24. As a courtesy, the server could also provide a recommendation of another place to find parking (step 111) and could allow the motorist to reserve an alternative parking space using their parking identity.

Discounted pricing (step 106). Various bulk discounts may apply where associated with a permit in driver's parking account, or through an associated fleet parking account.

Driver Parking Services

Service: Reservation.

The reservation service reserves a parking space 24, which can be illustrated by a scenario.

| Time | Event |
|---|---|
| 8:00 am | Making a reservation. Alice wants to reserve parking at 10:00 am.<br>She goes to the Web site run by the parking services 12 and creates a parking account for herself.<br>Alice enters the following information to create a parking account:<br>(1) name<br>(2) credit card number for parking charges (or other form of electronic payment)<br>(3) address<br>(4) email for communications<br>(5) telephone number for alerts<br>(6) password<br>After creating her parking account, Alice is automatically logged in.<br>The server shows a list of any existing parking reservations.<br>She chooses to make a new parking reservation. |
| 8:00 am | Alice enters her preferred time of 10:00 am for the start of the new reservation and her desired duration of 30 minutes.<br>She indicates where she wants to park. The parking server determines what parking spaces 24 are available near that location.<br>Parking spaces are not available when:<br>(1) The parking space 24 is already reserved during that time.<br>(2) The parking space 24 is already occupied and is paid up through the reservation time.<br>(3) The reservation time is near and the parking space 24 is occupied (whether paid or unpaid).<br>(4) The parking space 24 is constrained by a parking policy, such as street sweeping.<br>The Web page shows Alice the following information:<br>(1) what parking spaces 24 are available<br>(2) how long each space is available<br>(3) the cost of parking in each space<br>Alice picks parking space A. |
| 8:05 am | The server verifies that parking space A is still available. |
| 8:45 am | Short time available. Parking space A is still unoccupied. The server notices that the time for Alice's reservation is now an hour away, which is within the "short parking interval" limit. The blackout period for minimal spacing between parkers is only an hour away. The server sends a message to the parking device 21 to continue the countdown to 9:45 am and to the parking indicator 23 to display Yellow. |
| 8:45 am | After acknowledging the message, the parking indicator displays Yellow and the parking device 21 starts a countdown to 9:45 am. |

| Time | Event |
|---|---|
| 9:45 am | The server notices that the time for parking space A is now within the minimum reservation spacing interval and sends a message to the parking indicator 23 to display Red and to the parking device 21 to display zero available parking minutes. The server also instructs the parking device 21 to enter the "reserved-meter-pending" state, display the parking space number.<br>Finding the reserved parking space. The parking indicator 23 nearest to parking space A displays Red (no parking) and the parking device 21 shows zero time remaining (no available minutes). The parking device 21 begins to flash a "here I am" signal to assist Alice with locating parking space A, which can be flashing colored LEDs in order (blue-red-yellow-green). Alternatively, the parking device 21 can alternates the time display with a display of "A" to indicate the parking space identifier. |
| 9:50 am | Alice is still driving along the city block where her reserved parking space 24 is located. She looks over the empty parking spaces. The parking device 21 nearest to parking space A shows a display of "A" with flashing LEDs and the Red displayed by the parking device 21 helps the parking space 24 to stand out. |
| 10:05 am | Check-in. Alice parks in parking space A. The vehicle sensor 22 registers her arrival and sends a message to the server saying that the space is now occupied. |
| 10:05 am | The server acknowledges the message and instructs the parking device 21 to enter the "Reserved Check-In" state and start the timer for the check-in grace period. The server also instructs the parking indicator 23 to display Yellow. The parking device 21 presents the message, "This parking space is reserved. Please check in."<br>Alice approaches the parking device 21 and slides her credit card. The parking device 21 reads the credit card and sends the credit card information to the server.<br>The server verifies that the credit card is associated with the reservation for Alice. |
| 10:05 am | Confirming reservation. The server looks up constraints and costs for the reservation, parking rates, and user preferences, which are then sent to the parking device 21. The server requests that the parking device's user interface display the following information and to go to a "set-parking-parameters" state:<br>(1) The start time of the reservation.<br>(2) The end time of the reservation.<br>(3) The cost for the time period.<br>(4) The time left before the parking space 24 becomes unavailable.<br>(5) That Alice normally wants a text message when her parking time is almost up.<br>Alice interacts with the parking device 21 to determine whether she wants to change any of these settings.<br>Alice decides that she has reserved enough time and will keep the current settings. She indicates that she is finished. The parking device 21 sends a message to the server that Alice accepts the parameters as-is.<br>The server acknowledges the message and sends the parking device 21 a message to start the countdown timer to show the amount of time before Alice's reserved parking ends and the parking indicator 23 to display Green.<br>The parking indicator 23 displays Green and the parking device 21 starts the countdown timer. |
| 10:30 am | Finishing parking. Alice has finished her errands and returns to her car. She pulls out of parking space A and goes on her way.<br>The vehicle sensor 22 detects that the parking space 24 has been vacated and sends a message to the server.<br>The server records that parking space A is vacant and that the reservation has been fulfilled.<br>The server now looks at the time, existing regulations, and pending reservations to determine how much time is now available in parking space A.<br>    If the parking space 24 is available for only a short parking time, such as one hour, the server sends a message to the parking indicator 23 to display Yellow and the parking device 21 to display the "Available" message and start a countdown for the available time.<br>    If the parking space 24 is available for more than the minimum short parking time period, the server sends a message to the parking indicator 23 to display Green and the parking device 21 to display the "Available" or "Park" messages and display a countdown timer for the available time.<br>    If the parking space 24 requires a permit in the next interval, the server sends a message to the parking indicator 23 to display Blue and the parking device 21 to display a "Permit Required" message. The countdown timer shows the available time. |

| Time | Event |
|---|---|
| | If the parking space 24 is not available in the next interval, the server sends a message to the parking indicator 23 to display Red and the parking device 21 to display a "No Parking" message. The countdown timer shows the time left before the space becomes available. |
| 10:30 am | The parking indicator 23 displays the requested color and the parking device 21 displays the requested message. |

Figure 9:
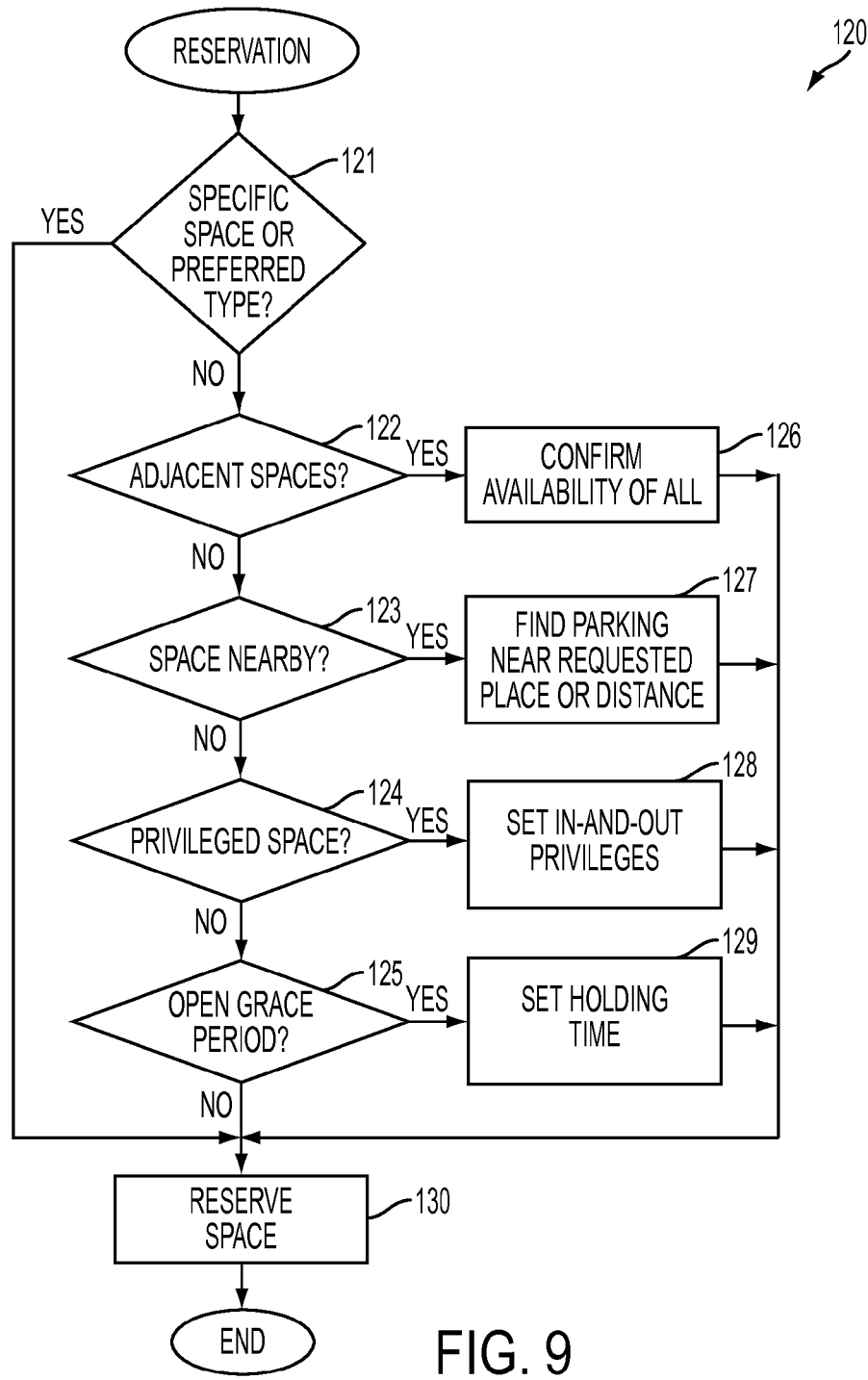
FIG. 9 is a flow diagram showing a routine for a reservation service for use in the parking services of FIG. 1.

As described supra for the "Hold This Space" service 90, a parking reservation 38a-d can be for a fixed parking period, for an open-ended period, or as various permits allow. Additionally, a parking reservation 38a-d may be for a specific parking space 24 or for one of a set of parking spaces. FIG. 9 is a flow diagram showing a routine for a reservation service 120 for use in the parking services 12 of FIG. 1. Policies govern various parking considerations, such as the minimum advanced notice required for canceling a parking reservation and what money, if any, is refunded upon timely cancellation. Similarly, when a motorist wants to park in a parking space 24 for a couple hours prior to when someone else has already reserved that space, the parking services 12 will not let that motorist hold the parking space 24 into the time that the already-reserved person has booked, so as to allow a between-parking-reservation time buffer. For instance, a minimum fifteen-minute spacing or blackout period between reservations could be imposed.

Allowing users to reserve parking ahead of time raises several issues. Typically, when a driver leaves a parking space 24, the parking space 24 becomes available for other motorists to use. However, some drivers may want in-and-out privileges that could be provided through a reserved parking space for a recurring purpose. For example, a driver may need to reserve a parking space 24 for nighttime parking, but then need to leave sometime during the night to run an errand. That driver would ordinarily want that parking space 24 to continue to be reserved for him, so that parking is available upon returning from the errand.

As well, unused yet reserved parking wastes the parking resource. Plans sometimes change and motorists that make reservations for parking spaces 24 may end up not actually using the parking. To avoid such waste, the parking services 12 could return a parking space 24 to public availability if the driver who reserved the parking space does not check in promptly. Parking spaces 24 could have a short grace period for arrival and check-in. As well, drivers could pay a higher fee to hold a parking space throughout the entire reservation period, which will apply even if they do not show up.

In another variation, a driver could be sent an alert by telephone, text message, or other means if a grace period for a reservation is about to expire. This message could be handled by a GPS-equipped device, such as an on-board navigational or informational devices 17, in the vehicle. The driver, or a computational agent for the driver, would have a window of time during which to respond to the alert by telling the parking service that they still need the parking space. The driver could be asked to pay an extra charge to continue to hold the parking space if parking is in high demand or for other reasons warranting an up charge to the parking.

Finally, a blackout minimum time interval between parkers could be provided to allow the parking space 24 to get cleared of the last parker. The interval allows an incoming reserved parker to just check in if they arrive early. The minutes in the "arrive early" part of the reservation are covered by the fee for making a reservation.

Parking spaces 24 can be reserved directly through the parking services 12 or indirectly through a parking device 21, parking services kiosk 19, or mobile device 15, 16, 17. By way of example, parking space reservations include:

Reserve a specific parking space (step 121). This option reserves one specific parking space 24.

Reserve a preferred type of parking space. The parking reservation system may differentiate parking spaces according to their type. For example, parking spaces requiring parallel parking may be less desirable than those spaces where parking is at an angle to the curb. Similarly, some parking spaces may be longer, wider, or otherwise more easily usable for parking than other parking spaces that require comparatively more involved maneuvering of a vehicle.

Reserve adjacent parking spaces (step 122). This option reserves several adjacent parking spaces, such as needed for parking an oversize vehicle, trailer, recreational vehicle, limousine, or moving van. Grant of the parking reservation requires confirmation that all of the parking spaces requested are available for the term of the reservation (step 126).

Reserve a parking space near or within a given distance of a location (step 123). A driver may not necessarily need a specific parking space (step 121) and may be satisfied with a parking space 24 on a particular block or side of the street or that is within a given distance of a particular location. The parking services 12 attempt to find a suitable parking space 24 for the driver (step 127), who may then enter a reservation.

Reserve a parking space with in-and-out privileges (step 124). This option keeps a parking space 24 reserved throughout the duration of a reservation period (step 128), even if the driver leaves for a while during the period. Another check-in step would be required when the driver returns.

Open grace period (step 125). This option holds a parking space reservation open (step 129), even if the driver is late and does not arrive within an allotted arrival and check-in grace period.

Where a reservation is for any of a group of parking spaces 24, the process used by the parking services 12 for setting the parking indicators 21 proximate to the parking spaces factors in the affect on the availability of the overall group. For example, suppose that there are two parking reservations in effect for parking spaces 24 on the same block and that ten of the twenty parking spaces are already occupied by cars. In this situation, the parking services server 21 can show all ten of the unoccupied parking spaces 24 as available. However, as the number of available unoccupied parking spaces 24 decreases, the parking indicators 21 need to reflect the affect of the two parking reservations. When only two unoccupied parking spaces 24 are left, the parking services 12 show those spaces as being unavailable to hold the spaces for the reservations. Suppose that three parking spaces 24 were unoccupied and that a car began to pull into one of those parking spaces 24. The remaining two parking spaces would then show as unavailable.

If all conditions are met, the parking services 12 reserve a parking space 24 for the driver (step 130), which can be confirmed to the driver (step 131), for instance, by an automated message sent to the driver's mobile device 15, 16, 17, if available and registered with parking services 12.

Service: Extend Reservation

Figure 10:
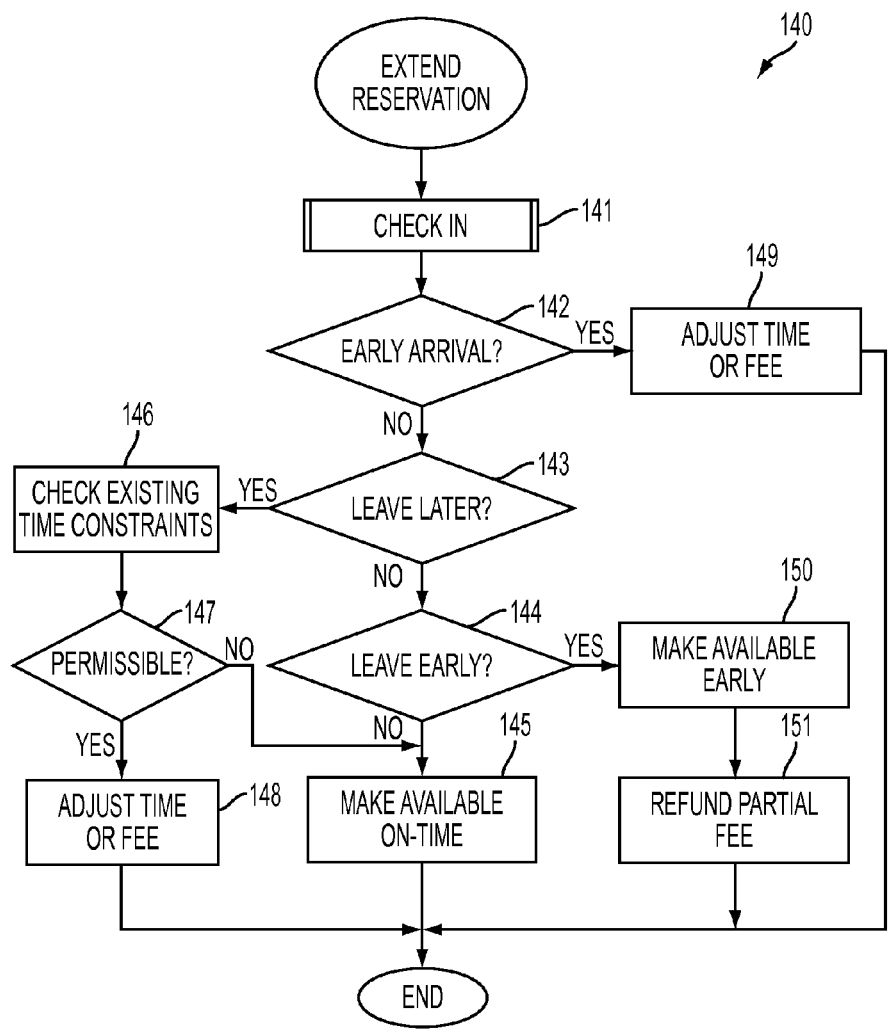
FIG. 10 is a flow diagram showing a routine for an extend reservation service for use in the parking services of FIG. 1.

Parking reservations give a specification of the time over which a parking space 24 is reserved. FIG. 10 is a flow diagram showing a routine for an extend reservation service 140 for use in the parking services 12 of FIG. 1. A parking reservation is executed when the motorist checks in (step 141), as described supra. If a motorist arrives early for his reservation 38a-d and the parking space 24 is available (step 142), the starting time of the reservation begins earlier than planned. The parking services 12 adjust the parking period and fee appropriately (step 149) and can confirm the revised end time and other parameters with the driver.

Alternatively, if a motorist wants to extend a parking stay longer (step 143), that is, he wants to leave at a later time, the parking services 12 will check for any existing time constraints (step 146). If permissible (step 147), the parking services 12 adjust the parking period and fee appropriately (step 148) and can confirm the revised end time and other parameters with the driver. Otherwise, the motorist will be informed that extended parking is not available. For purposes of resource management, the parking services 12 use available information to inform drivers about parking availability. In estimating how long a vehicle will be in a parking space 24, a conservative approach assumes that the parking space 24 will not become available until the end of the parking period (step 145) as specified in the terms of parking agreement. If the parking terms allow parking for up to three hours, a conservative parking policy prevent the parking services 12 from showing the parking space 24 as being available for other parking reservations before the end time. However, if a driver leaves early (step 144), the parking space 24 can be made available immediately to other drivers and, if policy permits, the departed driver can be refunded a partial fee (step 151).

Pricing policies as implemented through the parking services 12 can take advantage of the dynamics of drivers arriving early, staying later, or leaving early. For example, a driver considering convenience and peace of mind may choose an option to stay for up to three hours, even if he expects to be finished in two hours. Reserving a parking space 24 for only two hours would cost less, but the driver risks the need to hurry back if delayed. In one embodiment, the parking services 12 can warn a driver via a mobile device 15, 16, 17 that the two-hour limit is approaching. If the space is still available beyond the two-hour limit, the driver could be offered the option to extend the parking reservation.

Service: "Find My Car"

Figure 11:
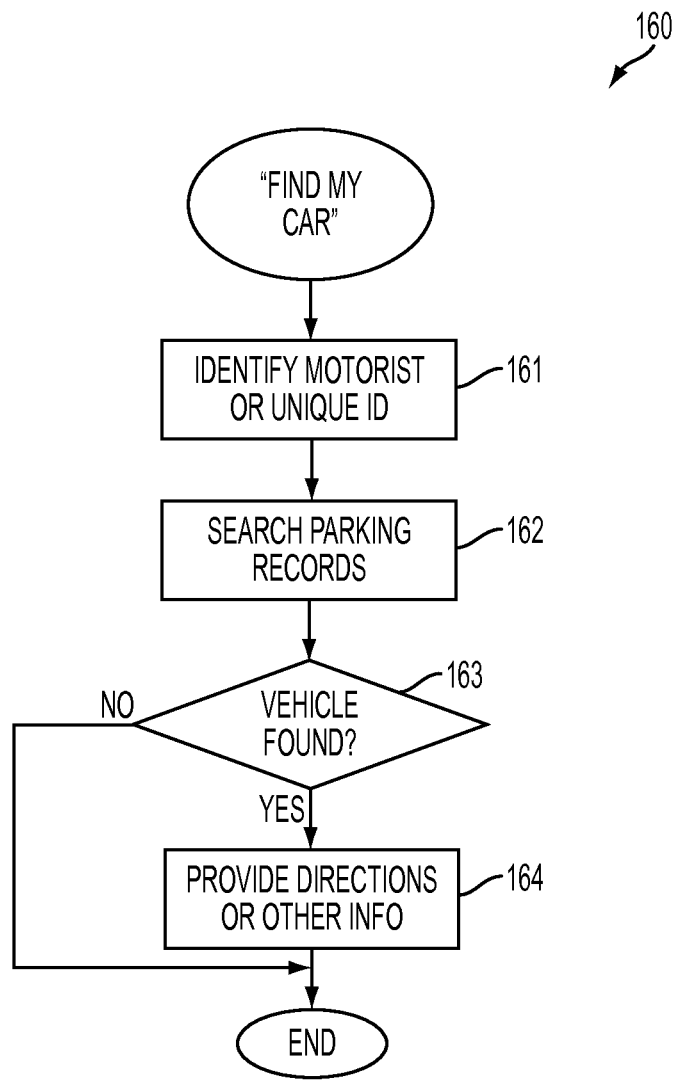
FIG. 11 is a flow diagram showing a routine for a "Find My Car" service for use in the parking services of FIG. 1.

People sometimes forget where they parked. Since the location of every parking space 24 is known by the parking services 12, the information can be used to help forgetful drivers find their lost cars. FIG. 11 is a flow diagram showing a routine for a "Find My Car" service 160 for use in the parking services 12 of FIG. 1. If in need, an absentminded driver could go to any parking device 21 or parking services kiosk 19, or could contact the parking services 12 using a mobile device 15, 16, 17. The driver would check-in, and ask the server for his car's location. The parking services 12 would confirm the driver's identity (step 161) and search the parking records (step 162). If the parking space 24 occupied by the vehicle is found (step 163), the driver could be provided a map, audio, or visual directions for finding his car. For persons without parking identities, the parking services 12 could still provide the driver with directions upon providing sufficient information to enable the parking services 12 to find the car, such as by entering a unique identifier assigned to a parking device 21 (step 161).

Service: Summon a Taxicab and "Find Me Public Transportation"

A parking device 21 or parking services kiosk 19 could also be used to summon a taxicab. Based on the location of the requesting parking device 21, a taxicab service could give an estimated time of arrival and fare estimates for travel to a specified destination. The taxicab service could be summoned through an interactive application executed on the parking device 21, or by message-based or voice telephone call. Payment for the taxicab could also be automatically arranged ahead of time through the user's parking account 37a-c. In a further embodiment, a user could request a taxicab and run an auction for taxicab services to respond at a specified level of service. The user could then pay for the winning taxicab service through the parking device 21 and enter into a pre-arranged fare agreement with the taxicab.

In addition, a parking device 21 or parking services kiosk 19 could be used to find public transportation for a user. Like the service for summoning a taxicab, this service is location-based and uses the location of the parking device 21 or parking services kiosk 19. The parking services 12 tie in to bus, train, ferry, subway, and other public transportation schedules and could recommend a route for the user. The parking identity could be generalized to a transportation identity, which allows the holder to purchase tickets for public transportation, as well as pay for taxicab fare.

Service: Summon Help (9-1-1)

Each of the parking devices 21, as well as parking services kiosks 19, are networked with the parking services 12. Drivers and other people can use the parking devices 21 and parking services kiosks 19 to call for help during emergencies. For example, a person could open voice or voice and video connection to emergency authorities, depending upon the configuration of the parking device 21. Further, if a camera is incorporated into the parking device 21, the parking services 12 could capture photographs from the requesting or neighboring parking devices 21 to document the event. The parking services 12 can be connected through a Web site or other communications channel to operators and civil authorities for handling emergency and public safety concerns. Alternatively, the parking devices 21 and parking services kiosks 19 could be equipped with a button to call 9-1-1.

In one embodiment, each parking device 21 and parking services kiosk 19 can transact voice communications with a user and take digital images, including still photographs and video, of the immediately surrounding area using a built-in camera to document an emergency situation. The network interconnecting the parking devices 21 and parking services kiosks 19 with the parking services server 11 provide sufficient bandwidth to upload the digital images and support a voice conversation between a user and the 9-1-1 service. In a still further embodiment, the server has a low-latency method of pushing messages to the parking devices 21 and parking services kiosks 19 and nearby parking devices 21 and parking services kiosks 19 are quickly informed to start taking digital images upon receipt of a 9-1-1 call. The time schedule by which the parking devices 21 and parking services kiosks 19 take digital images is a configurable parameter in the system and need not necessarily be constant. For instance, digital images can be taken at a higher frequency initially with a back off in frequency over time. Multiple presses of the 9-1-1 emergency button over a short configurable time period can be considered a single event. The summon help service, as supplemented with digital images, can be illustrated by a scenario.

| Time | Event |
|---|---|
| 9:00 pm | Bob sees an emergency situation, such as a robbery on the street or a medical emergency.<br>Bob pushes the 9-1-1 button on the parking device 21 closest to parking space A.<br>By default, the parking device 21 starts taking digital images.<br>The parking device 21 also opens a voice phone call to the 9-1-1 service.<br>The parking device 21 sends a message to the server to initiate a 9-1-1 event.<br>The parking server acknowledges the message and starts a new 9-1-1 event, recording the time and parking device's location.<br>The server identifies a set of nearby parking devices 21 and sends each of them a message to start taking a few digital images for a configurable period of time. |
| 9:00 pm | The nearby parking devices 21 start taking digital images and begin uploading the digital images or thumbnails in an appropriate manner. |
| 9:01 pm | The server starts receiving the digital images or thumbnails, logs them, and correlates them for use by emergency responders and law enforcement.<br>A 9-1-1 operator answers the voice phone call from the user at the initiating parking device 21.<br>The 9-1-1 operator brings up a Web page for pending 9-1-1 events and finds the appropriate 9-1-1 page for this event.<br>The thumbnail views, where applicable, from the nearby parking devices 21 become accessible as they are uploaded and can be shown on a map that gives the location of the calling parking device 21, the location of the nearby parking devices 21, and the digital images from the parking devices 21. |

In one embodiment, the parking devices 21 and parking services kiosks 19 have enough local storage to store a finite number of digital images, such as at least 100 pictures. When a parking device 21 or parking services kiosk 19 takes a digital images, the date and time are also recorded. A parking device 21 or parking services kiosk 19 can report to the server about the stored digital images and can upload or delete a digital image or thumbnail upon request by the parking services 12, as illustrated by the following continuation of the preceding scenario.

| Time | Event |
|---|---|
| 9:02 pm | The 9-1-1 operator interviews Bob and decides that the emergency deserves more than the default photographic documentation. From the Web page, the 9-1-1 operator requests that digital images continue to be taken from the nearby parking devices 21 every five seconds for five minutes and also expands the region of recording cameras to another block away.<br>The 9-1-1 operator requests police and medical services be dispatched to the location of the calling parking device 21.<br>The 9-1-1 operator finishes the call and the audio connection is completed.<br>At some later time, the 9-1-1 service uploads the full resolution digital images that were requested from all of the involved parking devices 21 and saves them in a database. |

Resident Parking Services

Urban residents, in many ways more than any other class of motorist, must contend with nearly continual parking challenges, particularly during the work week, as they attempt to find on-street parking reasonably near their place of residence, despite the countervailing parking efforts by office workers, commercial vehicles, visitors to the city, and others. Too often, car-owning urbanites need, but are often unable to find, on-street parking on a recurring basis.

For example, residents could find reserving nighttime parking on the street, either in front of their homes or nearby, convenient, if only such parking could be made available to them.

By way of illustration, the following scenario covers recurring parking, such as being able to park at night for a month near one's home, as provided through one embodiment. Recurring parking also enables in-and-out parking privileges during the night. Bidding for recurring parking spaces is based on need parameters, such as the number of parking spaces on which an account holder can bid, the number of parking spaces that an account holder can win at auction, and a maximum distance from a parking space to a residence or other address. Here, Ryan is a drummer in a rock-n-roll band in MyCity and wants to reserve one of the two parking spaces in front of his house, space R or S, for the next month, so that he can more conveniently load and unload his drum set at night, rather than lugging his drums several blocks or risking theft by leaving his gear in his car. For this city, parking auctions are run during the third week of the month and parking spaces change hands at the beginning of each month. This scenario covers the case of nighttime in-and-out recurring parking reservations. A fixed and regular parking period for these reservations, such as 6 pm to 8 am, is assumed, although other time periods are possible, whether during the day, at night, or during off-periods, such as weekends or holidays. Additionally, there may be other cases, where the parking periods need to be variable or are extended beyond a city standard block.

| Time | Event |
|---|---|
| Jul 18 | Ryan logs into a Web site run by the parking services server. He selects the section for bidding on recurring reservations.<br>The server looks up Ryan's address and bidding constraints, then displays parking spaces near his address, which are available for recurring reservations, along with the next auction date (July 31) and the start date for the next award (August 1). The winning bid amounts for the parking spaces during the last auction are shown.<br>Ryan indicates that he needs one parking space for his vehicle (of the two spaces he is allowed). He places a maximum $100 bid for parking spaces R and S and a lesser $50 bid for other spaces on his block, in case he is unable to get the spaces in front of his home. |
| Jul 31 | The parking server conducts a multiple-space, sealed, second-bid auction, as further described infra. Ryan wins the auction for $80/month for parking space R. |
| Aug 1, 4:30 pm | Parking space R is not occupied. Ryan's recurring reservation starts at 6 pm, with a 15-minute minimum interval preceding blackout period at 5:45 pm (75 minutes away). The smart parking device is showing Green (available) with a countdown to 5:45 pm. |
| 4:45 pm | The server notices that parking space R has less than the short-interval parking availability. The server sends a message to the smart parking device to display Yellow (limited time) and continue the countdown to 5:45 pm.<br>The smart parking device receives the message, displays Yellow (limited time), and continues the countdown. |
| 5:45 pm | The parking server notices that parking space R has less than the minimal time interval for parking ahead of a reservation. The server sends a message to the smart parking device to enter the reserved-unavailable state, to display Red (no parking--reserved--unavailable), and to set the counter to zero. |
| 5:45 pm | The parking smart parking device displays Red and sets the counter to zero. |
| 5:50 pm | Ryan arrives home and pulls into parking space R. The parking sensor detects his arrival. The smart parking device sends a message to the server that parking space R is occupied. |

-continued

| Time | Event |
|---|---|
| | The server acknowledges the message and looks up Ryan's recurring reservation. The server sends a message to the smart parking device to enter a reservation check-in state, to display Yellow, and to begin a countdown for the check-in grace period. The smart parking device displays Yellow (check-in). The counter begins a countdown for the grace period, for instance, five minutes. The display on the smart parking device requests Ryan to check in through a combination of visual and audio prompts. Ryan slides his credit card in the smart parking device. The smart parking device sends the credit card information to the server. The server checks that Ryan's credit card is associated with the reservation and notes that the reservation is already paid. The server sends a message to the smart parking device to enter a reserved-parked state, to display Green, and to set the counter to a countdown to the end of the reservation period, which occurs at 8 am on the next morning. The server notices that a street sweeper is scheduled to sweep Ryan's street at 9 am in the morning, too. The smart parking device turns Green (valid parking) and begins a countdown to 8 am. The server gives Ryan a message to be sure to move his car before 9 am to avoid the street sweeper. |
| 6:30 pm | Ryan is cooking and lacks both a key ingredient and a dessert for someone special. The store selling the items is ten minutes away by car, so he drives off to the store to get the desired items. The parking sensor detects that the parking space has been vacated, notes the recurring reservation includes in-and-out privileges, and sends a message to the smart parking device to enter a reserved-unavailable state, turn Red, and set the counter to zero. The smart parking device displays Red (unavailable) and shows a countdown of zero. Alternatively, the smart parking device may show a message "Reserved" or words to that effect. |
| 6:35 pm | Joe, a would-be parking poacher, pulls into parking space R. The parking sensor detects Joe's vehicle and sends a message to the server saying that the parking space is once again occupied. The parking server notes the reservation and sends a message to the smart parking device to enter a reserved check-in mode and to display Yellow. The smart parking device displays Yellow (check-in) and begins a countdown for the check-in grace period. |
| 6:36 pm | Joe approaches the smart parking device, which states, "Reserved parking. Please check in." Joe slides his credit card. The smart parking device sends the credit card information to the server. The server acknowledges the message and notes that the credit card is not associated with the reservation. The parking server identifies a nearby parking space V, which is available for at least a few hours, and sends this information to the parking smart parking device. The server tells the parking smart parking device to enter a vacate-reserved-space state, to display Red, and to start a timer for the vacate-space period, for instance, two minutes. The smart parking device displays Red and starts a timer for the vacate-period. The following information is displayed to Joe: (1) this parking space is reserved for someone else; (2) there is a parking space V nearby that is available for two hours, (3) you can reserve this space for one dollar with no hourly fee at night; (4) push the appropriate labeled button to either reserve parking space V or cancel the reservation. Joe chooses to not push any buttons. Joe sees parking space V. There is little traffic, so Joe decides to re-park his car in parking space V without making a reservation. The sensor in parking space R notices that the space is vacated and sends a message to the server. The parking server notes that parking space R is vacant and sends a message to the parking smart parking device to enter the reserved-unavailable state, to display Red, and to set the counter to zero. The parking smart parking device at space R displays Red with a countdown of zero, along with a message stating "reserved." |
| Aug 1, 6:50 pm | Ryan returns from shopping. He pulls into parking space R. The sensor detects Ryan's vehicle and sends a message to the parking server. The parking server notes the reservation and tells the parking smart parking device to go to a reserved-check-in state, to display Yellow, and to start the timer for the check-in grace period. The smart parking device displays Yellow, starts the timer, and displays a message, "Reserved parking. Please check in." Ryan swipes his credit card. The smart parking device sends the credit card information to the parking server. The parking server recognizes Ryan's credit card as being associated with the recurring reservation and knows that the parking is already paid. The parking server retrieves the same information as before. The smart parking device welcomes Ryan back and again reminds him to move his car ahead of the 9 am street sweeper. |
| Aug 7, 8 am | Ryan realizes that he will be away for a few days and does not need his night time recurring parking reservation for a couple of days. He logs into the parking service's Web site. Ryan interacts with the reservation service to say that he will not need his reserved parking space from August 7 to August 10. The parking service records the exceptions. |
| 6 pm | Parking space R is not occupied. The smart parking device shows that the parking space is available (Green) with a countdown timer of 12 hours, or whatever time increment is appropriate. The parking system issues a partial rebate to Ryan. |

Service: Recurring Reservations

Figure 12:
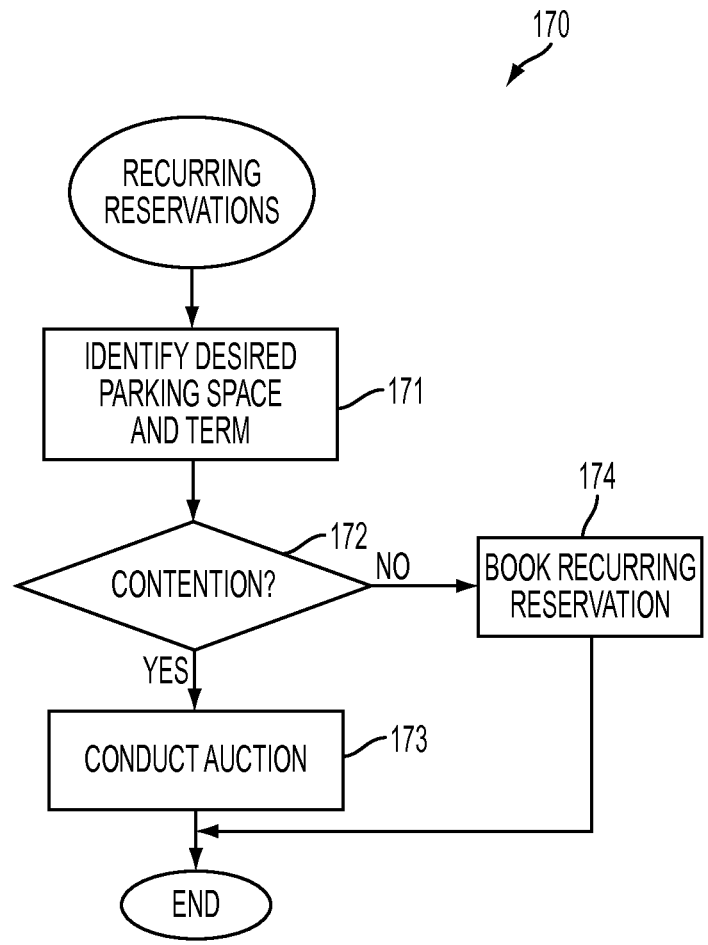
FIG. 12 is a flow diagram showing a routine for a recurring reservations service for use in the parking services of FIG. 1.

The recurring reservation service enables a user to reserve a parking space 24 for a repeating, typically hourly, period for each day throughout a subscription period, such as by the week or month. FIG. 12 is a flow diagram showing a routine for a recurring reservations service 170 for use in the parking services 12 of FIG. 1. To book a recurring reservation, an urban resident identifies a desired parking space and reservation term, which will typically include the times and dates over which the reservation term would be in effect (step 171). The parking services 12 confirms that the resident is eligible to reserve the desired parking space, including comparing the location of the desired parking space to the resident's home to guard against recurring reservations being issued to non-residents. The parking services 12 also checks whether there are constraints that prevent the recurring reservation from being booked. For example, use of the parking space 24 may require a special permit, such as for handicapped parking, or the resident may try to reserve a parking space 24 that is not available because the space is already scheduled to be in use. Additionally, some parking spaces 24 may not allow recurring reservations at all. For example, the space located at the curb cut of a private driveway can only be recurrently reserved by the resident himself, unless he chooses to rent the parking space, as further described infra. Furthermore, limits on the length of the subscription may restrict whether a motorist can make a recurring reservation.

If the reservation term is clear of any pre-existing time constraints and no contention with other residents is discovered (step 172), the parking services 12 book the recurring reservation for the resident (step 174). In an urban neighborhood, though, contention may be more the rule than the exception and several residents may want the same parking spaces 24. To ensure an orderly and fair process of booking recurring reservations in an urban neighborhood, the parking services 12 can run an auction.

Scheduled Auction. The parking services 12 can impose a scheduled period for conducting an auction for the contended parking space 24. For example, the auction may take place on a predetermined date, such as on the first day of each month. Prior to the date of auction, residents can enter their bids for specific parking spaces 24 or, alternatively, a range of comparable parking spaces 24, such as parking spaces 24 on the same side of the street and on the same city block as their home. Each bid includes the location of the requesting resident's home and the times and dates over which the reservation term would be in effect. Special privileges may apply for homeowners, elderly residents, the handicapped people, and so on. As well, the bidding residents need not be present for the online auction, which can occur automatically. At the time of auction, the parking services 12 evaluates all of the bids and confirms that each bidder is eligible to reserve the requested parking space. The parking services 12 then selects a winning bid based on an auction criteria. All of the bidders are notified. The winning bidder gets the recurring reservation. Several auction criteria may be used (step 173), which, by way of example, include:

Space Auction. Contracts for particular parking spaces 24 may be brought up for auction on a regular basis. Interested parties could be informed by the parking services 12 of the space auction. The winning bidder can be selected based on the highest bid or other criteria, such as a lottery, to get the contract for the parking space 24.

Multiple Allocation Auction. An allocation process can be used, where residents specify several parking preferences and bids. The parking services 12 allocate parking spaces 24 to balance the residents' needs and anticipated revenue generated from each of the requested parking spaces.

Multiple Allocation, Sealed Second-Bid Auction. This form of auction allocates parking spaces 24 according to the following principles:

(1) Motorists can bid on multiple parking spaces 24, but each bidder can win only a limited number of recurring parking spaces 24, so no one person can block out all of the parking in a neighborhood.

(2) Bidders indicate their perceived value of a parking space 24 by the amount of their bid, which is the maximum that they are willing to pay.

(3) Bids are accepted for all of the parking spaces 24 in a neighborhood at once, so that residents are not busy coping with auctions all of the time.

(4) Bidding is sealed, so that bidders are not driven to a bidding frenzy and last minute changes.

(5) A bidder only influences the price of parking spaces 24 that they win and their bids do not drive up prices on parking spaces 24 that they do not win.

During the auction, the bidding is closed prior to the start of the auction. The auctioneer organizes the bids for all of the parking spaces 24 and selects the highest bid over all of the parking spaces 24. If there is a tie, the earliest bidder gets the award. The high bidder is awarded the parking space 24 for the value of the second bid, or a minimum price if there are no other bids. If the high bidder has won his maximum number of bids, all further bids from the bidder are removed from all of the remaining parking spaces 24. Other ways to conduct a sealed bid auction, including variations on the amount charged, which subsequent bidder's bid is used as the award price, and so forth, are possible.

Auction with Subsidies. A subsidy or advantage is given to particular residents to for various reasons, such as location or to compensate for disadvantages or other inequities. A subsidy serves to weigh more heavily the bids received from subsidized residents. For example, a substantial advantage may be awarded to handicapped or elderly people to enable them to park near their residence. Alternatively, an advantage may be given to people living closest to a parking space 24 under auction. Winning bids carry the greatest weight.

The various auction-based approaches could take into account the number of parking reservations existing on a particular city block or in a region associated with a bidder and limit the number of parking spaces 24 that one resident could hold. In addition, a parking space 24 could have an escalating price per vehicle for recurring reservations to discourage a resident from monopolizing the parking on a city block with only his own vehicles. A delay period between the running of the auction and the time at which the first usable parking reservation takes effect for the winning bidder may apply.

Service: Guest Reservation

The guest reservation service accommodates making a parking reservation for a guest. Guest parking reservations are transacted in separate related parts. First, a host makes a parking reservation through the parking services 12, which includes informing the system about the guest. Next, the system contacts the guest, and perhaps provides the guest with a token or other form of identification by which to enable the system to pair up the guest with the reserved parking space 24. At the time of parking, the guest must find the reserved parking space 24, which can include the assistance of the parking services 12. Last, the guest checks in, with an optional final part of host confirmation, which is needed when the guest has found the reserved parking space 24, but is unable to prove his identity for some reason and requires the host's intercession.

The various parts of the guest reservation service can be illustrated by a basic scenario. Here, Alice is planning a dinner for friends. Parking is difficult in her neighborhood. She reserves two parking spaces 24 for friends. The scenario shows how she reserves the reservations, how her friends receive the reservations from Alice, how her friends find their parking spaces 24, and how they identify themselves to the server after they park.

| Time | Event |
|---|---|
| Tuesday 7:00 am | Making a guest reservation. Alice is planning a dinner party for several friends for the upcoming Friday evening. Some of her friends live in the neighborhood, but two guests, Bob and Charlene, will each be driving. Since parking is difficult and scarce in her neighborhood, Alice decides to reserve two parking places for them. Alice logs into the Web site for the parking services 12 and selects the section for making guest reservations. The server retrieves Alice's parking account, then opens a calendar and asks her to select the number of parking reservations and the desired day and time for each parking reservation. Alice selects Friday from the hours of 7 pm to Saturday morning at 1 am. She asks for two parking reservations. |

-continued

| Time | Event |
|---|---|
| | The server knows the address of Alice's residence and displays a map centered around Alice's home. The server then highlights two available parking spaces A and B that are closest to Alice's home and shows a reservation cost of $10.00 each for the evening. The user interface also enables Alice to choose from other available parking spaces 24.
Alice confirms the two parking spaces A and B.
The server asks her to enter either the email or mobile telephone number of her two guests.
Alice enters the email addresses of Bob and Charlene. She also enters a short text message for them and confirms the purchase of the parking reservations.
The server logs the purchase and sends an email to Bob and Charlene containing the following information:
(1) The email message from Alice.
(2) Approved contact information for Alice.
(3) Alice's address.
(4) A map showing the location of Alice's home.
(5) The number of the parking spaces reserved for them on the block where Alice lives.
(6) An image with a 2-dimensional barcode that identifies the reservation, such as a QR code. |
| 7:10 am | Bob and Charlene receive their emails for the parking reservations for Alice's dinner party for parking spaces A and B, respectively. |
| 5:00 pm | Parking denied. Dan, Alice's neighbor, arrives and parks in parking space A. The parking indicator 23 displays Green (available) and the parking device 21 shows the time available until 6:45 pm. Dan parks in parking space A, but ignores the timer display.
The vehicle sensor 22 detects the arrival of Dan's car and sends a message to the server.
The server acknowledges and logs the event. The server notices that the parking space 24 is reserved, starting at 7:00 pm. The server sends the information to the parking device 21. The server also instructs the parking indicator 23 to display Yellow with instructions to the parking device 21 to enter the "Reserved Check-In" state and begin a countdown for the grace period (00:05).
The parking indicator 23 displays Yellow and the parking device 21 begins a countdown for the check-in grace period. The parking device 21 displays a courtesy notice, staying "Please check-in. Parking space is reserved tonight starting at 7:00 pm."
Dan sees the limited time restriction for the parking space 24. He looks around, chooses a different place to park, and moves his car.
The vehicle sensor 22 detects the departure of Dan's car and sends a message to the server. |
| 5:05 pm | The server acknowledges and logs the vacancy. The server looks up the constraints on parking space A and determines that parking is available until 6:45 pm. The server sends a message to the parking indicator 23 nearest to parking space A to display Green and the parking device 21 to start a countdown to 6:45 pm and enter a "parking-available" state. |
| 5:45 pm | The server notices that the amount of time available for parking space A is now less than the minimum long interval of one hour. The server sends a message to the parking indicator 23 to display Yellow and the parking device 21 to enter a "limited-parking-availability" state. The server also instructs the parking device 21 to keep counting down the available time. The same instructions are sent to the parking indicator 23 and parking device 21 nearest to parking space B.
The respective parking indicators 23 nearest to parking spaces A and B display Yellow and the corresponding parking devices 21 keep counting down the available time. |
| 6:45 pm | The server notices that parking spaces A and B have less than the minimum time between reservations and that guest parkers are due to arrive. The server sends messages to the respective parking indicators 23 nearest to parking spaces A and B to display Red and to the corresponding parking devices 21 to flash the LED lights in a "guest-arrival" light pattern and enter the "guest-check-in" state.
The parking indicator 23 at parking space A displays Red and the parking device 21 starts flashing its lights in the "guest-arrival pattern" light pattern, as well as showing zero available time. |
| 6:50 pm | Bob arrives on Alice's block first and sees the two parking devices 21 with their LED lights flashing colors. He drives by and notices that the first space, parking space A, is his reserved parking space. He parks there.
The vehicle sensor 22 detects the arrival of Bob's car and sends a message to the server.
The parking server acknowledges the message and notices that a guest is expected. The server also instructs the parking indicator 23 |

| Time | Event |
|---|---|
| | to display Yellow with instructions to the parking device 21 to enter the "Reserved Check-In. This space reserved now for guest check-in" state and begin a countdown for the grace period (00:05). Bob approaches the parking device 21 and pushes a "check-in" button. The parking device 21 sends a message to the server. The server reviews check-in options for Bob. The server notices from Bob's email address that Bob already has a parking account with Bob's credit card number and telephone number. The server sends a message to the parking device 21 with this information. The parking device 21 presents choices for checking in to Bob, who chooses to check in by sliding his credit card. The parking device 21 sends the credit card information to the server, which recognizes the credit card number as acceptable proof of identity for Bob. The server creates a message for the parking device 21 with the following information: (1) Welcoming Bob (2) Telling him that his parking space 24 is reserved and paid through 1 am (3) A message from Alice Since Bob has a parking account, the server looks up Bob's preferences. The server notices that Bob wants text alerts when time is running out. The server sends a message to parking indicator 23 to display Green and the parking device 21 to begin a countdown to 1 am. The server also instructs the parking device 21 to enter the "parking-unavailable" state and stop flashing the "guest-arrival" light pattern. The parking indicator 23 displays Green (for paid) and the parking device 21 displays the message to Bob and begins a countdown to 1 am. The parking device 21 also stops flashing the "guest-arrival" light pattern. Bob walks to Alice's house. |
| 7:05 pm | Charlene arrives on Alice's block. She sees the flashing Yellow parking indicator 23. She drives over and finds the parking indicator 23 is at parking space B. She parks there. The vehicle sensor 22 detects the arrival of Charlene's car and sends a message to the server. The parking server acknowledges the message and notices that a guest is expected. The server also instructs the parking indicator 23 to display Yellow with instructions to the parking device 21 to enter the "Reserved Check-In. This space reserved now for guest check-in" state and begin a countdown for the grace period (00:05). Charlene approaches the parking device 21 and pushes a "check-in" button. The parking device 21 sends a message to the server. The server reviews check-in options for Charlene and notices that Charlene does not have a parking account with the parking services 12. The server remembers sending a QR code to Charlene through her email account. Charlene could also use host confirmation to check in. The server puts information about these options into a message, which is sent to the parking device 21. The parking device 21 displays the message to Charlene, who conveniently already has a printout of the QR code ready. Charlene holds the QR code in front of the parking device 21, which scans the QR code and sends the QR code to the server. The server checks the QR code, which is correct and accepted as proof of identity for Charlene. The server creates a message for the parking device 21 with the following information: (1) Welcoming Alice (2) Telling her that her parking space 24 is reserved and paid through 1 am (3) A message from Alice The server sends a message to parking indicator 23 to display Green and the parking device 21 to begin a countdown to 1 am. The server also instructs the parking device 21 to enter the "parking-unavailable" state and stop flashing the "guest-arrival" light pattern. The parking indicator 23 displays Green (for paid) and the parking device 21 displays the message to Bob and begins a countdown to 1 am. The parking device 21 also stops flashing the "guest-arrival" light pattern. Charlene walks to Alice's house. |
| 11:30 pm | Bob leaves Alice's dinner party. He goes to his car and drives home. The vehicle sensor 22 detects the departure of Bob's car and sends a message to the server. The server logs that Bob has left and looks up constraints on the parking space 24. The server finds that there are no parking reservations until 10:00 am on Saturday and sends a message to the parking indicator 23 to display Green and the parking device to enter a "parking-available" state and start counting down until 10:00 am. |

In a variation on this scenario, Alice could be permitted to reserve a block of parking spaces 24 without assigning specific spaces to specific people. In other cases, she could assign individual parking spaces 24. As well, Charlene may not have the QR code available at check-in and the parking device 21 could offer to call Alice, who could then push a button on her telephone or say, "Yes" to a recorded confirmatory message that included Charlene's voice. In other variations, the server could send a text message to Charlene's mobile telephone. She could reply, "Yes" to signal arrival at the parking space 24. Still other variations are on guest parking are possible.

Figure 13A:
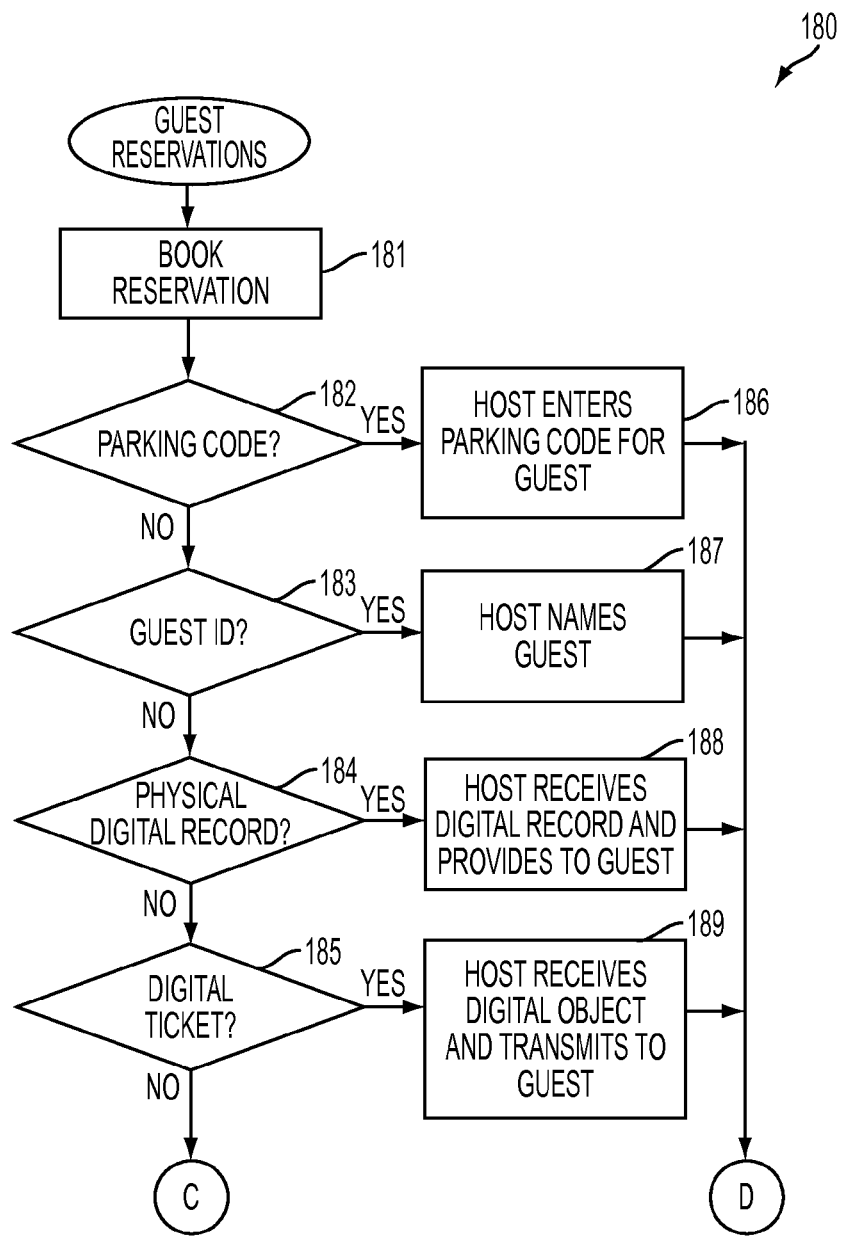
FIGS. 13A-13B are flow diagrams showing a routine for a guest reservation service for use in the parking services of FIG. 1.
Figure 13B:
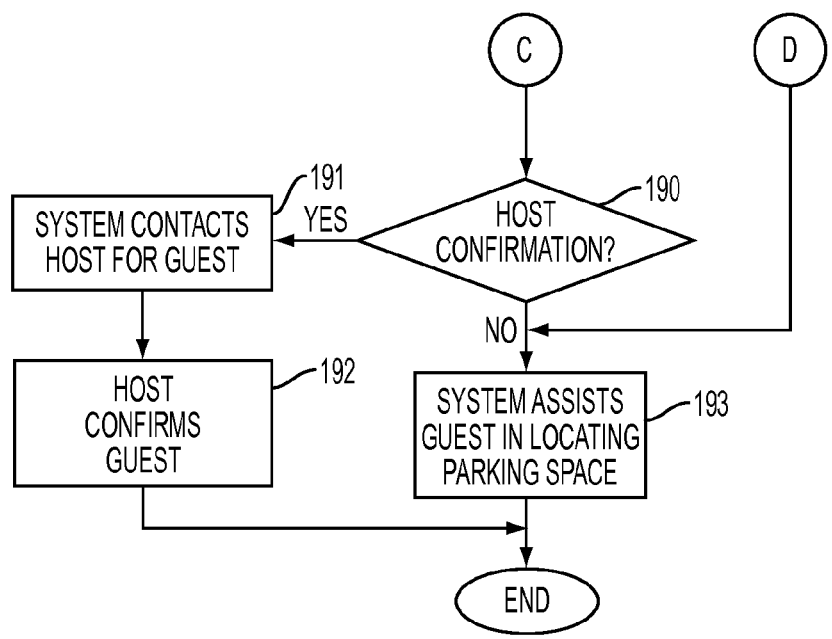

The guest parking service differs from a regular reservation in that the parking services 12 need to validate a possibly unknown guest when they park. In several of these approaches, the parking services 12 can provide a grace period for the host and guest to carry out the validation process. FIGS. 13A-13B are flow diagrams showing a routine for a guest reservation service 180 for use in the parking services 12 of FIG. 1. Several approaches can be used to enable the guest to check in when they have parked. By way of example, the approaches include:

Parking Code (step 182). When a host creates a guest reservation (step 181), the parking services 12 generates a parking code, such as a four-digit number, that the guest can enter into a parking device 21 or parking services kiosk 19 at check-in present. The parking code can be generated in various different ways, such as in the form of an email, or text message. The parking code is given to the host, which he can pass on to the guest or enter into a parking device 21 or parking services kiosk 19 himself (step 186).

Guest Identification (step 183). When a host creates a guest reservation (step 181), the host can provide the name of the guest (step 187) and possibly other information that can help to identify the guest, such as the guest's telephone number or email address, to the parking services 12, which can be used to match a guest to the guest reservation during check-in. If the parking identity of the guest is known to the parking services 12 by virtue of having a parking account 37*a-c*, the guest can use his parking identity or other identification during check-in.

Physical Digital Record (step 184). When a host creates a guest reservation (step 181), the parking services 12 send the host a bar code, QR code, or other unique digital record (step 188) that can be physically reproduced for the parking event, generally by print out by the host or the guest, together with directions for finding the parking space 24. The guest presents a facsimile or other printout of the physical digital record using the user interface of a parking device 21 at check-in, which the parking device 21 can digitally read and use to confirm the reservation.

Digital Ticket or Permit (step 185). When a host creates a guest reservation (step 181), the host receives a digital object, possibly encrypted, which is electronically transmitted to the guest (step 188). The guest presents the digital ticket or permit to the parking services 12 at check-in through transmission or display from a mobile device 15, 16, 17.

Host Confirmation (step 190). The validity of a guest could be confirmed by the host. The parking services 12 contact the host when the parking event occurs (step 191), or the guest contacts the host directly, such as by mobile telephone. The use of the reserved parking space is conditioned upon the host confirming the motorist's identity as the guest. Alternatively, the parking device 21 could open a voice, text message, or video connection to the host. The host then would confirm via a networked device that the vehicle in the parking space belongs to the guest (step 192).

In a further embodiment, a host is permitted to make reservations for multiple guests at the same time. For example, the host could reserve a group of parking spaces 24 and get a single parking code or digital ticket or permit for all guests. A guest could park in any of the available parking spaces 24 in the group.

The parking services 12 also can help guests find their reserved parking spaces 24 (step 193). In the simplest case, the parking spaces 24 may simply be labeled. However, labels may be difficult to see at night. Alternatively, the parking services 12 could cause the parking indicators 23 to flash using, for instance, red-and-green lights, to draw the attention of the guest searching for the parking space 24. The flashing behavior could begin at the beginning of the parking reservation period. The parking services 12 could also flash the lights on or give some other indication using a parking device 21 or parking services kiosk 19 when the guest gets near the parking space 24 or requests additional assistance. The request could be made via an application on the guest's mobile device 15, 16, 17 or just be triggered by the start time of the guest reservation.

If the parking reservation was communicated electronically, such as by email or text message, a map could be included by the parking services 12, as well as GPS coordinates for the parking space 24, which could both be transmitted into a GPS application in the guest's mobile device 15, 16, 17 to guide the guest to the parking space 24. As well, the parking reservation can be provided as a hyperlink, such as a Uniform Resource Identifier (URI) to open up a Web page with directions and other information using a QR code or similar information encoding. The mobile device 15, 16, 17 may itself be able to alert the guest that they are near their guest parking space 24, or could send a signal to the parking services 12, parking device 21, or parking services kiosk 19 to ask that a parking indicator 23 or other indication be enabled to guide the driver in. As well, the guest could be given a telephone number to call shortly before reaching the area to request that the indicators begin flashing. The GPS coordinates of the parking space 24 could also be provided to applications executing on on-board navigational or informational devices 17 in the guest's vehicle or on a mobile device 15, 16, 17 to provide maps, audio, or visual signals as to the guest as they near the parking space 24.

Service: Space Renting

In urban settings, non-public parking spaces 24, such as private driveways or curb cuts in front of residences and other buildings, at times remain unavailable simply for lack of an easy way to indicate the times when those parking spaces 24 could be used by the public. For example, residential driveways are ordinarily on private property and generally unavailable to people who do not know the owners or otherwise lack permission. Similarly, curb cuts where driveways meet the street are generally off-limits to park. As well, small businesses often have parking lots, which remain empty outside of regular business hours, yet could be used by other motorists if some way of controlling their use was available.

Guest parking reservations are transacted in separate related parts. First, the controller of the potential parking space 24, typically, the property owner, resident, or custodian, must be identified. Only the space's legitimate controller can be provided by the parking services 12 with the privilege for controlling that parking space 24 on their parking account. Next, the controller interacts with the parking services 24 to establish times of availability for the potential parking space 24. Third, the controller is allowed to check online using, for instance, a Web site operated by the parking services 12, to determine whether the parking space 24 is currently occupied. Finally, parking services 12 must be able to contact or send a message to the motorist currently using the parking space 24, generally on the behalf of the space's controller.

The "space renting" service enables individuals holding rights to or otherwise in legitimate control of potential parking spaces, such as landlords or urban residents, to make those parking spaces 24 available for public parking during periods that they specify, thereby supplementing the supply of public parking spaces. Space renting can be illustrated by a scenario. In this scenario, a residential street is a block or so away from a busy commercial street. On the commercial street, curbside on-street parking is usually full during the day, while parking is limited on the residential street due to a plethora of curb cuts that leave amounts of space too short to offer practicable parking. Here, parking devices 21 and parking indicators 23 are placed at driveway curb cuts. Parking in front of the driveways is intermediated by the parking infrastructure and to encourage residents to make their driveway space available for public parking, a portion of the parking revenues is shared with the affected residents.

| Time | Event |
|---|---|
| Saturday | Alice has an agreement with the parking authorities to rent out the curb space in front of her driveway when possible. The parking services 12 notices that Alice has not yet confirmed any parking hour assignments for this week and emails a reminder to Alice. |
| Sunday, 10 am | Weekly setup. Alice reads the email reminder. By default, she makes her parking space 24 available nominally from 10 am until 5 pm on most weekdays. Normally she takes Friday off and reserves the parking space 24 for her own use. However, on Thursday of this week, she remembers that she wants to keep her driveway clear because her relatives will be visiting and she needs to run errands. Alice logs into her parking account. She selects the Web page that controls the availability of her curb space. Interacting with a calendar interface, Alice changes her curb space availability to omit availability on Thursday. |
| Monday, 9:00 am | The parking indicator 23 at Alice's parking space 24 displays Red (unavailable) and the corresponding parking device 21 shows a countdown to 10 am. |
| 9:30 am | Alice gets ready to leave for work. Pulling out of driveway. As Alice starts to pull out of her driveway, the vehicle sensor 22 detects the movement of her car and sends a message to the server. The server acknowledges the message and notices that the parking space 24 is reserved for Alice. The server instructs the parking indicator 23 to display Yellow and the parking device 21 to enter the "check-in reserved" state with a countdown for the check-in grace period. The parking indicator 23 displays Yellow and the parking device displays, "Please check in." The countdown timer begins. |
| 9:31 am | Alice pulls into the street and drives off to work without interacting with the parking device 21. The vehicle sensor 22 detects that the parking space 24 is no longer occupied and sends a message to the server. The server logs that the parking space 24 is not occupied and notices that the parking space 24 is still reserved by Alice until 10:00 am. The server instructs the parking indicator 23 to display Red and the parking device 21 to display, "No Parking--Reserved." The server also instructs the parking device 21 to enter the "no-parking-reserved state" and start the timer to countdown until 10 am. The parking indicator 23 displays Red and the parking device 21 displays, a "No Parking-Reserved" message. The parking device 21 also starts the countdown timer to show the time remaining until open parking is available in Alice's parking space 24. |
| 9:45 am | The server carries out a routine periodic "ping" of Alice's parking device 21 and requests the parking device 21 to enter the "report-status" state. The parking device 21 receives the message, checks its status, and sends back a status report. The report includes the information that the parking space 24 is vacant and may also optionally include other maintenance statistics, such as battery status, charging rate, and so forth. |
| 10:00 am | Marking space as available. The server notices that the parking space 24 is vacant and not reserved. The server also notices that there is a four-hour parking limit for the neighborhood, that the parking space 24 is reserved for Alice at 5 pm, and that no other constraints are in place for today. The server sends a message to the parking indicator 23 to display Green and the parking device 21 to enter the "parking-available" state with a countdown timer set for four hours that is not counting down. The parking indicator 23 displays Green and the parking device 21 sets the timer to show 4:00 hours availability. |
| 12:45 pm | The server notices that the available time on Alice's parking space 24 is now four hours, including a 15-minute minimum in-between reservation interval. The server sends a message to the parking indicator 23 to continue to display Green and the parking device 21 to continue the "parking-available" state, but to start the timer counting down from four hours to zero, ending at 4:45 pm. |

| Time | Event |
|---|---|
| | The parking device 21 starts the countdown timer to show the remaining available time, counting down to 4:45 pm. |
| 1:00 pm | Public Parking. Bob cannot find parking on the commercial street near Alice's street. He sees that the parking space 24 in front of Alice's driveway is available and parks there.<br>The vehicle sensor 22 detects Bob's arrival and sends a message to the server.<br>The server acknowledges the message and logs the occupancy. The server checks for any open constraints and sees that the parking space 24 is available for parking. The server instructs the parking indicator 23 to display Yellow and the parking device 21 to enter the "check-in" state with a parking timer counting down the check-in grace period of two minutes.<br>The parking indicator 23 displays Yellow and the parking device 21 starts the countdown for the check-in grace period. The parking device 21 prompts Bob to "Please check in."<br>Bob approaches the parking device 21 and slides his credit card. The parking device 21 sends his credit card information to the server.<br>The server checks and authorizes Bob's credit card. The server determines the parking time available and applicable parking rates. The server notices that Bob likes to get text message to warn that his parking time is running out and sends the information to the parking device 21.<br>The parking device 21 displays a notice that the parking space 24 is available until 4:45 pm and that the parking rate is $1.00 per hour. The parking device 21 defaults to one hour of parking and tells Bob to use the buttons on the user interface to revise his parking time Bob chooses to park for only two hours, that is, until 3 pm.<br>The parking device 21 sends Bob's parking choices to the server. The server instructs the parking indicator 23 to display Green (paid) and the parking device 21 to start the timer to countdown from two hours (time left) and enter the "paid-parking" state. The server logs the parking event to credit a portion of the parking revenue to Alice for making parking on her driveway available to the public. |
| 2 pm | Coming home early. Alice decides to go home early. She logs into the parking service 12 using the Web site, or alternatively, uses an app on her mobile telephone. Alice discovers that her driveway parking space is now occupied and paid until 3 pm. Through the server, she adjusts the availability time for her parking space 24 for the remainder of today to make the parking space 24 unavailable to the public as the current parker, Bob, leaves.<br>Alice indicates that she wants to get a text message when the parking space 24 becomes available. |
| 2:15 pm | Bob finishes his errands early. He returns to his car and vacates the parking space.<br>The vehicle sensor 22 detects his departure and sends a message to the server.<br>The server acknowledges the message and logs that the parking space 24 is vacant. The server checks for any constraints and notices that Alice is re-assigning the parking space to her own use. The server also notices that she has requested a text message when the parking space 24 becomes vacant, which the server sends to Alice. The server instructs the parking indicator 23 to display Red and the parking device 21 to display a message "No Parking-Reserved" with a countdown to 10:00 am. The server instructs the parking device 21 to enter the "no-parking" state. |
| 2:30 pm | Alice receives the text message from the server. On the way home, she stops at a grocery store. |
| 3:00 pm | Resident in driveway. Alice pulls into her driveway, but pauses at the start of her driveway to unload some things from her car.<br>The vehicle sensor 22 detects Alice's car at the end of her driveway and sends an occupancy message to the server.<br>The server notices that the parking space 24 is reserved for Alice and sends a message to the indicator 23 to display Yellow and the parking device 21 to display a no-parking alert and enter the "check-in" state with a countdown for a check-in grace period.<br>The parking indicator 23 starts to flash Yellow and the parking device 21 displays, "Reserved parking. Please check in."<br>Alice swipes her credit card and the parking device 21 sends the information to the server.<br>The server recognizes that the credit card is associated with Alice's parking space 24 and logs that Alice is parked in her driveway. The server sends a message to the parking indicator to display Red (no parking) for other motorists. |
| 3:30 pm | Alice finishes unloading her car. She then returns to her car and drives into her garage.<br>The vehicle sensor 22 detects that the parking space 24 is now empty and sends an occupancy message to the server. |

| Time | Event |
|---|---|
| | The server logs the vacancy and notices that the parking space 24 is reserved for Alice overnight. The server instructs the parking indicator 23 to continue to display Red and the parking device 21 to continue to show, "No Parking-Reserved" with a countdown until 10 am on Tuesday morning. |
| Friday | Alice gets a call from work. They are shorthanded and ask whether she can come in. (She took a day off from work on Thursday.) |
| 10:00 am | Alice agrees and gets ready for work. |
| 10:15 am | Alice realizes that she can make her parking space 24 available today, contrary to her usual pattern. She selects the Web page that controls the availability of her curb space. Interacting with a calendar interface, Alice changes her curb space availability to include availability starting from at 10:30 am until 5 pm today. |
| 10:20 am | Alice leaves for work. |
| 10:30 am | The server notices that Alice's parking space 24 is now available to the public and looks up any constraints. The server instructs the parking indicator 23 to display Green and the parking device 21 to enter the "available-for-parking" state with the timer showing availability for four hours (without counting down). The parking indicator 23 displays Green and the parking device 21 displays, "Available" and sets the display to four hours without counting down. |

Figure 14:
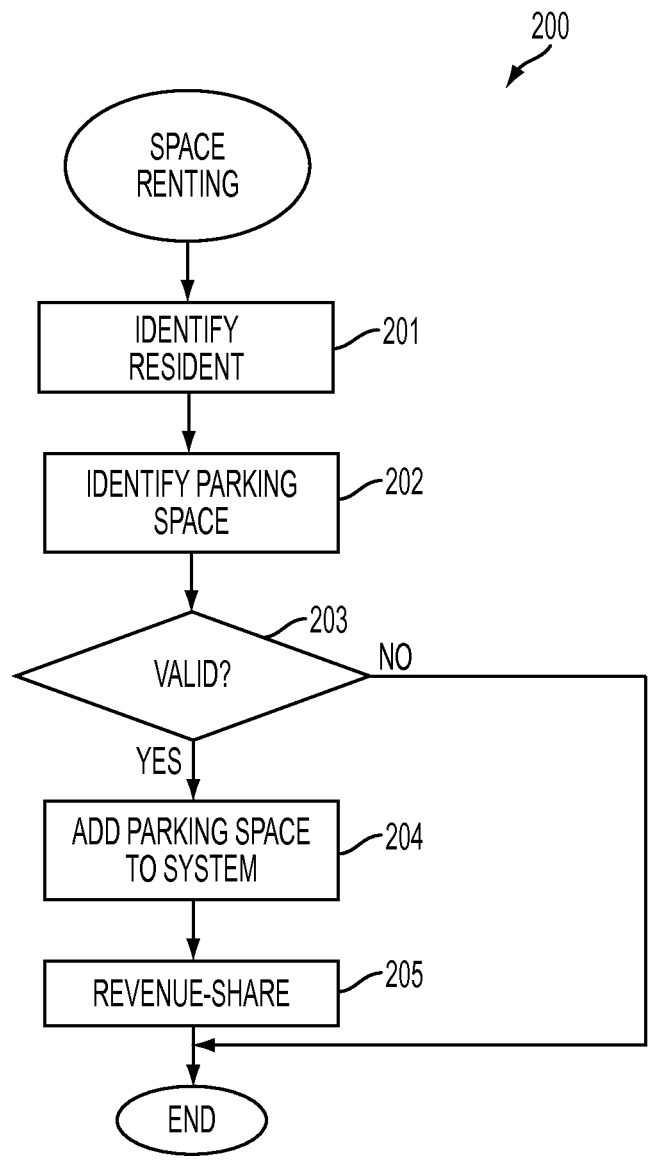
FIG. 14 is a flow diagram showing a routine for a space renting service for use in the parking services of FIG. 1.

Space renting therefore opens up otherwise unavailable parking to use by the general public, subject to constraints set by the owner or custodian of the parking space 24. FIG. 14 is a flow diagram showing a routine for a space renting service 200 for use in the parking services 12 of FIG. 1. Preliminarily, if not already present, the city or municipality places a parking device 21 or parking services kiosk 19 near the parking space 24 at the resident's house. The parking services 12 then associates the parking device 21 or parking services kiosk 19 with a controlling parking account. The system enables the resident to make the curb-cut parking space 24 available for renting on some days, and unavailable on other days, depending upon his schedule. On an ongoing basis, the resident may have some days when he regularly rents the parking space 24 out, such as while away from home or at work. On other days, however, like on the weekends, the resident may be at home and need his own parking space 24 for his own use.

Residents or other individuals who control a rented parking space 24 are provided a permit by the parking services 12 that allows them to set constraints on the use of the parking space 24. For example, the residents could limit and change the hours of availability, prohibit the parking of oversized vehicles, motorcycles, trailers, taxicabs, and the like, or only allow certain classes of vehicles to park. Other types of permit uses and restrictions are possible.

Several processes are undertaken to facilitate space renting. In one process, the resident applies for a parking device 21 or parking services kiosk 19, which would need to be installed near the parking space 24 that the resident intends to offer for rental. In a second process, the local parking authorities add the parking device 21 or parking services kiosk 19 into the parking services 12. In a third process, the resident enters parking constraints, which indicate when the parking space 24 may be rented. In a fourth process, which occurs once the parking space 24 has been assimilated into the parking services 12, drivers can make reservations, check-in, or leave the parking space 24. At a high level, the parking services 12 first identify the resident or rights holder (step 201) and determines the identity of the parking space 24 being offered for rental (step 202). If the ability of the resident to rent the parking space 24 is valid (step 203), the parking space 24 is added to the set of parking spaces available through the parking services server (step 204). The service thus has the public good of using potential parking spaces 24 more effectively without the need to build more.

Revenues from motorists parking in these spaces could be shared with the residents or individuals who control the space (step 205). In one embodiment, the resident receives compensation on a periodic basis. The amount of compensation can depend upon the amount of revenue actually collected for the parking space 24, which can help guard against abusive rental practices, such as where a resident blacks out the most valued hours in expectation of receiving revenue for a parking space 24 that actually sees little use, thereby not actually contributing the space for public use.

Merchant Parking Services

Service: Validate Parking

The validate parking service enables merchants to validate, that is, pay for parking for their customers, under differing policies of validation. For instance, when cities have a validated parking program, their parking authorities can vary how parking gets paid. In the simplest case, parking rates are the same whether they are paid by a driver or by a merchant. As well, integrated approaches can be developed that would allow merchants to collectively pool the payment of parking for their customers, including where validated parking is provided in conjunction with escalating rates, such as described supra with respect to FIG. 8.

The parking services company has an established way to register each merchant using a parking payment account, which could be an electronic banking card, such as a credit card or a debit card, a bank account, an account with an acquirer that performs payment processing for commercial vendors, or some other means. The parking authorities sets up any regulations about other required qualifications for merchant parking accounts. The parking services 12 also gives each merchant point-of-sale devices initialized for their parking account when the account is set up. The point-of-sale device could be a mobile device with wireless communication to the parking server. They also get a merchant permit associated with their parking account. Finally, a merchant could validate customer parking by simply providing a printed token or a barcode, QR code, or other encoded token to the customer, which the customer could then respectively feed into or hold in front of a camera built into the nearest parking device 21 or parking services kiosk 19 to trigger payment of the parking by the merchant.

The validate parking service can be illustrated by a scenario in which Alice parks on the street and gets her parking validated while shopping.

| Time | Event |
| --- | --- |
| Friday 10 am | Alice drives to the University Avenue shopping district in her city. She needs to shop for a few things and eat lunch. Parking space A is not occupied. The parking indicator 23 closest to the parking space 24 displays Green (available) and the parking device 21 shows four hours availability.<br>Check-in. Alice pulls into parking space A.<br>The vehicle sensor 22 detects her arrival and sends a message to the server.<br>The server logs the occupancy and checks for any constraints. The server sees that parking is available and sends a message to the indicator 23 to display Yellow and the parking device 21 to display a no-parking alert and enter the "check-in" state with a countdown for a check-in grace period.<br>The parking indicator 23 starts to flash Yellow and the parking device 21 displays, "Please check in."<br>Alice swipes her credit card and the parking device 21 sends the information to the server.<br>The server checks and authorizes Alice's credit card. The server determines the parking time available and applicable parking rates. The server discovers that parking is free for the first hour, $2.00 for the second hour, $4.00 for the third hour, and $6.00 for the fourth hour. The server notices that Alice likes to get text message to warn when her parking time is running out. The server also sends the check-in information to the parking device 21.<br>The parking device 21 shows the parking rates to Alice. The parking device 21 defaults to one hour of free parking and tells Alice to use the buttons on the user interface to revise her parking time. Alice selects two hours of parking.<br>The parking device 21 sends Bob's parking choices to the server.<br>The server instructs the parking indicator 23 to display Green (paid) and the parking device 21 to start the timer to countdown from two hours (time left) and enter the "paid-parking" state.<br>The parking indicator 23 displays Green (paid) and the parking device 21 starts the timer to show the amount of time remaining. |
| 10:10 am | Discretionary validation. Alice begins her shopping. She starts by getting a few small items at the corner drug store, which does not usually validate parking for small purchases since most customers finish shopping in only a few minutes. Alice buys her items. |
| 10:15 am | Alice then heads to Heidi's Shoes. |
| 11:15 am | She browses for a while and ends up buying a new pair of shoes using her credit card. The clerk asks her whether she wants her parking validated. Alice agrees and the clerk slides her credit card through the parking point-of-sale mobile device.<br>The clerk opts to validate Alice for an hour or up to $2.00. The point-of-sale mobile device sends this selection to the server.<br>The server recognizes the Heidi's Shoes point-of-sale mobile device and receives Alice's credit card information. The server looks up Alice's parking space 24 and sees that she is parked at parking space A. The server logs the transaction with Heidi's Shoes and sends a message to the point-of-sale mobile device confirming the parking validation. The server also sends a text message to Alice telling her that she has been validated with $2.00 of parking from Heidi's Shoes and that her parking bill has been adjusted, so that the first two hours of parking are free.<br>The Heidi's Shoes clerk sees the confirmation, tells Alice that her space has been validated, and thanks Alice for her business. |
| 11:30 am | Alice does some window shopping. She decides to get an early lunch at University Cafe. She runs into a friend at the cafe and they start lunch. |
| 11:45 am | The server notices that Alice's car has only 15 minutes left and is now in the expiration alert period. The server sends Alice an alert text message and asks whether she would like to extend her parking. The rate for parking in the third hour is $4.00 per hour.<br>The server sends a message to the parking indicator 23 to display Yellow and the parking device 21 to continue showing the amount of time left on the meter.<br>The parking indicator 23 displays Yellow and the parking device 21 continues the countdown to noon.<br>Alice's mobile telephone displays the text message from the server. Alice texts back "30," meaning she wants to add 30 more minutes to her parking time.<br>The server receives the message and adds 30 minutes to Alice's parking reservation. The server texts back a confirmation that she is reserved until 12:30 pm and that she will be charged $2.00 for her |

| Time | Event |
|---|---|
| | parking. The server logs the changes.<br>The server sends a message to parking indicator 23 to display Green and the parking device 21 to revise the countdown to 12:30 pm.<br>The parking indicator 23 displays Green and the parking device 21 starts the revised countdown. |
| 12:10 pm | Alice is finishing her lunch.<br>Discretionary validation. Alice asks the waiter to validate her parking when she pays her bill at University Cafe. However, University Cafe has a policy to only validate parking when asked and that waiters have discretion on the amount of the validation according to the size of the purchase.<br>Alice had an $8.00 lunch and is a regular customer, so the waiter tells Alice that she can give her a $1.00 parking validation. Using the point-of-sale mobile device, the waiter swipes Alice's credit card and enters a $1.00 parking credit. The point-of-sale mobile device sends the information to the server.<br>The server recognizes the University Cafe point-of-sale mobile device and records the $1.00 parking credit. The server sends a confirmation message to the point-of-sale mobile device and also texts a message to Alice telling her that she has received a $1.00 parking credit from University Cafe. The server logs the transaction and credits Alice with $1.00 towards her parking. |
| 12:15 pm | The server notices that the time left for Alice's parking is almost expired and within the alert message interval. The server sends a message to display Yellow and the parking device 21 to continue showing the amount of time left on the meter. The server also sends a message to Alice, as before, asking whether she wants to extend her time.<br>Alice sees and ignores the text message. She returns to her car, stows her purchases, and pulls out of parking space A.<br>The vehicle sensor 22 detects Alice's departure and sends a message to the server.<br>The server acknowledges the message and checks for any open constraints. The server sees that the parking space 24 is available for parking. The server instructs the parking indicator 23 to display Green and the parking device 21 to enter the "available-parking" state with a parking timer counting down to four hours. |

Figure 15:
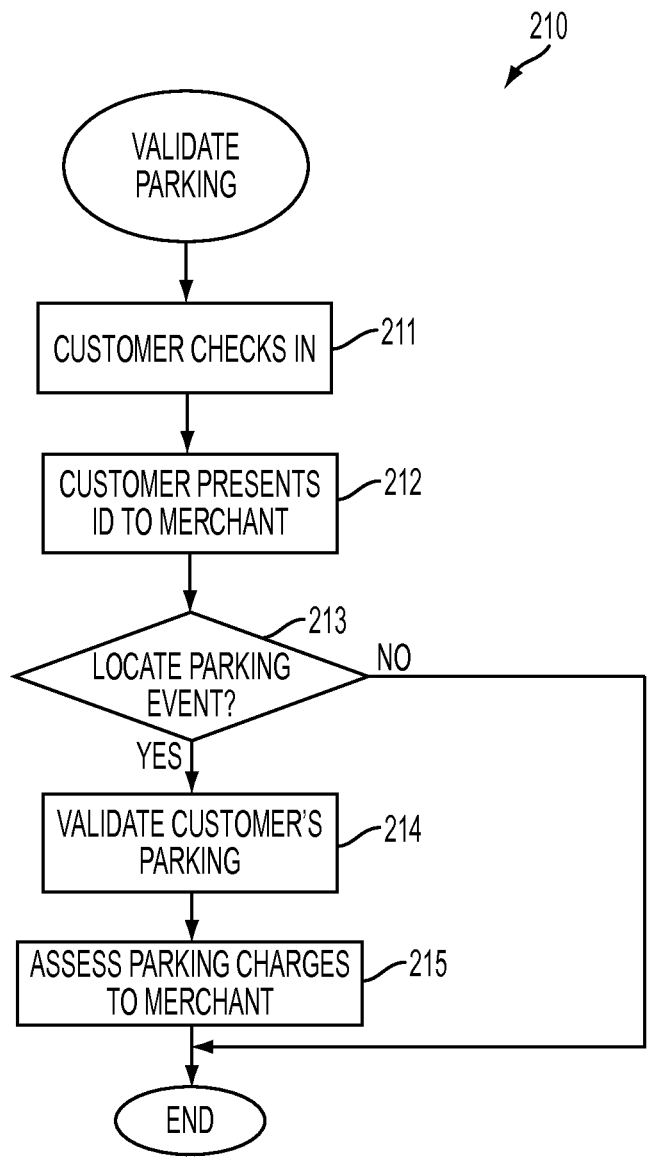
FIG. 15 is a flow diagram showing a routine for a validate parking service for use in the parking services of FIG. 1.

One of the service's goals is to make parking transactions easier for both merchants and their customers by assisting with identifying the customer and the parking event. FIG. 15 is a flow diagram showing a routine for a validate parking service 210 for use in the parking services 12 of FIG. 1. In the normal case, the customer is assumed to have parked in a location near the merchant's place of business. Where the customer has already checked in to a parking space 24 (step 211), as described supra, the parking services 12 will have already recorded the details of the parking event, including when and where the customer parked and the customer's identity. When the customer provides some form of identification to the merchant (step 212), such as a electronic banking card, driver's license, or receipt provided by the parking device 21 or parking services kiosk 19, the parking services 12 attempts to locate the parking event (step 213) and, if successfully found, validate the parking (step 214), which generally tenders payment, at least in part, for the use of the parking space 24. In a streamlined scenario, validation can take place automatically, such as when the customer makes a purchase with an electronic banking card, such as a credit card or a debit card. When the customer provides, for instance, a credit card at the point of sale, the merchant's point-of-sale terminal or similar system automatically checks the customer's identity into the parking services 12, which can then find the relevant parking event. Policies set by the merchant can set whether validation will be automatic courtesy of the merchant in exchange for the customer's patronage or discretionary, whether the customer must make a minimum purchase, whether only shopping visits of a minimum duration qualify, and how much credit is normally allotted for parking, which can possibly be contingent on the amount of sales to the customer or other considerations. The validation switches parking charges from the customer to the merchant (step 215). In addition, the receipt given to the customer can contain a message thanking the customer for their business and telling them that their parking has been validated.

If the customer does not have a parking identity, or a temporary tourist parking permit, as described infra, the merchant could print a validation ticket or temporary credit or debit card that the customer could take to a parking device 21 or parking services kiosk 19 to carry out validation. The driver could also simply provide the unique identifier assigned to a parking device 21 to the merchant during validation.

Service: Parking Coupons

Figure 16:
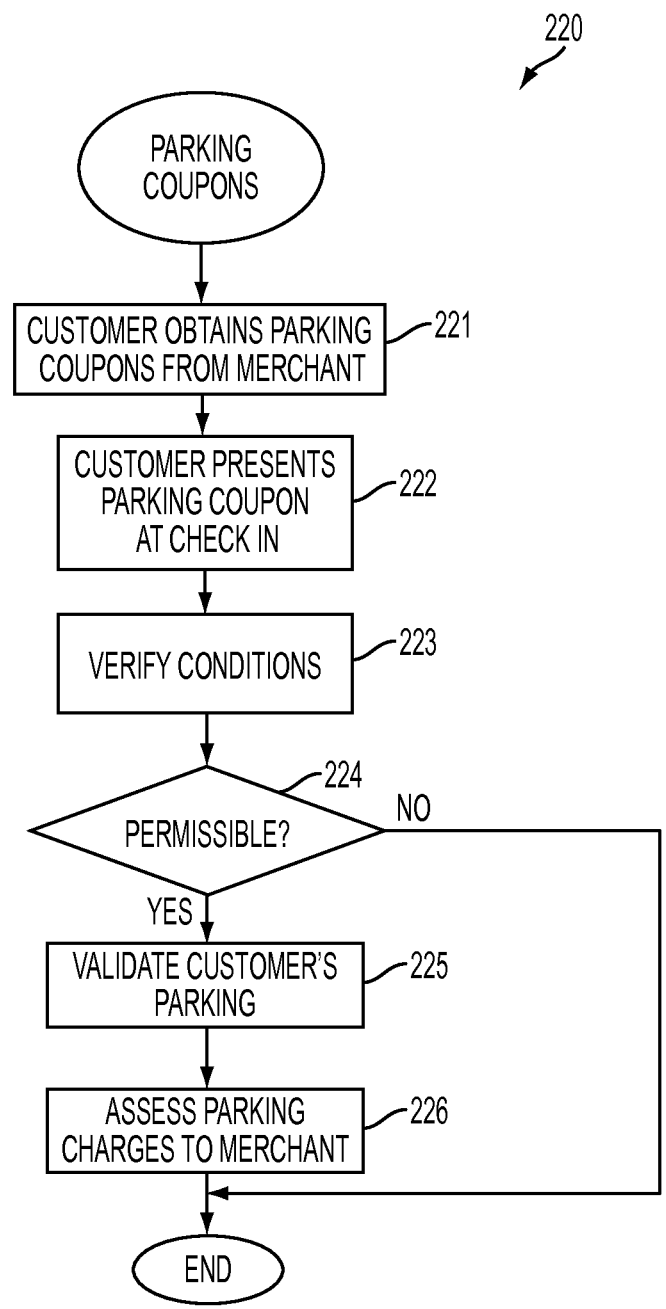
FIG. 16 is a flow diagram showing a routine for a parking coupons service for use in the parking services of FIG. 1.

Merchants may want to encourage potential customers to come to their store as part of a sale or other promotion event. FIG. 16 is a flow diagram showing a routine for a parking coupons service 220 for use in the parking services 12 of FIG. 1. One approach to facilitating merchant promotions is to enable the merchants to issue printed parking coupons, which customers can use at parking devices 21. These coupons could be given out at the store or included in advertisements in newspapers or magazines. The coupons could also be encoded as barcodes, QR codes, and the like, which can be printed as part of an advertisement or downloaded and printed through a Web page or similar online medium. The coupons could also be implemented as digital tickets or permits for use in mobile devices 15, 16, 17.

A customer would thus merely have to first obtain a parking coupon from the merchant (step 221), which is then presented at the parking device 21 or parking services kiosk 19 (step 222) when they park for free or discounted parking. Coupons could be limited to work only on certain days and times and only in parking spaces 24 in the vicinity of the issuing merchant's store and the parking services 12 would first verify that the conditions for parking are met (step 223). If the parking is permissible (step 224), the customer's parking is validated (step 225) and the merchant is assessed their portion of the parking charges (step 226). In a further embodiment, if the customer makes a purchase at the store, the merchant could use the parking coupon at the point-of-sale to upgrade a customer reward or to give the customer an additional discount.

Service: Customer Priority Parking

Figure 17:
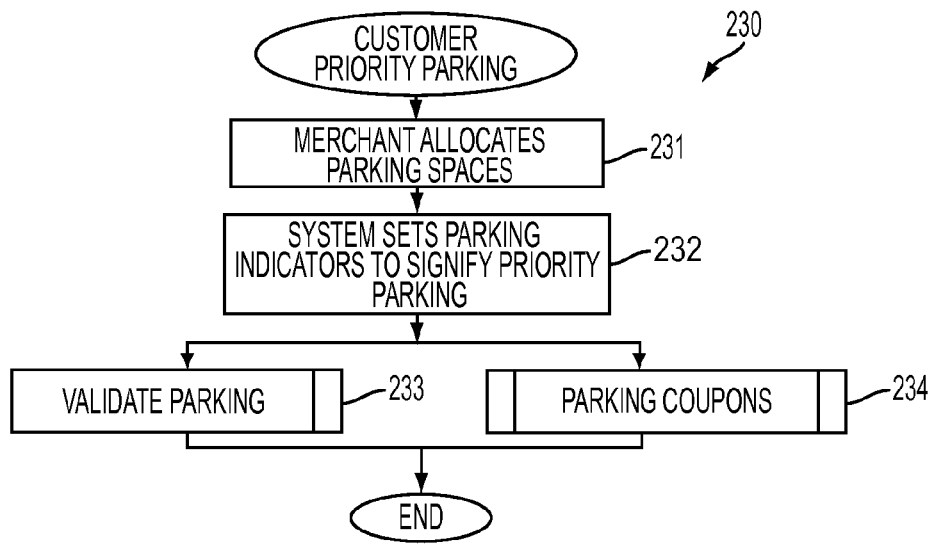
FIG. 17 is a flow diagram showing a routine for a customer priority parking service for use in the parking services of FIG. 1.

Merchants may want to provide priority parking for their customers on the day of a sale or at other times. For example, they may want to encourage customers by providing priority parking for them in front of their store. The customer priority parking service enables merchants to allocate these parking spaces for their customers during a specific period. FIG. 17 is a flow diagram showing a routine for a customer priority parking service 230 for use in the parking services 12 of FIG. 1. Parking is allocated to the merchant by the parking services 12 during the specified parking period (step 231). The parking indicators 23 proximate to the allotted parking spaces 24 are set to indicate the priority status of the parking spaces 24 (step 232). For example, the parking spaces 24 could flash green-and-blue indicators, accompanied by a short message displayed on the parking device 21.

When a customer parks in one of the designated parking spaces 24, the customer could either request parking validation (step 233) or present a parking coupon (step 234), as both described supra, to have their parking validated. Other drivers who park in the allotted parking spaces 24 during the specified parking period would not be able to get validations for parking unless they were also customers and could have increased fees charged for using those parking spaces 24 to help compensate the merchant's outlay.

In a further embodiment, merchants in a shopping district could join together in a promotion to develop district shopping awareness and subsidize parking during the promotion. The parking services 12 could give special discounts or other rewards if the drivers make purchases at multiple stores involved in the promotion.

Service: Merchant-Guided Policies

Merchants may sometimes find changing parking regulations temporarily to be helpful to business. For example, an ice cream shop may want to encourage rapid parking turn-over in front of their shop. A merchant-guided parking service enables merchants purchase changes in regular parking constraints for parking spaces 24 in front of or near to their businesses. Some limits may apply. This service can be combined with customer-priority parking, as described supra, to more effectively control parking in front of or near a business by raising fees and shortening parking periods for non-customers.

Service: Tourist Privileges

Figure 18:
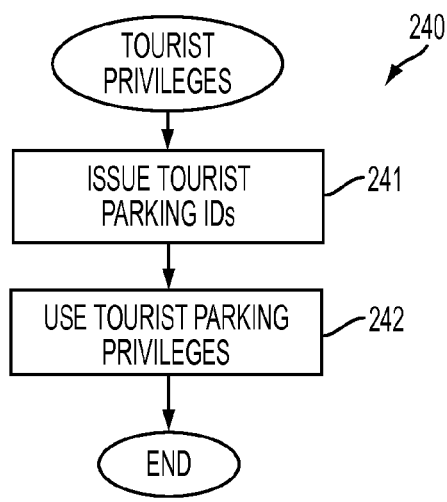
FIG. 18 is a flow diagram showing a routine for a tourist privileges service for use in the parking services of FIG. 1.

In various locales, business districts are sometimes provided specifically for catering to the needs of tourists. FIG. 18 is a flow diagram showing a routine for a tourist privileges service 240 for use in the parking services 12 of FIG. 1. The tourist privileges service includes two separate yet related processes. The first process involves the issuing of tourist parking identification cards (step 241) for use in a tourist area of an urban environment. The parking identification card may be offered by tourism bureaus, hotels, rental car companies, and the like. For example, a rental car agency may issue these cards to visitors, who wish to conveniently run their curb-side parking charges through their rental car contract, rather than having to pay cash or use a credit card. Agencies offering tourist benefits could begin to issue the tourist parking identification cards upon receiving the digital tickets or permits, which are used to activate the cards. The second process involves using the tourist parking identification cards at check in (step 242). Essentially, tourists feed or display their tourist parking identification cards respectively into a card reader on or in front of a camera in the parking devices 21 and parking services kiosks 19. The server authenticates each card by checking code on the card and the digital ticket or permit of the agency that issued the card. Additionally, the displays on the parking devices 21 and parking services kiosks 19 and their associated parking indicators 23 can be set to identify the parking spaces 24 in the tourist area.

The ability to issue tourist parking identification cards could be governed by digital tickets or permit, as described supra. An agency would need to pair-up the parking authorizations provided by their digital ticket or permit to each tourist parking identification card issued. Only those tourist parking identification card that have been authorized by an agency authorized to provide parking privileges to tourists will be recognized by the parking services 12. This step guards against improper use of the tourist parking identification cards by just anyone, such as local citizens who wish to avoid paying for city parking by masquerading (for purposes of parking) as "tourists." These agencies would receive a stack of blank tourist parking identification cards. Using their digital tickets or permits, they would activate these cards. For tracking purposes, the agencies may be required to fill in information about the tourist, sales discounts, and so forth.

Merchants in business districts and tourism bureaus can also promote business and tourism by providing special parking help and privileges to tourists. In effect, a tourist with a parking identification card has a "special permit" that triggers various offers when checking into a parking space 24. Tourist privileges collectively combine services used by the merchants with services used by tourists and business travelers. Tourists can access privileges using a tourist-enabled parking identification card. Tourist privileges can be keyed to specific parking spaces 24 or throughout a tourism business district. Specific privileges for tourists include, for instance, the following benefits:

Extended Parking Limits. Parking limits may be extended for tourists to give them more time to shop and find their way around.

Reserved Tourist Spaces. Some parking spaces 24 in a region could be reserved for the exclusive use of tourists. In one embodiment, these parking spaces 24 would be assigned by parking authorities and, in their normal operation, the nearest parking indicators 23 would display a color, such as blue, indicating that a permit is required. Additionally, flashing lights on the nearest parking device 21, such as blue and green, could be used to signal the type of permit required and would visually distinguish tourist permit parking spaces 24 from loading zones, taxi zones, handicap zones, and so on. When a driver parks in one of these tourist permit parking spaces 24, they would need to use a tourist permit to complete a valid check-in.

Reduced Parking Rates. Tourists may be offered reduced parking rates, subsidized by tourism bureaus, hotels, rental car companies, and the like.

Day Passes or All-Day Rates for Parking. Tourists could also be offered to day passes for free parking or all-day parking rates, along with transportation cards that could connect with other transportation services or be used with merchants for tourist discounts.

Other Discounts. Tourist parking identification cards could be presented to merchants to qualify for discounts in purchasing goods and services.

Additionally, when a vehicle driven by a tourist leaves a parking space 24, the parking services 12 could send the driver a courtesy notice that thanks him for using the parking service and provide a receipt. Additionally, the parking services 12 could send a notice that their car has left the parking space 24, which, for a tourist, may be an early notice that their car has been stolen or towed. The notice could also be provided as a service to all motorists and not just tourists.

Service: Advertising

In one embodiment, the parking devices 21 and parking services kiosks 19 include a display 26 (shown in FIG. 2) for presenting additional information. In a shopping district, for instance, these displays 26 could be used for advertising to promote local businesses. For example, during a sale, a display 26 could run an advertisement for the goods being offered on sale. The advertisements can include color and sound features, as well as directions for reaching the store from the parking device 21. In another example, near mealtime, a display 26 could feature an advertisement for food or drinks available at a nearby restaurant. An interactive advertisement, transacted through a combination of the display 26 and the user interface of the parking device 21, could enable a user to reserve a table at the restaurant.

Commercial Parking Services

Service: Scheduled Deliveries (Flexible Loading Zones)

Loading zones are often problematic in business districts. Local governments often resist allocating loading zones to preserve public parking, particularly as loading zones can tend to remain vacant during most of the day. Conversely, a scarcity of loading zones often seems to occur whenever several delivery vehicles arrive at the same time. Further, those same delivery vehicles often double park, causing congestion and other traffic problems.

Figure 19:
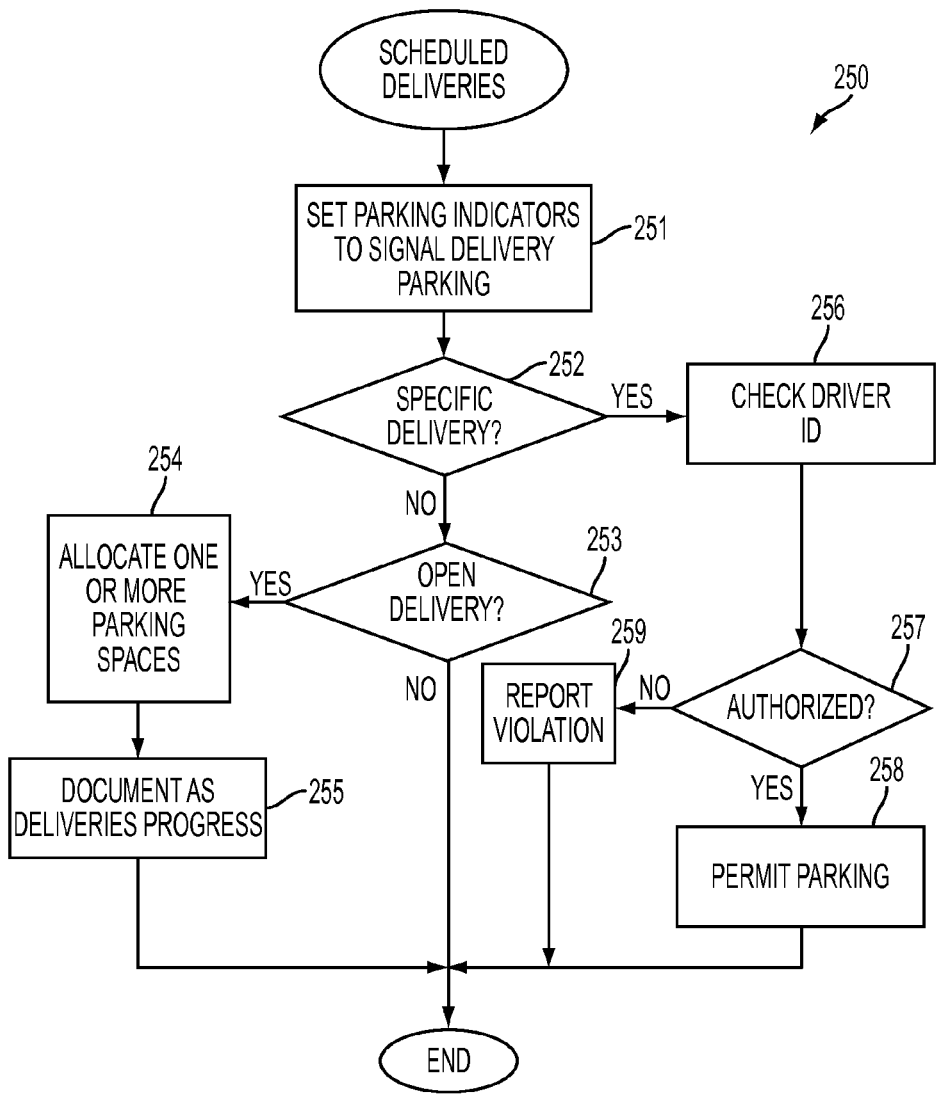
FIG. 19 is a flow diagram showing a routine for a scheduled deliveries service for use in the parking services of FIG. 1.

The parking services 12 can facilitate a more flexible way to arrange parking for scheduled deliveries. FIG. 19 is a flow diagram showing a routine for a scheduled deliveries service 250 for use in the parking services 12 of FIG. 1. The scheduled deliveries service enables merchants and delivery organizations to dynamically reserve parking for deliveries ahead of time. This approach allows the number of loading zones to flexibly grow and shrink according to need, thereby enabling smoother deliveries and providing more parking spaces 24 when deliveries are not scheduled.

The scheduled deliveries service includes two separate yet related processes. The first process involves allocating parking spaces 24 for delivery or loading zones. There are different ways to allocate parking spaces 24. For example, a loading zone can be set up through a reservation for a particular driver or can be reserved for anyone with a loading zone permit. A list of valid loading zone permit holders can be maintained by the server for use in verifying whether a driver or a business entity is eligible to park in a reserved loading zone. Additionally, the parking spaces 24 eligible for reservation as loading zones could be limited to oversized parking spaces 24 to accommodate the generally larger sizes of commercial vehicles.

The second process involves check-in, where a driver checks in to a delivery or loading zone. Parking indicators 23 are set to signal the use of parking spaces 24 for deliveries (step 251). One approach is to simply use a red indicator for reserved parking spaces 24. Another approach is to use a combination of color indicators and signals to clearly mark a loading zone. For example, a parking indicator 23 could show a blue indicator, signaling that a permit is required, and also flash a yellow indicator, indicating that the space is available for only a short while.

Different arrangements for reserving parking spaces 24 for scheduled delivery can be provided. For example, flexible loading zones include:

Specific Delivery (step 252). A specific parking space 24 is reserved for a particular delivery, after which the loading zone parking reservation is automatically terminated. The parking identity of the driver of the delivery vehicle is verified at check in (step 256). Only authorized parking identities (step 257) enable permissible parking in the loading zone (step 258). Unauthorized use of the loading zone parking space 24 can trigger guided enforcement, as further described infra, and could include automatic reporting of parking violations (step 259).

Open Delivery (step 253). One or more parking spaces 24 are allocated for delivery during a set period (step 254). The parking spaces 24 are available for open use by any authorized delivery during the period. The number of parking spaces allocated can be decreased (step 255) as deliveries are completed.

Service: Valet Parking

Some merchants wish to develop a high sense of parking service for their customers. For example, they may wish to have access to substantial parking at a fixed distance from their establishment. The valet parking service enables these merchants to use public parking spaces 24 to support a valet parking service for their customers. FIG. 20 is a flow diagram showing a routine for a valet parking service 260 for use in the parking services 12 of FIG. 1. In this service, the merchant arranges to allocate several parking spaces 24 adjacent to their establishment for valet parking (step 261). The merchant, who could be representing a restaurant, hotel, special event, and so on, registers one or more parking spaces 24 with the parking services 24 to be used for valet parking. The merchant provides the valets with the locations of these parking spaces 24. The parking services 12 does not know where the valets are parking particular cars and disregards comings and goings of vehicles in the parking spaces 24 during the time period reserved for valet parking. The valet parking reservation runs out when time expires. Typically, valet employees greet customers as they arrive to park customer's vehicles for them (step 262). The valet returns the car to the customer upon completion of their business. The valet parking service uses the parking services 12 to simply enable the merchant to use the parking spaces 24 for a valet purpose.

In a further embodiment, the parking services 12 further support the valet service by keeping track of where each car is located (step 263). For example, the valet parkers could have a number of parking identification cards available and could use a variation of the "Find My car" service, as described supra, to locate customer cars. The parking services 12 keeps track of where the valets are parking the customer's cars. Presumably, the valets use on-street parking. As well, different levels of service can be provided along the theme of "how does the valet indicate which car is parked where?" By way of example, the valet parking service levels include:

"Find My Car." Valets keep a stack of parking identity cards with customer car keys. A valet parks a customer's car and swipes the parking identity card on the nearest parking device 21 or parking services kiosk 19. Later, upon customer request, the valet uses the "Find My Car" service, as described supra, to locate that customer's car.

Paper Tickets. A paper ticket with a printed parking identification is assigned to each set of keys. When the valet parks a customer's car, the valet swipes the paper ticket through a card reader or other input device integrated into the user interface of the nearest parking device 21 or parking services kiosk 19 and requests a valet event number. The valet event number is presented on the display 25 and is written on the paper ticket. Later, the valet enters the event number into the parking services 12 and asks for the location of the car.

Vehicle-Centric Identification. The parking system uses an identification associated with the vehicle, such as an RFID tag, a placard, or the vehicle license plate number. Later the valet uses the owner's ID or a recorded number to locate the car.

Valet Identification. When a valet parks a customer's car, the valet uses his own parking identity card. A record of where the car is parked is associated with the time of parking and the valet's parking identity. This information is either printed out or transmitted into a handheld device that the valet carries, such as a mobile device 15, 16, 17, for later print out. The valet attaches the printed information to the customer's car keys.

Service: Special Use Reservations

Parking spaces 24 are sometimes used by communities for purposes other than parking. For example, parking spaces 24 may be used temporarily as a staging area in a construction zone. Similarly, restaurants may find moving tables or other outside activities into the street to be beneficial, such as during late summertime evenings. As well, business districts may want to reserve a block of parking spaces 24 for a special event that flows into the street. The parking services 12 include a special use reservations service to enable communities, merchants, and others to reserve parking spaces for special use purposes.

Parking Authority Parking Services

Service: Guided Enforcement

The parking services 12 maintain the locations of each vehicle parked in a parking space 24 under its control and is able to determine compliance with applicable parking regulations and time constraints, both facets of which can be helpful to parking enforcement officials. FIG. 21 is a flow diagram showing a routine for a guided enforcement service 270 for use in the parking services 12 of FIG. 1. Guided enforcement deals with many situations. For instance, a motorist may be parked in a parking space 24, but has not paid enough to cover his parking fees. At the beginning of a parking period, motorists are expected to check in during the check-in grace period and the system could direct parking enforcement officials to a parking space 24 at which the motorist failed to timely check in. In another situation, a motorist could overstay his paid parking time. If he paid by credit card or other form of electronic banking, or the parking services 12 otherwise knows his identity, the system could issue a parking ticket or fine automatically without sending a parking enforcement official.

Upon a failure to check in, the expiry of a parking period, which could be delayed until any applicable grace period has run out, or other such cause, parking violations can automatically be determined (step 271) and documented (step 272) by the parking services 12 through examination of the sensor data 40 and device data 41 continually provided respectively through the sensors 22 and parking devices 21. Parking authorities can be alerted as the parking violations (step 273) and provided locations of expired parking, as well as collecting photographs and other parking violation indicia. Where permitted, the parking services 12 could even undertake enforcement action (step 274), such as issuing parking violation citations, summoning a tow truck, or take other action. For instance, in lieu of towing a car, a vehicle immobilizer or parking "boot" could be placed on the offending vehicle by parking authorities to render the vehicle undriveable. The parking device 21 or parking services kiosk 19 can display instructions to the driver, who can call in or go online to pay a parking fine. He will then receive a security code that allows him to remove the boot for later drop off at a collection point. Whether to immobilize or tow depends on the scarcity of parking spaces and other factors.

Service: Schedule Street Event

Figure 22:
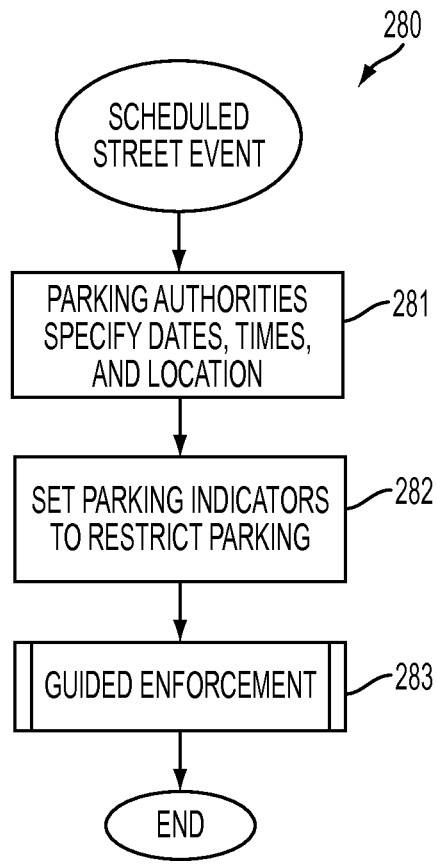
FIG. 22 is a flow diagram showing a routine for a schedule street event service for use in the parking services of FIG. 1.

Similar to special uses undertaken by businesses, as described supra, communities sometime schedule events that require street closure. FIG. 22 is a flow diagram showing a routine for a schedule street event service 280 for use in the parking services 12 of FIG. 1. Street event parking can be arranged ahead of time. Parking authorities can enter the dates and times for these events into the parking services 12 (step 281). The parking services 12 log the time and identifies the parking devices 21 and parking services kiosks 19 affected. When time for the street event arrives, the parking indicators 23 are set to restrict parking on the street (step 282), rather than having to have parking control officers place signs or cover parking device 21 or parking services kiosk 19s manually.

During the duration of the street event, the parking services 12 handle situations where a vehicle attempts to parks in a reserved parking space 24. If free parking is provided to motorist as part of the street event, parking services 12 ignores the parking space 24. As well, the sensors 22 may also detect other non-parking activities, such as activations due to vending carts, foot traffic, and the like. These non-parking activities can also be ignored. The time period during which the parking services 12 ignore such parking events can be set at the time that the street event is scheduled, or at any time later by the parking account 37a-c for the event. Additionally, the parking services 12 allow authorized individuals, such as event organizers, to access a parking device 21 or parking services kiosk 19, use an authorized street event parking identification card, and report a parking violation if they want a vehicle removed from one of their street event parking spaces 24.

The parking services 12 automatically reset the parking indicators 23 after the street event is over. Additionally, the parking services 12 can undertake guided enforcement (step 288), as described supra, to ensure the event commencement.

Service: Manage Street Sweeping

Street sweeping services and related cleaning and maintenance activities are provided by municipalities in many urban settings. Typically, the hours of street sweeping are posted and vehicles can be fined or even towed if they are parked on a street during the posted period, although some municipalities issue sweeper parking permits that enable people to stay parked at those times, such as handicapped people or people who are leaving on vacation and plan to park in front of their house for a few days. The manage street sweeping service tracks the location and progress of street sweepers to return parking spaces 24 back to public parking quickly once the street sweeper has gone by. In one embodiment, the parking services 12 can send text, email, or voice mail messages to residents and other motorists who are parked in a scheduled street sweeping zone to warn them about pending street sweepers. These individuals can specify how far ahead of time they need to be reminded to move their cars.

The manage street sweeping service can be illustrated by a scenario.

| Time | Event |
|---|---|
| Friday | Scheduling street sweeping. Officer Lewis is responsible for making street sweeper schedules for MyCity. One of the street sweeper vehicles has been returned to duty. He wants to revise the street sweeping schedule to include some new city blocks. Officer Lewis logs into the server using his parking authority credentials. He navigates to the Web page for setting the street sweeper schedules. Using a map, he picks a city block or region. He brings up a calendar interface. Starting next Monday, he schedules weekly street sweeping for Wednesday from 8:30 am to 9:30 am on the city block where Bob lives, including parking spaces A and B. He schedules a street sweeper for 2:30 pm-3:30 pm, including parking space C on a different block. The server notices that Bob has overnight parking reservations for parking space A from 6:00 pm to 9:00 am. Bob also has a parking device 21 in front of his driveway, which is parking space B, and that Bob makes parking space B available for public parking from 9:00 am to 6:00 pm on weekdays. The revised street sweeping times cut into both Bob's overnight parking reservation and the public parking time. The server sends Bob an email and text message warning him that he will have to move his car before 8:30 am on Wednesday for street sweeping. |
| Tuesday 5:45 pm | Near the end of the work day, the server notices that the minimal interval for parking space A in front of Bob's apartment is ending. Parking space A will become available again Wednesday morning after the street sweeper interval. The server sends a message to the parking indicator 23 nearest to parking space A to display Red and the corresponding parking device 21 to display the message, "No Parking--Reserved" with a countdown to 9:30 am. |
| Tuesday 5:50 pm | Timely reminder at check-in. Bob arrives home from work. He pulls into parking space A in front of his home. The vehicle sensor 22 detects Bob's vehicle and sends a message to the server. The server logs the occupancy and notices that the parking space 24 is reserved for Bob. The server instructs the parking indicator 23 to display Yellow and the parking device 21 to enter the "check-in reserved" state with a countdown for the check-in grace period. The parking indicator 23 displays Yellow and the parking device displays, "Please check in." The countdown timer begins. Bob approaches the parking device 21 and slides his credit card. The parking device 21 sends his credit card information to the server. The server recognizes that the credit card is associated with Bob's parking reservation and recognizes that Bob's arrival time is within the pre-reservation early arrival grace period. The server instructs the parking indicator 23 to display Green (paid) and the parking device 21 to display "Reserved Parking" with a timer displaying the time available until 9:30 am Wednesday morning. The server also tells the parking device 21 to remind Bob about the street sweeper. The parking indicator 23 displays Green and the parking device 21 displays, "Reserved parking" with the time before the meter becomes available after street sweeping. The parking device 21 also provides a message to Bob reminding him to move his car before 8:30 am to accommodate the street sweeper. |
| Wednesday 8:00 am | Timely text alerts. Bob is busy around the house with kids and breakfast. |
| 8:00 am | The server notices that Bob's parking space 24 is still occupied. |
| 8:15 am | The server notices that Bob's parking space is within the reminder interval and that Bob wants a text reminder. The server sends him a text message telling him to move his car and where the car is parked. |
| 8:23 am | Bob grabs his lunch and winds up things at home. He hops in his car, pulls out from the curb, and heads to work. The vehicle sensor 22 detects his departure and sends a message to the server. The server acknowledges the message and logs that parking space A is vacant. The server finds constraints on the parking space 24 as not becoming available for parking until 9:30 am. The server instructs the parking indicator 23 to display Red and the parking device 21 to display a message "No Parking--Street Sweeping" with a countdown to 9:30 am. The server instructs the parking device 21 to enter the "no-parking" state. The parking indicator 23 displays Red and the parking device 21 displays, "No Parking--Street Sweeping" with a countdown to 9:30 am. |
| 9:00 am | Contextual warning to parkers. Charlie drives by, ignores the color displayed by the parking indicator 23, and parks in parking space A. The vehicle sensor 22 detects his arrival and sends a message to the server. The server notices that the parking space 24 does not allow parking because the street sweeper is on its way. The server sends a |

| Time | Event |
|---|---|
| | message to the indicator 23 to display Yellow and the parking device 21 to display a no-parking alert and enter the "check-in" state with a countdown for a check-in grace period. The server also instructs the parking device 21 to display, "No Parking--Street Sweeping (Check-in for an exemption)."<br>The parking device 21 displays, "No Parking--Street Sweeping (Check-in for an exemption)." |
| 9:01 am | Charlie reads the message. He knows that he can buy an exemption, but decides to re-park elsewhere. He gets back in his car and drives to a different parking space.<br>The vehicle sensor 22 detects his departure and sends a message to the server.<br>The server acknowledges the message and logs that parking space A is vacant. The server finds constraints on the parking space 24 as not becoming available for parking until 9:30 am. The server instructs the parking indicator 23 to display Red and the parking device 21 to display a message "No Parking--Street Sweeping" with a countdown to 9:30 am. The server instructs the parking device 21 to enter the "no-parking" state.<br>The parking indicator 23 displays Red and the parking device 21 displays, "No Parking--Street Sweeping" with a countdown to 9:30 am. |
| 9:30 am | The server notices that the street sweeper period is over for parking space A. The server sees that parking is reserved at 6:00 pm for Bob (with a 15-minute blackout period) and that there is a maximum of four-hour parking, except for neighborhood residents. The server sends a message to the parking device 21 or parking services kiosk 19 display Green and the parking device 21 to display a four-hour parking limit, omit a countdown, and to display the appropriate messages and counters.<br>The parking indicator 23 displays Green and the parking device 21 changes the counter to show four hours. |
| Wednesday 12:00 pm | Parking space C is not occupied. The parking indicator 23 displays Green and the parking device 21 shows the time counting down to the 2:30 pm street sweeping time.<br>Check-in. Doris pulls into parking space C to get some lunch and do some shopping on a nearby commercial street.<br>The vehicle sensor 22 detects her arrival and sends a message to the server.<br>The server sends a message to the indicator 23 to display Yellow and the parking device 21 to display a no-parking alert and enter the "check-in" state with a countdown for a check-in grace period. The server also instructs the parking device 21 to display, "No Parking--Street Sweeping (Check-in for an exemption)." |
| 12:00 pm | The parking indicator 23 displays Yellow and the parking device 21 displays, "No Parking--Street Sweeping (Check-in for an exemption)." The parking indicator 23 also displays a warning that the street sweeper comes at 2:30 pm.<br>Doris swipes her credit card and the parking device 21 sends the information to the server.<br>The server authenticates the credit card and looks up the constraints on parking space C. The server notices that the parking space 24 must be vacated for street sweeping at 2:30 pm and computes three possible reservations for 30 minutes, 60 minutes, and 90 minutes. The server sends a message to the parking indicator 23 to display Green and the parking device 21 to offer the three parking time options with their prices, including asking her to select a desired amount of time.<br>The parking device 21 offers the default parking time period and prices for the three parking time options to Doris. The user interface on the parking device 21 lets Doris increase the amount of time up to 90 minutes or decrease the amount of time down to a minimum, for instance 15 minutes. The parking device 21 gives Doris the price for each option.<br>Doris selects the maximum time of 90 minutes for $1.50.<br>The parking device 21 sends Doris' selection to the server.<br>The server authorizes Doris' reservation and instructs the parking device 21 to confirm to Doris that she is paid through 2:30 pm and that $1.50 has been charged to her credit card. |
| 12:03 pm | Doris goes to lunch and starts shopping. She runs into friends and loses track of time. |
| 2:15 pm | The server notices that parking space C is still occupied and that the street sweeper period is less than an alert interval away. The server sends a message to Doris telling her that her car needs to be moved. The server also sends a message to the parking indicator 23 to display Yellow and the parking device 21 to keep the timer countdown running to 2:30 pm.<br>The parking indicator 23 displays Yellow and the parking device 21 continues the countdown. |

| Time | Event |
|---|---|
| | Doris gets the message about moving her car. She wants to stay longer and hurries back to her car. |
| 2:20 pm | Offering customer friendly alternatives. Doris arrives at her car. She slides her credit card in the parking device 21, which sends the credit card information to the server.<br>The server notices that the street sweeper arrives in ten minutes, yet locates some nearby parking spaces 24 that are not occupied. The server instructs the parking indicator 23 to continue displaying Yellow and the parking device 21 to display a message telling Doris about the street sweeper constraint. The server also instructs the parking device 21 to ask her whether she wants to buy a street sweeper exemption for $35.00, or whether she wants to reserve a nearby parking space 24.<br>The parking device 21 displays the message to Doris. She decides that the fee for a street sweep exemption is too high and decides to move her car. She can see some available parking spaces 24 from where she is standing. She gets in her car and pulls out of parking space C. |
| 2:22 pm | The vehicle sensor 22 detects her departure and sends a message to the server.<br>The server notices that Doris has left and that the street sweeper period is closer than the minimum parking interval. The server checks for any other constraints and determines that parking is available at 3:30. The server instructs the parking indicator to display Red and the parking device 21 displays, "No Parking--Street Sweeping" with a countdown to 3:30 pm.<br>The parking indicator 23 displays Red and the parking device 21 displays, "No Parking--Street Sweeping" with a countdown to 3:30 pm. |

Several useful variations on managing street sweeping of benefit to both the municipality undertaking street sweeping and motorists who live on streets subject to sweeping can be provided by the aforementioned suite of parking services. For instance, parking spaces could be more completely utilized if the parking system kept track of when street sweeping is finished for individual city blocks. Conventionally, no vehicles can be parked in parking spaces on streets subject to sweeping during the entire period when street sweeping is scheduled, even if sweeping has been completed on a particular street before the expiry of the period. Using the networked parking services, the parking spaces could be made available for parking sooner once the sweeping of a city block is complete. The notification of sweeping completion could be made by a street sweeping vehicle equipped with, for instance, a GPS locational device and communications equipment capable of remotely interfacing the vehicle to the parking services servers 12 or other gateway into the parking services network.

Residents could also be allowed to remain parked through a street-sweeping cycle. For instance, an urban resident may need to park on the street while away on vacation, even during those times when street sweeping is ordinarily scheduled. In this situation, the resident would pay a penalty for parking during the sweeping period ahead of time, essentially reserving the parking space, albeit at a higher rate, or by using special permit obtained in advance of the needed time period. The municipality would collect the fee from the resident without logging a parking violation, thereby helping offset higher-cost manual street cleaning around the resident's parked vehicle as needed.

Finally, motorists could be provided an alert service if their cars are parked at the wrong time in a street sweeping zone. These motorists could be alerted by automated text message, telephone call, or other means in time for them to move their vehicles and allow street sweeping to proceed as scheduled.
Examples of the Parking Services Server In Action Friendly on-Street Parking Services for Shoppers and Merchants When convenient parking for a store or shopping district is unavailable or unpredictable, shoppers are discouraged from going out. Furthermore, merchants have no direct way to encourage people to drive to their stores, such as by easily validating on-street parking. As well, tourism bureaus have no way to promote access for visitors by simplifying on-street parking or by giving visitors preferential treatment in parking or violation handling.

The time needed to complete everyday errands is often variable and the time required to find parking in a business district depends upon traffic and the level of parking occupancy. After parking, people may browse, shop, run errands, or dine, all of which require a variable amount of time. With fixed time periods for parking, these people need to return to parking device 21 or parking services kiosk 19s to pay for additional parking time before the meter expires, or they must move their cars when the time limit for parking in one particular parking space has been reached.

These parking situations are bad for business. When shoppers need to return to their cars, they may decide to simply leave and skip further retail purchases. People who value their time have no way to translate their needs and level of urgency into increased on-street parking availability or predictability. Merchants also lack the means to incentivize people to come to their district, or to modify parking policies in ways that promote business for themselves or their business district.

The real-time and account-based parking services provided through the parking services 12 and a network of smart parking devices 21 address the needs of these individuals. In a typical scenario, a driver can check that a parking space 24 is available and can then simply park his vehicle. A sensor 22 detects that the parking space 24 is now occupied and prompts the driver to check in and provide a parking identity for the parking event. The driver may swipe a parking identification card, credit card, debit card, or other form of identification at the parking device 21, thereby enabling the parking services 12 to determine the driver's identity, validate any required parking privileges, and log the parking event. Later, the driver might make purchases at a local store. By using the customer's parking identity, the parking services 12 can identify the current parking event, log a parking validation for the customer, and cover the customer's parking charges for a period.

Additionally, merchants, civic groups, and other similar interests could obtain special permits or specialized accounts for interacting with the parking services 12. In addition to providing validation of customer parking, merchants can reserve also parking spaces 24 in front of their stores for scheduled deliveries, thus reducing the congestion-inducing practice of double-parking to unload goods.

Residential Parking Services

In urban neighborhoods, residents sometimes lack garages and have to park on the street at night. They also sometimes have parking needs during the day, which could be better served by parking with in-and-out privileges, that is, the ability to leave and return to the same parking space throughout the time covered by a single parking reservation. Moreover, in neighborhoods with conventional coin-fed parking device 21 or parking services kiosk 19s, residents spending the day at home are forced to continually feed coins to the parking device 21 or parking services kiosk 19 or move their car, which can be inconvenient and frustrating.

The parking services provided through the parking services 12 and a network of smart parking devices 21 also address the needs of those individuals living in a residential area, particularly with limited on-street parking that is otherwise available to residents and non-residents alike. Urban residents can reserve on-street parking spaces 24 near their home for overnight or daytime parking. The policies enforced for signing up for parking services may give preferred treatment according to various criteria, such as residential address, level of parking utilization on the street, and according to any permits possessed by the resident, such as for handicapped, elderly, or privileged parking.

The parking indicators 23 tell drivers when a parking space 24 is available. When someone pulls into a reserved parking space 24, a nearby parking device 21 provides a visual or audio reminder to check in. The driver provides his parking identity by swiping a parking identification card or other identifying data. In a further embodiment, a transponder or similar device can automatically retrieve an RFID tag or other wireless identifier from the vehicle, or a camera integrated into the parking device 21 could read the vehicle's license plate. When a vehicle parks in a reserved parking space, the parking device 21 can issue a warning that the parking space 24 is reserved. If an unauthorized driver tries to check in for parking in a parking space 24 reserved for someone else, the parking services 12 can refuse payment and deny parking.

Additionally, the parking services 12 can alert parking enforcement resources about parking violations, thereby taking the urban resident out of the loop of satisfying his parking reservation. If the unauthorized driver does not remove his vehicle within a state time, the parking services 12 could, for instance, summon a parking enforcement officer to issue a ticket and a tow truck to remove the offending vehicle. The parking device 21, as well as surrounding parking devices 21, could also take pictures to document the parking violation. Where the parking services 12 know the identification of the driver, photographic evidence generated through the parking device 21 could support issuance of a traffic citation.

In addition, the parking services 12 can alert drivers if they are at risk of a parking violation. For example, drivers could receive timely alerts if a street cleaning time is approaching and they have left their car in an affected parking space 24 under control of the parking services 12. In another example, drivers could be alerted if their parking time is almost expired where a time limit applies or when another driver has previously reserved the parking space 24. Likewise, drivers occasionally forget where they parked. Since the parking services 12 has global knowledge of all cars parked in controlled parking spaces 24, drivers could use the "Find My Car" service at any parking device 21 or parking services kiosk 19 to locate their car.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for offering commercial parking reservations through flexible loading zones, comprising:

managing a multiplicity of motor vehicle parking spaces disbursed over a plurality of physically-separate and openly-disbursed parking locations in a business district of an urban environment through a centrally-located server, the server configured to interface over a computer network and comprising a memory and a computer processor, the computer processor operatively coupled to the memory and configured to execute computer executable program modules, comprising:

interfacing by the computer processor via the computer network a plurality of smart parking devices that are each physically proximate to and which correspond to at least one of the parking spaces;

interfacing by the computer processor via the computer network a plurality of vehicle occupancy sensors that are also each physically proximate to and which correspond to at least one of the parking spaces;

interfacing with the server via the computer network a plurality of parking availability indicators that are each associated with at least one of the parking spaces, each of the parking availability indicators comprising a plurality of indications that correspond to an availability of each of the associated parking spaces for parking based upon actual, reserved, and restricted use of the parking space as provided to the parking availability indicator by the server and by the smart parking device and the vehicle occupancy sensor that both correspond to each of th parking spaces with which the parking availability indicator is associated; and designating by the server at least one of the parking spaces as a loading zone for use by businesses during scheduled times and days;

reserving by the server use of one such parking space for the loading zone, comprising:

maintaining by the server a list of authorized businesses for reserving the parking space for the loading zone, accepting by the server a request for a reservation of the parking space for the loading zone from a business comprising a time and date over which a reservation period would be in effect, and confirming that the business is eligible to reserve the parking space for the loading zone by identifying the business in the list of the authorized businesses; and upon confirmation of eligibility, granting by the server the request provided that the reservation period occurs within the scheduled times and days and the parking space for the loading zone is available over any other reservations stored in the server; and managing by the server use of the parking space for the loading zone, comprising:

activating by the server the parking availability indicator associated with the parking the loading zone and indicating reserved use of the parking space for the loading zone by the parking availability indicator that corresponds to each of the parking spaces that are reserved for the use of the loading zone, as provided to the corresponding parking availability indicator from the server via the network, throughout the time period during the scheduled times and days;

sensing occupancy of the requested parking space by a motor vehicle through the nearest vehicle occupancy sensor;

determining an identity of a driver of the motor vehicle through the nearest smart parking device; and permitting by the server the use of the loading zone during the scheduled times and days upon matching the driver's identity to the business to whom the parking reservation was granted.

2. A method according to claim 1, further comprising:

designating by the server a plurality of the parking spaces that are adjacent as the loading zone; and allowing by the server the business to reserve the plurality of the parking spaces as the loading zone under a single reservation during the scheduled times and days.

3. A method according to claim 1, further comprising at least one of:

requiring by the server that the loading zone reservation be for a particular driver identified in a parking account of the business; and allowing by the server the loading zone reservation to be for any driver provided with a loading zone permit, wherein the driver's identity is further verified against a list of holders of loading zone permits.

4. A method according to claim 1, further comprising:

limiting by the server the loading zone reservation to a specific delivery, after which the loading zone reservation is terminated.

5. A method according to claim 1, wherein a plurality of parking spaces are comprised in the loading zone reservation, further comprising:

permitting by the server open use of the reserved parking spaces; and decreasing by the server the number of reserved parking spaces upon each successive use of the reserved parking spaces by the business.

* * * * *